United States Patent
Yoneda

(10) Patent No.: US 6,609,251 B1
(45) Date of Patent: *Aug. 19, 2003

(54) DIGITAL BROADCASTING TRANSMITTING METHOD, DIGITAL BROADCASTING TRANSMITTING APPARATUS, AND DIGITAL BROADCASTING REPRODUCING APPARATUS

(75) Inventor: Yasushi Yoneda, Ikedashi (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/058,251

(22) Filed: Apr. 10, 1998

(30) Foreign Application Priority Data

Apr. 14, 1997 (JP) .............................................. 9-095604

(51) Int. Cl.[7] .................................................. H04N 7/20
(52) U.S. Cl. .............................. 725/71; 725/63; 725/98; 725/148; 348/558
(58) Field of Search .............................. 725/63, 71, 98, 725/118, 148; 348/558; H04N 7/20

(56) References Cited

U.S. PATENT DOCUMENTS

| | | | | |
|---|---|---|---|---|
| 4,837,626 A | * | 6/1989 | Nishiyama et al. ......... | 348/554 |
| 5,132,793 A | * | 7/1992 | Hirahata et al. ............ | 348/445 |
| 5,187,575 A | * | 2/1993 | Lim ............................ | 348/555 |
| 5,387,940 A | * | 2/1995 | Kwok et al. ................ | 348/446 |
| 5,410,354 A | * | 4/1995 | Uz .............................. | 348/441 |
| 5,444,491 A | * | 8/1995 | Lim ............................ | 348/441 |
| 5,610,661 A | * | 3/1997 | Bhatt ......................... | 348/446 |
| 5,970,204 A | * | 10/1999 | Higurashi .................... | 386/57 |
| 5,982,982 A | * | 11/1999 | Ono et al. .................. | 386/109 |
| 6,005,562 A | * | 12/1999 | Shiga et al. ................ | 345/721 |
| 6,151,078 A | * | 11/2000 | Yoneda et al. .............. | 348/465 |

FOREIGN PATENT DOCUMENTS

JP          9-327004          12/1997

* cited by examiner

Primary Examiner—Vivek Srivastava
Assistant Examiner—Jason Salce
(74) Attorney, Agent, or Firm—Parkhurst & Wendel, L.L.P.

(57) ABSTRACT

A digital broadcasting transmitting method wherein a transport stream is created and transmitted in a digital broadcasting system in which the transport stream in which plural packets comprising video data packets of digitized video and service information packets of information about broadcasting using the video have been multiplexed, is transmitted over a network, comprises: creating and transmitting the transport stream in which the service information includes scanning method information as information about a scanning method of digitizing the video.

34 Claims, 62 Drawing Sheets

NIT Network Information Table code allocation of service type

| code | video type |
|---|---|
| 0x01 | interlace digital broadcasting |
| 0x02 | interlace NVOD reference |
| 0x03 | interlace NVOD time-shifted |
| 0x04 | interlace mosaic |
| 0x05 | non-interlace digital broadcasting |
| 0x06 | non-interlace NVOD reference |
| 0x07 | non-interlace NVOD time-shifted |
| 0x08 | non-interlace mosaic |

Fig.11 (a)

component type code (non-interlace) allocation

| code | video type |
|---|---|
| 0x21 | non-interlace video : aspect = 4:3 |
| 0x22 | non-interlace video : aspect = 16:9, with pan vector |
| 0x23 | non-interlace video : aspect = 16:9, without pan vector |
| 0x24 | non-interlace, letter box |
| 0x31 | non-interlace still picture : aspect = 4:3 |
| 0x32 | non-interlace still picture : aspect = 16:9, with pan vector |
| 0x33 | non-interlace still picture : aspect = 16:9, without pan vector |
| 0x34 | non-interlace still picture, letter box |

Fig.11 (b)

component type code (interlace) allocation

| code | video type |
|---|---|
| 0x01 | interlace video : aspect = 4:3 |
| 0x02 | interlace video : aspect = 16:9, with pan vector |
| 0x03 | interlace video : aspect = 16:9, without pan vector |
| 0x04 | interlace video, letter box |
| 0x11 | interlace still picture : aspect = 4:3 |
| 0x12 | interlace still picture : aspect = 16:9, with pan vector |
| 0x13 | interlace still picture : aspect = 16:9, without pan vector |
| 0x14 | interlace still picture, letter box |

NIT Network Information Table transmitted over network 1

NIT Network Information Table transmitted over extended network 1

Fig.19 service type code allocation

| code | video type |
|---|---|
| 0x01 | interlace digital broadcasting TV |
| 0x02 | interlace N V O D reference |
| 0x03 | interlace N V O D time-shifted |
| 0x04 | interlace mosaic |
| 0x05 | non-interlace digital broadcasting TV |
| 0x06 | non-interlace N V O D reference |
| 0x07 | non-interlace N V O D time-shifted |
| 0x08 | non-interlace mosaic |
| 0x11 | interlace・non-interlace coexist digital broadcasting TV |
| 0x12 | interlace・non-interlace coexist N V O D reference |
| 0x13 | interlace・non-interlace coexist N V O D time-shifted |
| 0x14 | interlace・non-interlace coexist mosaic |

Fig.20

NIT Network Information Table

| table ID | 8 |
|---|---|
| network ID | 16 |
| ⋮ | |
| descriptor | |
| network name | 16 |
| transport stream list | |

| transport stream ID | 16 |
|---|---|
| original network ID | 16 |
| service list | |

| service ID | 16 |
|---|---|
| service type | 8 |
| service ID | 16 |
| service type | 8 |
| ⋮ | |

→ NET 2

→ service ID : service 11
service type : non-interlace
service ID : service 13
service type : coexist EIT Event Information Table

| table ID | 8 |
|---|---|
| section syntax indicator | 1 |
| reserved | 3 |
| section length | 12 |
| service ID | 16 |
| reserved | 2 |
| version number | 5 |
| Current_next_indicator | 1 |
| section number | 8 |
| last section number | 8 |
| transport stream ID | 16 |
| original network ID | 16 |
| segment last section number | 8 |
| descriptor | |
| event list | |

| event ID | 16 |
|---|---|
| start time | 40 |
| broadcasting time | 24 |
| status | 3 |
| ⋮ | |

| packet ID : 0x12 |
|---|
| service : 11 |
| start time : 19:00 |
| title : art |
| start time : 20:00 |
| title : litarature |
| start time : 21:00 |
| title : education |
| start time : 22:00 |
| title : English |
| service : 13 |
| start time : 19:00 |
| title : jazz |
| component type : non-interlace |
| start time : 20:00 |
| title : rock |
| component type : interlace |
| start time : 21:00 |
| title : concert |
| component type : non-interlace |

NIT Network Information Table transmitted over network 1

NIT Network Information Table transmitted over network 2

Fig.35 (a)
existing digital broadcasting system

| service | 12:00 16:00 21:00 |||
|---|---|---|---|
| 1 | X X X (service 1) |||
| 2 | Y Y Y (service 2) || |
| 3 | Z Z Z (service 3) | | Z Z Z (service 3) |

Fig.35 (b)
extention of digital broadcasting system

| service | 12:00 16:00 21:00 |||
|---|---|---|---|
| 1 | X X X (service 1) |||
| 2 | Y Y Y (service 2) || service 12 (interlace) |
| 3 | Z Z Z (service 3) | service 15 (non-interlace) | Z Z Z (service 3) |
| 11 | service 11 (non-interlace) |||
| 13 | service 13 (coexist) |||

NIT Network Information Table transmitted over network 1

NIT Network Information Table transmitted over network 2

Fig.46 (a)

Example 1 OLD
Example 2 OLD
　　　NEW2 display screen

| time | service | |
|---|---|---|
| | 1 | 3 |
| 19:00-20:00 | baseball 1 | baseball 1 |
| 20:00-21:00 | quiz | soccer |
| 21:00-22:00 | western movie | baseball 2 |
| 22:00-23:00 | | news |

Fig.46 (b)

Example 1 NEW1
　　　NEW2
Example 2 NEW1 display screen non-interlace program table

| time | service | |
|---|---|---|
| | 11 | 13 |
| 19:00-20:00 | art | jazz |
| 20:00-21:00 | literature | rock |
| 21:00-22:00 | education | concert |
| 22:00-23:00 | English | | interlace program table

| time | service | |
|---|---|---|
| | 1 | 3 |
| 19:00-20:00 | baseball 1 | baseball 1 |
| 20:00-21:00 | quiz | soccer |
| 21:00-22:00 | western movie | baseball 2 |
| 22:00-23:00 | | news |

Fig.46 (c)

Example 1 NEW1
　　　NEW2
Example 2 NEW1 display screen program table

| time | service | | | |
|---|---|---|---|---|
| | 1(interlace) | 3(interlace) | 11 (non-interlace) | 13 (non-interlace) |
| 19:00-20:00 | baseball 1 | baseball 1 | art | jazz |
| 20:00-21:00 | quiz | soccer | literature | rock |
| 21:00-22:00 | western movie | baseball 2 | education | concert |
| 22:00-23:00 | | news | English | |

Example 1 OLD
Example 2 OLD

Example 1 NEW2

Fig.48 (a)

Example 1 NEW1
  NEW2
Example 2 NEW1 display screen interlace program table

| time | service | | | |
|---|---|---|---|---|
| | 1 | 3 | 11 | 13 |
| 19:00 -20:00 | baseball 1 | baseball 1 | art | |
| 20:00 -21:00 | quiz | soccer | literature | rock |
| 21:00 -22:00 | western movie | baseball 2 | education | |
| 22:00 -23:00 | | news | English | | non-interlace program table

| time | service | |
|---|---|---|
| | 1 | 13 |
| 19:00 -20:00 | | jazz |
| 20:00 -21:00 | long movie | |
| 21:00 -22:00 | | concert |
| 22:00 -23:00 | | |

Fig.48 (b)

Example 1 NEW1
  NEW2
Example 2 NEW1 display screen

| time | service | | | | | | | | | |
|---|---|---|---|---|---|---|---|---|---|---|
| | 1 | SC | 3 | SC | 11 | SC | 12 | SC | 13 | SC |
| 19:00 -20:00 | baseball 1 | I | baseball 1 | I | art | I | | | jazz | N |
| 20:00 -21:00 | quiz | I | soccer | I | literature | I | long movie | N | rock | I |
| 21:00 -22:00 | western movie | I | baseball 2 | I | education | I | | | concert | N |
| 22:00 -23:00 | | | news | I | English | I | | | | |

I : interlace
N : non-interlace

Fig.55

TS101
SDT

| table ID | 8 |
|---|---|
| transport stream ID | 16 |
| ⋮ | |
| descriptor | | service list

----→ TS101

TS102
SDT

| table ID | 8 |
|---|---|
| transport stream ID | 16 |
| ⋮ | |
| descriptor | | service list

| service ID | 16 |
|---|---|
| EIT type | 8 |
| service ID | 16 |
| EIT type | 8 |
| service ID | 16 |
| EIT type | 8 |

----→ TS102

----→
service ID : service 11
EIT type : type 1
service ID : service 12
EIT type : type 2
service ID : service 13
EIT type : type 1

EIT type
 type 1 : one segment = 3 hours
 type 2 : one segment = 24 hours

Fig.56

TS101
NIT

| table ID | 8 |
|---|---|
| network ID | 16 |
| ⋮ | |
| descriptor | |
| network name | 16 |
| transport stream list | |

| transport stream ID | 16 |
|---|---|
| service list | |

| service ID | 16 |
|---|---|
| EIT type | 8 |
| service ID | 16 |
| EIT type | 8 |
| service ID | 16 |
| EIT type | 8 |
| ⋮ | | transport stream ID 16 ------→ TS101 service list ------→
service ID : service 11
EIT type : type 1-1
service ID : service 12
EIT type : type 1-2
service ID : service 13
EIT type : type 1-1

EIT type
  type 1-1 : one segment = 3 hours
  type 1-2 : one segment = 24 hours

SDT

| table ID | 8 |
|---|---|
| transport stream ID | 16 |
| ⋮ | |
| descriptor | |
| service list | |

| service ID | 16 |
|---|---|
| EIT type | 8 |
| service ID | 16 |
| EIT type | 8 |
| service ID | 16 |
| EIT type | 8 |
| ⋮ | | transport stream ID 16 --------→ TS101 service list ------→
service ID : service 11
EIT type : type 2-1
service ID : service 12
EIT type : type 2-2
service ID : service 13
EIT type : type 2-2

EIT type
  type 2-1 :
    segment number
        allocation = for each day
  type 2-2 :
    segment number
        allocation = for each month

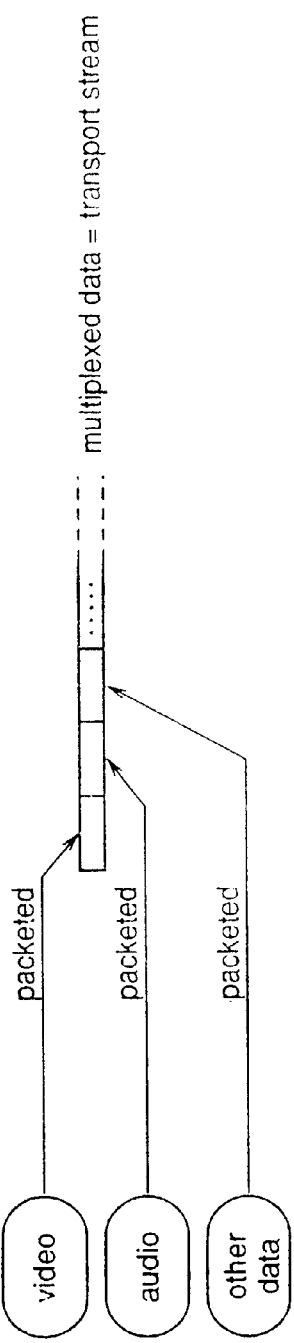
Fig.57 (a) PRIOR ART
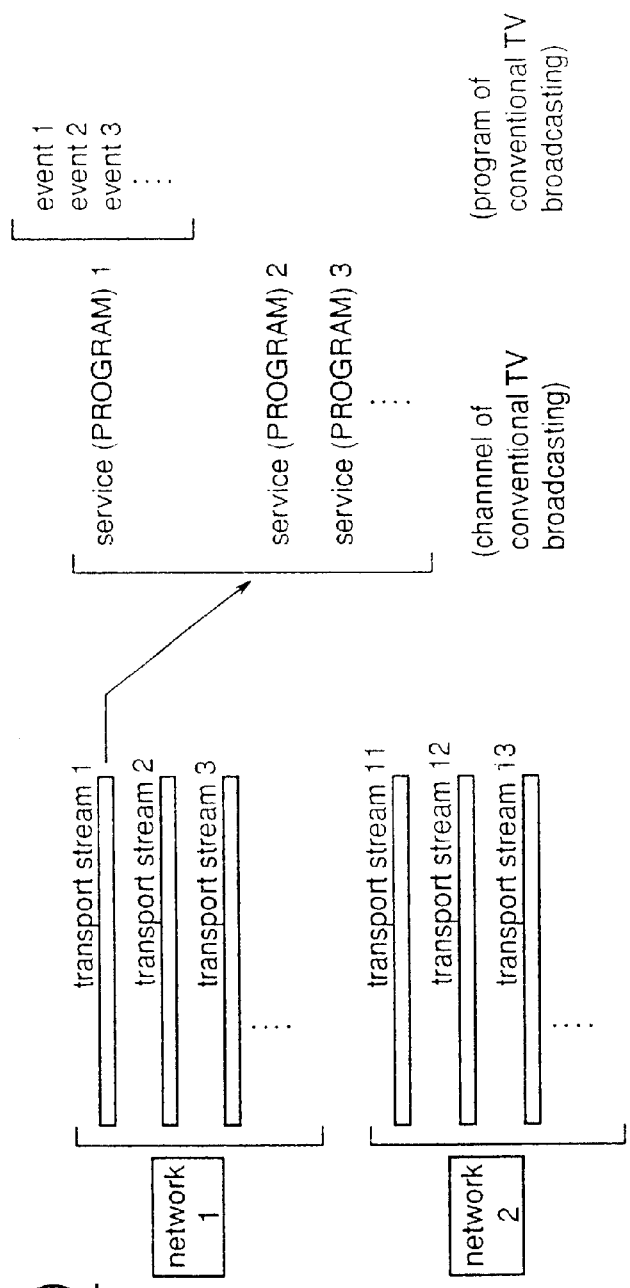
Fig.57 (b) PRIOR ART

| time | PROGRAM | |
|---|---|---|
| | 1 | 3 |
| 19:00-20:00 | baseball 1 | baseball 1 |
| 20:00-21:00 | quiz | soccer |
| 21:00-22:00 | western movie | baseball 2 |
| 22:00-23:00 | | news |

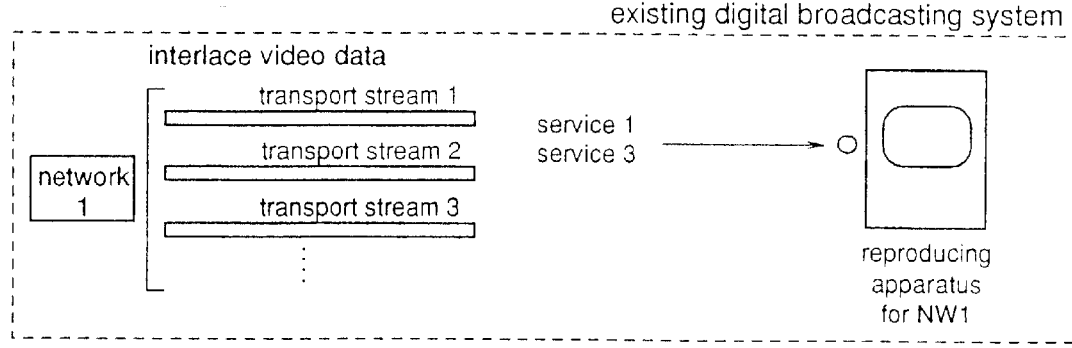
Fig.63 (a) PRIOR ART
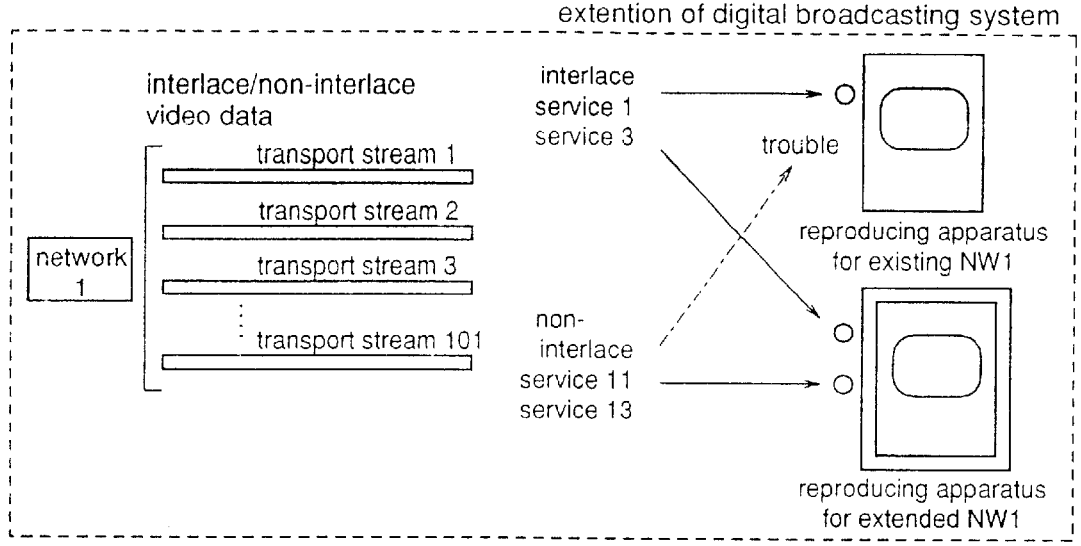
Fig.63 (b) PRIOR ART
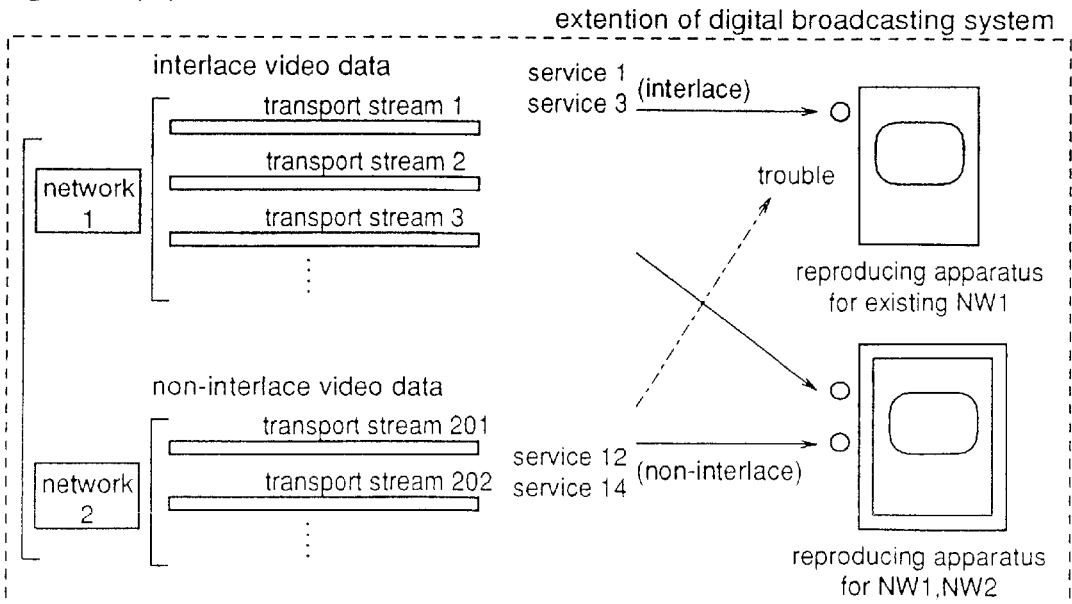
Fig.63 (c) PRIOR ART

DIGITAL BROADCASTING TRANSMITTING METHOD, DIGITAL BROADCASTING TRANSMITTING APPARATUS, AND DIGITAL BROADCASTING REPRODUCING APPARATUS

FIELD OF THE INVENTION

The present invention relates to a digital broadcasting transmitting method, a digital broadcasting transmitting apparatus, and a digital broadcasting reproducing apparatus and, more particularly to a digital broadcasting transmitting method, a digital broadcasting transmitting apparatus, and a digital broadcasting reproducing apparatus in a digital broadcasting system wherein a transport stream in which plural packets comprising packets of video data of digitized video and packets of service information about broadcasting of the video have been multiplexed is transmitted over a network.

BACKGROUND OF THE INVENTION

Conventionally, in TV broadcasting or the like, analog signals were transmitted and received. Recently, much attention has been focused on digital broadcasting in which video, audio, character or other data are handled in the same manner.

Advantages of the digital broadcasting are as follows. i) Since various types of data can be handled collectedly, integration of services can be provided. ii) A compression technique is employed to transmit/receive data, thereby a great deal of broadcasting of high quality can be performed with a limited transmission bandwidth. iii) Uniform services are offered to users by employing an error correcting technique. iv) High techniques may be employed with ease as an encryption technique for limited receiving.

In a case where the various types of data, especially moving pictures of large volumes of data are recorded, transmitted or received as digital data, analog information of the moving pictures is generally subjected to analog-to-digital conversion, and the resulting digital data is compressively coded. There has been proposed an MPEG standard (Moving Picture Experts Group) of a moving picture compression technique, which is widely available, and described in "LATEST MPEG TEXTBOOK" published by ASCII Corp. Aug. 1, 1994, and "PRACTICAL MPEG TEXTBOOK" published by ASCII Corp. Nov. 1, 1995, a video data transmitting/receiving method or a digital broadcasting reproducing apparatus according to MPEG described in these text books is well-known.

Generally, the digital data or compressively coded data is transmitted/received in packeted form. A packet is a unit of data in which entire data is divided into given size data. Transmitting/receiving data in packeted form allows higher efficiency and precision in data communication. For example, in a case where packet switching is performed over a computer network, since packets are respectively sent to transfer destination at different timings, where they are restructured to be original data, information about the transfer destination, transmitting end, or order of packets is added to respective packets.

Thus, in communication systems such as the digital communication system, by employing a packeting technique, various data such as video, audio and additional information are packeted and combined to create multiplexed data, to be transmitted/received.

FIGS. 57(a) and 57(b) show a prior art digital broadcasting system. As shown in FIG. 57(a), in a transmitting end, various types of data is packeted and then multiplexed, resulting in a transport stream to-be-transmitted.

As shown in FIG. 57(b), one or a plurality of transport streams are transmitted over a network. In general, each transport stream includes plural services, namely, "PROGRAM" which correspond to channels in conventional analog TV broadcasting, and each of the services includes one or a plurality of events which correspond to programs. Thus, in the digital TV broadcasting service, audio, video, and additional information of plural channels can be transmitted as multiplexed data. Viewers can utilize the digital broadcasting by the use of receivers adapted to the corresponding networks. Specifically, networks 1 and 2 in FIG. 57(b) are supposed to be used by receivers for them, respectively.

FIG. 58 shows an NIT (Network Information Table), an SDT (Service Description Table), and an EIT (Event Information Table), which are used in the digital broadcasting system. The NIT is information for each network, and contains various types of information about each network or information about a transport stream which belongs to each network. The SDT is information for each transport stream, and contains various types of information about each transport stream and information about a service which belongs to each transport stream. The EIT is information for each service, and contains various types of information about each service and information about events which belong to each service.

In a case where digital broadcasting is performed over plural networks, if failures should occur in lines or a satellite in satellite broadcasting, a transport stream which belongs to a network (original network) may be broadcast over another network. In this case, information about the network to which the transport stream belongs is held by an original network identifier (hereinafter referred to as "ID") contained in service information such as the NIT. Information about a network through which the transport stream has been broadcast is held by a network ID of the NIT Note that it is not necessarily to specify the original network. In the prior art digital broadcasting system, A. In a receiving end, normal receiving and processing is carried out only when an original network ID is recognized, and is identical to a network ID, and B. In a receiving end, normal receiving and processing is carried out even if the original network ID is not recognized or it is different from the network ID. On the other hand, in TV broadcasting using conventional analog signals, video i.e., a moving picture is converted into TV signals, which are transmitted, and received by a receiver, in which the TV signals are reproduced, resulting in the moving picture, to be displayed. In case of audio signals in which the relationship between time and sound pressure may be handled as one-dimensional information, instantaneous (short time) sound pressure can be directly converted into electric signals, while in case of a moving picture comprising still pictures, since the still picture is two-dimensional information as d plane, the plane must be scanned so that it can be handled as one-dimensional information, i.e., plural scan lines, prior to conversion into signals. In this case, a non-interlace method and an interlace method are employed to make an image plural lines. In the former method, all scan lines are sequentially scanned for each frame (screen) from the top, and in the latter method, scan lines are scanned every other line.

In a display having a relatively low level of performance, since there is a large time difference between first and last lines in the non-interlace method, "flicker" occurs. Therefore, in the conventional TV broadcasting, the interlace method has been mainly employed. In general NTSC system, assuming that one frame (screen) has 525 scan lines, odd-numbered lines and even-numbered lines are scanned separately, that is, scanning is performed twice for two fields.

On the other hand, in a display having a relatively high level of performance, the non-interlace method can reduce "flicker". In general displays for computers, number of displays per second of a non-interlace type display is about twice as many as that of an interlace type display. Accordingly, in TV of high quality image, attention has been paid to the non-interlace method in which high quality image is obtained and which is suited for CG (computer graphics).

As described above, the interlace method has been employed in TV broadcasting using analog signals to transmit/receive data of the digital TV broadcasting in the prior art digital broadcasting system, and accordingly techniques have been developed for video data according to the interlace method. Also, where a system uses video data according to the non-interlace method, the system has been developed as such.

Hereinafter, a description is given of the prior art digital broadcasting in which the video data according to the interlace method is transmitted/received.

FIG. 59 shows a method of transmitting video data of the digital TV broadcasting in the prior art digital broadcasting system. First, a construction of the prior art digital broadcasting system will be described with reference to FIG. 59. In the figure, reference numeral 100 designates a transmitting end, i.e., a digital broadcasting transmitting apparatus, and reference numeral 200 designates a receiving end, i.e., a digital broadcasting reproducing apparatus for a network in the digital broadcasting system. The digital broadcasting transmitting apparatus 100 includes an interlace video data storage unit 20, a video data packet creating unit 21, a service information storage unit 26, a service information packet creating unit 27, a multiplexing unit 28, and a transmitting unit 29. Specifically, the interlace video data storage unit 20 is used for storing interlace video data. The video data packet creating unit 21 is used for creating packets to-be-transmitted from video data stored in the interlace video data storage unit 20. The service information storage unit 26 is used for storing information about transmitted data to be added to multiplexed data to-be-transmitted. The service information packet creating unit 27 is used for creating packets to-be-transmitted from the information stored in the service information storage unit 26. The multiplexing unit 28 is used for multiplexing the interlace video data packets and the service information packets, to create multiplexed data to-be-transmitted. The transmitting unit 29 is used for transmitting the multiplexed data from the multiplexing unit 28. Although audio data is packeted and included in the multiplexed data in the transmitting apparatus 100, this will not be shown for simplicity.

The digital broadcasting reproducing apparatus 200 includes a receiving unit 1, a separating unit 2, an interlace video decoding unit 4, a program selecting unit 6a, and a video display 8. Specifically, the receiving unit 1 is used for receiving the multiplexed data. The separating unit 2 is used for separating video data or required information from the multiplexed data. The program selecting unit 6a is used for accepting program selection of the viewer, and informing the receiving unit 1 and the separating unit 2 of the selected program. As the program selecting unit 6a, a remote controller, a TV channel button, a mouse for personal computers, and so forth, which are all widely available, are used for input. The interlace video decoding unit 4 is used for decoding the interlace video data from the separating unit 2 and outputting a decoded video signal. The video display 8 is implemented by monitor and display, and used for displaying the decoded video signal as video. Although in a normal digital broadcasting reproducing apparatus, various components other than these, for example, a decoding unit for decoding audio data, are required, they are dispensed with herein.

FIG. 60 shows a structure of the multiplexed data of the digital TV broadcasting according to the prior art digital broadcasting transmitting method. Referring to FIG. 60, video data of PROGRAM NUMBER 1 and 3, service information NIT, PMT (Program Map Table), SDT, and EIT are multiplexed on a packet basis on a frequency of 12.568 GHz. In case of digital data transmission according to MPEG, plural PROGRAMS (corresponding to channels in normal analog broadcasting) are multiplexed and transmitted. These service information is used to select a desired program of a desired PROGRAM from the multiplexed data, and therefore these service information is also multiplexed and transmitted.

Data structures of these packets and the multiplexing are defined in MPEG, and will be described below.

A packet 11 is a packet containing video data of PROGRAM NUMBER 1 (channel 1). Assuming that a packet ID in front of the packet 11 is 0x91, the packet 11 is recognized as a packet of video data of the PROGRAM NUMBER 1 by the receiving end. A packet 12 is a packet containing video data of PROGRAM NUMBER 3 (channel 3). Assuming that a packet ID in front of the packet 12 is 0x93, the packet 12 is recognized as a packet of video data of the PROGRAM NUMBER 3 by the receiving end.

Packets 13~16 are service information packets. The packet 13 is an NIT packet, and defines a frequency on which video data of PROGRAM NUMBERs 1 and 3 is transmitted. In this illustrated example, the video data of PROGRAM NUMBERs 1 and 3 is multiplexed and transmitted on 12.568 GHz. A packet 14 is a PMT (Program Map table) packet, and illustrates that the video data of PROGRAM NUMBER 1 is contained in the packet of packet ID 0x91, and the video data of PROGRAM NUMBER 3 is contained in the packet of packet ID 0x93. A packet 15 is an EIT packet, and in general, there are two types of EIT packets, namely, a PF-EIT packet which contains information about present and following events, and an SC-EIT packet which contains information (schedule) about a relatively long-term (a week) event. The EIT packet 15 herein is SC-EIT packet indicative of schedule, and illustrates that in PROGRAM NUMBER 1, "baseball 1" from 19:00 to 20:00, "quiz" from 20:00 to 21:00, and "western movie" after 21:00, are supposed to be broadcast, and in PROGRAM NUMBER 3, "baseball 1" from 19:00 to 20:00, "soccer" from 20:00 to 21:00, "baseball 2" from 21:00 to 22:00, and "news" after 22:00 are supposed to be broadcast. A packet 16 is an SDT packet, and contains information for each service (PROGRAM) i.e., information indicative of PROGRAM NUMBER, type, and name for identification.

Next, operation of the prior art digital broadcasting transmitting apparatus 100, and the prior art digital broadcasting reproducing apparatus 200 will be described.

Referring to FIG. 59 again, in the digital broadcasting transmitting apparatus 100, the video data packet creating unit 21 creates packets comprising a prescribed amount of data from the interlace video data stored in the interlace video data storage unit 20 as packets of video data of PROGRAM NUMBER 1 and PROGRAM NUMBER 3.

The service information packet creating unit 27 obtains required information from the service information storage unit 26, and creates NIT, PMT, EIT, and SDT as packets of prescribed bit lengths, respectively. The multiplexing means 28 multiplexes these packets as shown in FIG. 60, and the transmitting unit 29 transmits the resulting multiplexed packets.

The multiplexed data is transmitted to the reproducing apparatus of the viewer in micro wave, or by cable, to be utilized by the viewer. In the digital broadcasting reproducing apparatus 200, video data is reproduced as stated below.

The program selecting unit 6a accepts selection by the viewer, and informs the receiving unit 1 of the selected program. The viewer can directly give instructions on PROGRAM NUMBER by switching or inputting number, such as by specifying channels in normal TV. Also, the viewer can select PROGRAM by visual interface using a program table mentioned later.

The receiving unit 1 uses the transmitted NIT to receive signals of a frequency on which the video data of the specified program, i.e., PROGRAM NUMBER is transmitted, in compliance with selection by the viewer. The receiving unit 1 can obtain information contained in an NIT from an arbitrary transmitted signal, since any frequency signal includes a multiplexed NIT of the same contents.

As described above, in the prior art digital broadcasting system using the reproducing apparatus designed for the corresponding network, a network ID is obtained from an NIT of a received transport stream, and only when the network ID indicates the corresponding network, the reproducing apparatus performs processing to the transport stream.

In the receiving apparatus for use in A type system, a network ID and an original network ID of the corresponding transport stream are respectively extracted, to make comparison for them, and only when a match is found between them, receiving processing is performed. On the other hand, in the receiving apparatus for use in B type system, the original network ID is not extracted, or comparison is not made for them, and receiving processing is performed irrespective of contents of information of the original network ID.

Upon start of receiving processing, the receiving unit 1 checks contents of the NIT, to detect a value of frequency on which a signal of video data of a specified PROGRAM NUMBER is transmitted, and then selects frequency.

The separating unit 2 performs separation of the information received by the receiving unit 1 to obtain appropriate video data, on the basis of specification of the program selecting unit 6a. More specifically, where reproduction of video data of PROGRAM NUMBER 1 is specified by the program selecting unit 6a, contents of the PMT are checked to confirm that the packet ID of video data of PROGRAM NUMBER 1 is "0x91" and then a "0x91" packet is extracted and sent to the interlace video decoding unit 4. Likewise, where reproduction of video data of PROGRAM NUMBER 3 is specified by the program selecting unit 6a, contents of the PMT are checked to confirm that the packet ID of video data of PROGRAM NUMBER 3 is "0x93" and then a "0x93" packet is extracted and sent to the interlace video decoding unit 4.

Upon receipt of the video data from the separating unit 2, the interlace video decoding unit 4 decodes the video data by the interlace method, and outputs a decoded video signal to the video display 8, which displays an image of the decoded video signal on a screen.

Audio data is also processed in the same manner, although this is not shown.

Further, in the digital communication system, it is possible that service information added to video and audio data is used to offer information to viewers, or to improve an operation interface. Hereinafter, an example of utilizing the service information will be described.

FIG. 61 shows a prior art digital broadcasting reproducing apparatus having a program table display function and FIG. 62 illustrates a program table displayed on a screen of the apparatus. In the digital broadcasting reproducing apparatus, the schedule information of the EIT in FIG. 60 is separated by the separating unit 2 and processed by a program table creating table 30, and the resulting table is displayed on a screen shown in FIG. 62 in a visualized form. The viewer selects a desired program using a cursor, a remote controller, or the like as he/she likes, by referring to the program table, and the selection is obtained by the program selecting unit 6a.

While only the interlace video data is processed in the aforesaid examples, non-interlace video data can be processed in the same manner, provided that the transmitting apparatus creates and transmits multiplexed data of non-interlace video data, and the reproducing apparatus is provided with a non-interlace video decoding unit in place of the interlace video decoding unit.

With respect to the relationship between the multiplexed data in FIG. 60 and the digital broadcasting system in FIGS. 57(*a*) and 57(*b*), the multiplexed data in FIG. 60 includes no audio data, and is the transport stream in FIG. 57(*a*), and is broadcast over one of the networks in the digital broadcasting system in FIG. 57(*b*).

As thus far described, according to the prior art digital broadcasting system, in the transmitting apparatus, the transmitting method, and the reproducing apparatus, predetermined video data scanning method or service information system is constructed for each network.

Accordingly, one problem associated with the prior art digital broadcasting system is that system extension is not facilitated by the fact that the transmitting apparatus, the transmitting method, and the reproducing apparatus are configured to one scanning method.

As mentioned previously, the interlace method is generally employed in the status quo. In the future, the non-interlace method may be commonly used, and it is therefore possible that both interlace video and non-interlace video are utilized in the same digital broadcasting system. Accordingly, there is an increasing demand for a video reproducing apparatus which reproduces video according to these two methods.

FIGS. 63(*a*) to 63(*c*) show problems with a case where extension is to be performed using the prior art transmitting apparatus, the transmitting method, and the reproducing apparatus.

As shown in FIG. 63(*a*), the prior art digital broadcasting reproducing apparatus is intended for a network 1 using the interlace method. Therefore, system extension is facilitated by adding a transport stream including interlace video data or a network using the interlace video data thereto.

However, in a case where a transport stream TS101 including non-interlace video data is added as shown in FIG. 63(*b*), or a network 2 using the non-interlace video data is added as shown in FIG. 63(*c*), to extend the system, the following problems may occur. Although in the reproducing apparatus intended for an extended network or a new network, existing transport streams and added transport streams can be reproduced correctly, receiving troubles occur caused by using different scanning methods when a conventional reproducing apparatus receives the added transport streams as shown in FIGS. 63(b) and 63(c). The prior art reproducing apparatuses in FIGS. 59 and 61 respectively perform decoding by the interlace method, and therefore cannot perform proper decoding to multiplexed non-interlace video data, and output appropriate video signals.

In addition, even if these two data coexists, no problems may occur so long as viewers select and reproduce only the interlace video data. However, since the program table does not list contents for distinguishing a non-interlace program from an interlace program as shown in FIG. 62, there is a possibility that viewers select a program of a scanning method different from that of a video decoding unit of the reproducing apparatus by mistake. In the prior art reproducing apparatus provided with the interlace video decoding unit, if the viewer selects a non-interlace program, video data cannot be reproduced correctly, causing "flicker" video to be output.

Likewise, in a case where the existing digital broadcasting system is constructed as being a system that uses only the non-interlace video data, similar problems may occur when the interlace video data is used.

In summary, one problem with the prior art system is as follows.

i) To extend the existing digital broadcasting system by addition in the prior art digital broadcasting transmitting method and the digital broadcasting transmitting apparatus, only one of the interlace video data and non-interlace video data is used depending on setting of the system, which causes degree of freedom in program construction of TV broadcasting to be limited.

ii) Since the prior art digital broadcasting reproducing apparatus is provided with one of the interlace video decoding unit and the non-interlace video decoding unit, it is impossible to correctly reproduce a program of a scanning method different from that of a video decoding unit of its own in a system using plural methods.

iii) Since the program table does not list contents for distinguishing the non-interlace program from the interlace program to-be-displayed on a screen, there is a possibility that the viewer selects a program of a scanning method by mistake which cannot be reproduced correctly by the reproducing apparatus in the system using plural methods.

Another problem associated with the prior art digital broadcasting system is that service information transmitting method is predetermined on a fixed basis for each network, to which the transmitting apparatus and the receiving apparatus configure themselves, which makes it difficult to use service information of a different method.

For instance, the schedule information contained in the EIT is handled per segment of a predetermined time. As the predetermined time, 3 hours is assumed to be one segment, and segment numbers are allocated to the corresponding segments in a prescribed manner. Specifically, the segment numbers are allocated every three hours starting with "0", or every day starting with "0". The manner is determined for each network on a fixed basis. For example, in the network 1 in FIG. 57(b), on assumption that 3 hours is one segment, the segment numbers are sequentially allocated to respective segments.

As a consequence, when a service (PROGRAM) often includes long events, and therefore use of a 24 hour segment can create data to-be-transmitted with higher efficiency rather than use of a 3 hour segment, a method different from a method for use by a network to which the service belongs is not employed.

In brief, in the prior art digital broadcasting system, data cannot be used flexibly, which makes it difficult to realize system extension.

SUMMARY OF THE INVENTION

It is an object of the present invention to provide a digital broadcasting transmitting method in which a digital broadcasting system constructed for one of interlace video data and non-interlace video data is extended by addition, a video data scanning method is specified for each network or for each service, and these video data is reproduced correctly in a receiving end, whereby degree of freedom in construction of a program to-be-transmitted is improved.

It is another object of the present invention to provide a digital broadcasting transmitting apparatus which implements the digital broadcasting transmitting method.

It is still another object of the present invention to provide a digital broadcasting reproducing apparatus which receives transmitted data including interlace video data and non-interlace video data, and reproduces these video data correctly, to be displayed, in the extended digital broadcasting system.

It is a further object of the present invention to provide a digital broadcasting reproducing apparatus which identifies a scanning method of a selected program and prevents wrong selection when any of plural programs including interlace video data and non-interlace video data is selected and reproduced, in the extended digital broadcasting system.

It is a still further object of the present invention to provide a digital broadcasting transmitting method, a digital broadcasting transmitting apparatus, and a digital broadcasting reproducing apparatus in which service information transmitted by different methods is available.

Other objects and advantages of the invention will become apparent from the detailed description that follows. The detailed description and specific embodiments described are provided only for illustration since various additions and modifications within the spirit and scope of the invention will be apparent to those skill in the prior art from the detailed description.

According to a first aspect of the present invention, a digital broadcasting transmitting method wherein a transport stream is created and transmitted in a digital broadcasting system in which the transport stream in which plural packets comprising video data packets of digitized video and service information packets of information about broadcasting using the video have been multiplexed, is transmitted over a network, comprises the step of creating and transmitting the transport stream in which the service information include scanning method information as information about a scanning method of digitizing the video.

As a result, in a receiving end, processing is correctly performed using the scanning method information.

According to a second aspect of the present invention, in the digital broadcasting transmitting method of the first aspect, to an existing digital broadcasting system using video digitized by a specified scanning method, a transport stream including a packet of video digitized by another scanning method is added, and the scanning method information included in the service information includes: information for distinguishing a transport stream which belongs to the existing digital broadcasting system from the transport stream to be added; and information for specifying a scanning method of the video of the packet multiplexed into the transport stream to be added.

According to a third aspect of the present invention, in the digital broadcasting transmitting method of the first aspect, the scanning method information includes network scanning method information indicative of a scanning method of video data transmitted over a network as information for each network.

According to a fourth aspect of the present invention, in the digital broadcasting transmitting method of the first aspect, the scanning method information includes transport stream scanning method information indicative of a scanning method of video data included in the transport stream as information for each transport stream.

According to a fifth aspect of the present invention, in the digital broadcasting transmitting method of the first aspect, the scanning method information is contained in an network information table indicative of network information, of the service information.

According to a sixth aspect of the present invention, in the digital broadcasting transmitting method of the fifth aspect, the scanning method information is included in an original network identifier contained in the network information table, indicative of an original network over which a transport stream must be transmitted.

According to a seventh aspect of the present invention, in the digital broadcasting transmitting method of the fifth aspect, the scanning method information is included in a network identifier contained in the network information table, indicative of a network over which a transport stream is transmitting.

According to an eighth aspect of the present invention, in the digital broadcasting transmitting method of the seventh aspect, information indicative of a network over which a transport stream is transmitted is included in a network name given to the network, contained in the network information table.

According to a ninth aspect of the present invention, in the digital broadcasting transmitting method of the first aspect, in the digital broadcasting system, a service comprises one or more programs, and the scanning method information includes service scanning method information indicative of the scanning method of the video data as information for each service.

According to a tenth aspect of the present invention, in the digital broadcasting transmitting method of the ninth aspect, the service scanning method information is contained in a network information table indicative of network information.

According to an eleventh aspect of the present invention, in the digital broadcasting transmitting method of the tenth aspect, the service scanning method information is included in a service type in a service list descriptor contained in the network information table, indicative of a service to be offered by a network.

According to a twelfth aspect of the present invention, in the digital broadcasting transmitting method of the tenth aspect, the service scanning method information is included in a service identifier in a service list descriptor contained in the network information table, indicative of a service to be offered by a network.

According to a thirteenth aspect of the present invention, in the digital broadcasting transmitting method of the twelfth aspect, information for specifying a service is included in a service name in the service list descriptor.

According to a fourteenth aspect of the present invention, in the digital broadcasting transmitting method of the ninth aspect, the service scanning method information is contained in a service description table indicative of service information of a transport stream.

According to a fifteenth aspect of the present invention, in the digital broadcasting transmitting method of the fourteenth aspect, the service scanning method information is included in a service type in a service list descriptor contained in the service description table, indicative of a service to be offered by a transport stream.

According to a sixteenth aspect of the present invention, in the digital broadcasting transmitting method of the fourteenth aspect, the service scanning method information is included in a service identifier in a service list descriptor contained in the service description table, indicative of a service to be offered by a transport stream.

According to a seventeenth aspect of the present invention, in the digital broadcasting transmitting method of the sixteenth aspect, information for specifying a service is included in a service name in the service list descriptor.

According to an eighteenth aspect of the present invention, in the digital broadcasting transmitting method of the first aspect, in the digital broadcasting system, plural programs are transmitted, and the scanning method information includes program scanning method information indicative of the scanning method of the video data as information for each program.

According to a nineteenth aspect of the present invention, in the digital broadcasting transmitting method of the eighteenth aspect, the program scanning method information is contained in an event information table indicative of program information.

According to a twentieth aspect of the present invention, in the digital broadcasting transmitting method of claim of the nineteenth aspect, the program scanning method information is included in an event list descriptor contained in the event information table.

According to a 21st aspect of the present invention, a digital broadcasting transmitting method wherein a transport stream is created and transmitted in a digital broadcasting system in which the transport stream in which plural packets comprising video data packets of digitized video and service information packets of information about broadcasting using the video have been multiplexed, is transmitted over a network, comprises:

creating and transmitting the transport stream in which the service information includes an event information table indicative of program information and transmitting method information of the event information table.

According to a 22nd aspect of the present invention, in the digital broadcasting transmitting method of the 21st aspect, the transmitting method information of the event information table is contained in a network information table indicative of network information.

According to a 23rd aspect of the present invention, in the digital broadcasting transmitting method of the 22nd aspect, the transmitting method information of the event information table is included in an event information table type identifier in a descriptor contained in the network information table, and specifies the transmitting method of the event information table for each network.

According to a 24th aspect of the present invention, in the digital broadcasting transmitting method of the 22nd aspect, the transmitting method information of the event information table is included in an event information table type identifier in a transport stream descriptor contained in the network information table, indicative of a transport stream to be offered by a network, and specifies the transmitting method of the event information table for each transport stream.

According to a 25th aspect of the present invention, in the digital broadcasting transmitting method of the 22nd aspect, the transmitting method information of the event information table is included in an event information table type identifier in a service list descriptor contained in the network information table, indicative of a service to be offered by a network, and specifies the transmitting method of the event information table for each service.

According to a 26th aspect of the present invention, in the digital broadcasting transmitting method of the 21st aspect, the transmitting method information of the event information table is contained in a service description table indicative of service information of a transport stream.

According to a 27th aspect of the present invention, in the digital broadcasting transmitting method of the 26th aspect, the transmitting method information of the event information table is included in an event information table type identifier in a service list descriptor contained in the service description table, indicative of a service included in a transport stream, and specifies the transmitting method of the event information table for each service.

According to a 28th aspect of the present invention, a digital broadcasting transmitting apparatus which creates and transmits a transport stream in a digital broadcasting system in which the transport stream in which plural packets comprising video data packets of digitized video and service information packets of information about broadcasting using the video have been multiplexed, is transmitted over a network, comprises:

a non-interlace video data packet creating unit for creating a non-interlace video data packet from non-interlace video data in which video is digitized by a non-interlace method; an interlace video data packet creating unit for creating an interlace video data packet from interlace video data in which video is digitized by an interlace method; a service information packet from service information including scanning method information for digitizing the video; a multiplexing unit for multiplexing the non-interlace video data packet, the interlace video data packet, and the service information packet, to create a transport stream; and a transmitting unit for transmitting the transport stream created by the multiplexing unit to a network.

As a result, in a receiving end, processing is correctly performed using the scanning method information.

According to a 29th aspect of the present invention, in the digital broadcasting transmitting apparatus of the 28th aspect, to an existing digital broadcasting system using video digitized by a specified scanning method, a transport stream including a packet of video digitized by another scanning method is added, and the service information packet creating unit creates the service information packet in which the scanning method information includes: information for distinguishing a transport stream which belongs to the existing digital broadcasting system from the transport stream to be added; and information for specifying a scanning method of video of a packet multiplexed into the transport stream to be added.

According to a 30th aspect of the present invention, in the digital broadcasting transmitting apparatus of the 28th aspect, the service information packet creating unit gives network scanning method information indicative of a scanning method of video data transmitted over a network as information for each network, as the scanning method information.

According to a 31st aspect of the present invention, in the digital broadcasting transmitting apparatus of 28th aspect, the service information packet creating unit gives transport stream scanning method information indicative of a scanning method of video data included in the transport stream as information for each transport stream, as the scanning method information.

According to a 32nd aspect of the present invention, in the digital broadcasting transmitting apparatus of the 28th aspect, the service information packet creating unit gives the scanning method information to a network information table packet indicative of network information, of the service information.

According to a 33rd aspect of the present invention, in the digital broadcasting transmitting apparatus of the 32nd aspect, the service information packet creating unit gives the scanning method information to an original network identifier contained in the network information table packet, indicative or an original network over which a transport stream must be transmitted.

According to a 34th aspect of the present invention, in the digital broadcasting transmitting apparatus of the 32nd aspect, the service information packet creating unit gives the scanning method information to a network identifier contained in the network information table packet, indicative of a network over which a transport stream is transmitted.

According to a 35th aspect of the present invention, in the digital broadcasting transmitting apparatus of the 34th aspect, the service information packet creating unit gives information for specifying a network to a network name contained in the network information table packet, indicative of a name given to the network.

According to a 36th aspect of the present invention, in the digital broadcasting transmitting apparatus of the 28th aspect, in the digital broadcasting system, a service comprises one or more programs, and the service information packet creating unit gives the scanning method information including service scanning method information indicative of the video data scanning method as information for each service.

According to a 37th aspect of the present invention, in the digital broadcasting transmitting apparatus of the 36th aspect, the service information packet creating unit gives the service scanning method information to a network information table packet indicative of network information.

According to a 38th aspect of the present invention, in the digital broadcasting transmitting apparatus of the 37th aspect, the service information packet creating unit gives the service scanning method information to a service type in a service list descriptor contained in the network information table packet, indicative of a service to be offered by a network.

According to a 39th aspect of the present invention, in the digital broadcasting transmitting apparatus of the 37th aspect, the service information packet creating unit gives the service scanning method information to a service identifier in a service list descriptor contained in the network information table packet, indicative of a service to be offered by a network.

According to a 40th aspect of the present invention, in the digital broadcasting transmitting apparatus of the 39th aspect, the service information packet creating unit gives information for specifying a service to a service name in the service list descriptor.

According to a 41st aspect of the present invention, in the digital broadcasting transmitting apparatus of the 36th aspect, the service information packet creating unit gives the service scanning method information to a service description table packet indicative of service information of a transport stream.

According to a 42nd aspect of the present invention, in the digital broadcasting transmitting apparatus of the 41st aspect, the service information packet creating unit gives the service scanning method information to a service type in a service list descriptor contained in the service description table packet, indicative of a service to be offered by a transport stream.

According to a 43rd aspect of the present invention, in the digital broadcasting transmitting apparatus of the 41st aspect, the service information packet creating unit gives the service scanning method information to a service identifier in a service list descriptor contained in the service description table packet, indicative of a service to be offered by a transport stream.

According to a 44th aspect of the present invention, in the digital broadcasting transmitting apparatus of the 43rd aspect, the service information packet creating unit gives information for specifying a service to a service name in the service list descriptor.

According to a 45th aspect of the present aspect, in the digital broadcasting transmitting apparatus of the 28th aspect, in the digital broadcasting system, plural programs are transmitted, and the service information packet creating unit creates the scanning method information including program scanning method information as information indicative of a scanning method of the video data for each program.

According to a 46th aspect of the present invention, in the digital broadcasting transmitting apparatus of the 45th aspect, the service information packet creating unit gives the program scanning method information to an event information table packet indicative of program information.

According to a 47th aspect of the present invention, in the digital broadcasting transmitting apparatus of the 46th aspect, the service information packet creating unit gives the program scanning method information to an event list descriptor contained in the event information table packet.

According to a 48th aspect of the present invention, a digital broadcasting transmitting apparatus which creates and transmits a transport stream in a digital broadcasting system in which the transport stream in which plural packets comprising video data packets of digitized video and service information packets of information about broadcasting using the video have been multiplexed, is transmitted over a network, comprises:

a non-interlace video data packet creating unit for creating a non-interlace video data packet from non-interlace video data in which video is digitized by a non-interlace method; an interlace video data packet creating unit for creating an interlace video data packet from interlace video data in which video is digitized by an interlace method; a service information packet creating unit for creating a service information packet containing an event information table indicative of program information and transmitting method information of the event information table; a multiplexing unit for multiplexing the non-interlace video data packet, the interlace video data packet, and the service information packet, to create a transport stream; and a transmitting unit for transmitting the transport steam created by the multiplexing unit to a network.

According to a 49th aspect of the present invention, in the digital broadcasting transmitting apparatus of the 48th aspect, the service information packet creating unit gives the transmitting method information of the event information table to a network information table packet indicative of network information.

According to a 50th aspect of the present invention, in the digital broadcasting transmitting apparatus of the 49th aspect, the service information packet creating unit gives the transmitting method information of the event information table for specifying a transmitting method for each network to an event information table type identifier in a descriptor contained in the network information table packet.

According to a 51st aspect of the present invention, in the digital broadcasting transmitting apparatus of the 49th aspect, the service information packet creating unit gives the transmitting method information of the event information table for specifying a transmitting method for each transport stream to an event information table type identifier in a transport stream list descriptor contained in the network information table packet, indicative of a transport stream to be offered by a network.

According to a 52nd aspect of the present invention, in the digital broadcasting transmitting apparatus of the 49th aspect, the service information packet creating unit gives the transmitting method information of the event information table for specifying the transmitting method of the event information table for each service, to an event information table type identifier in a service list descriptor contained in the network information table packet, indicative of a service to be offered by a network.

According to a 53rd aspect of the present invention, in the digital broadcasting transmitting apparatus of the 48th aspect, the service information packet creating unit gives the transmitting method information of the event information table to a service description table packet indicative of service information of a transport stream.

According to a 54th aspect of the present invention, in the digital broadcasting transmitting apparatus of the 53rd aspect, the service information packet creating unit gives the transmitting method information of the event information table for specifying the transmitting method of the event information table for each service to an event information table type identifier in a service list descriptor contained in the service description table packet, indicative of a service given to a transport stream.

According to a 55th aspect of the present invention, a digital broadcasting reproducing apparatus which receives a transport stream and reproduce video from video data using service information in a digital broadcasting system in which the transport stream in which plural packets comprising video data packets of digitized video and service information packets of information about broadcasting using the video have been multiplexed, is transmitted over a network, comprises:

a receiving unit for receiving multiplexed data as the transport stream; a separating unit for extracting video data and service information from the multiplexed data received by the receiving unit; a service selecting unit for accepting selection of video data by an operator and informing said separating unit of video data to be extracted; an identification information storage unit for storing identification information about a video data scanning method, of the service information separated and extracted by said separating unit;

a non-interlace video decoding unit for decoding non-interlace video data separated and extracted by the separating unit, and outputting a decoded signal;

an interlace video decoding unit for decoding interlace video data separated and extracted by the separating unit, and outputting a decoded signal; and a scanning method instructing unit for deciding a scanning method of the video data selected by the operator on the basis of the information stored in said identification information storage unit, and giving an instruction for decoding to one of said non-interlace video decoding unit and said interlace video decoding unit on the basis of the decision.

As a result, the apparatus obtains scanning method information included in the service information, and perform reproduction according to the corresponding scanning method.

According to a 56th aspect of the present invention, in the digital broadcasting reproducing apparatus of the 55th aspect further comprises an identification information decision unit for instructing said separating unit to separate and extract information required for program creation from the received multiplexed data on the basis of the information stored in said identification information storage unit; a program table storage unit for storing information required for program creation which has been separated and extracted by said separating unit in accordance with the instruction from said identification information decision unit; and a program table creating unit for creating a program table in the digital broadcasting system on the basis of the information stored in said program table storage unit.

As a result, the program table is displayed appropriately using program table information included in the service information.

According to a 57th aspect of the present invention, in the digital broadcasting reproducing apparatus of the 56th aspect, the identification information storage unit stores information for specifying a scanning method of the video data of the service information which is multiplexed into the transport stream and transmitted, and the identification information decision unit instructs said separating unit to separate and extract the information required for program creation and the information for specifying the scanning method from the received multiplexed data on the basis of the information stored in said identification information storage unit; and the program table creating unit creates the program table including the scanning method information.

According to a 58th aspect of the present invention, in the digital broadcasting reproducing apparatus of the 56th aspect, the identification information storage unit stores transmitting method information of an event information table which specifies the transmitting method of the event information table of the service information which is multiplexed into the transport stream and transmitted, and the identification information decision unit instructs said separating unit to separate and extract information required for program creation from the received multiplexed data on the basis of the transmitting method information of the event information table stored in said identification information storage unit.

BRIEF DESCRIPTION OF THE DRAWINGS

FIGS. 11(a) and 11(b) are diagrams illustrating examples of scanning method ID code allocation in the digital broadcasting transmitting method according to the second example of the second embodiment.

FIG. 19 is a diagram illustrating an example of scanning method ID code allocation in the digital broadcasting transmitting method according to the fourth embodiment.

FIG. 20 is a diagram illustrating an NIT and an EIT transmitted in the digital broadcasting transmitting method according to the fourth embodiment.

FIGS. 35(a) and 35(b) are diagrams for explaining extension of program construction by a digital broadcasting transmitting method according to the eighth embodiment.

FIGS. 46(a)–46(c) are diagrams illustrating examples of program table display screens of the digital broadcasting reproducing apparatus according to the tenth embodiment.

FIGS. 48(a) and 48(b) are diagrams illustrating examples of program table display screens of the digital broadcasting reproducing apparatus according to the tenth embodiment.

FIG. 55 is a diagram illustrating an NIT and an SDT (service description table) transmitted in the digital broadcasting transmitting method according to the twelfth embodiment.

FIG. 56 is a diagram illustrating an NIT and an SDT transmitted in a digital broadcasting transmitting method according to a thirteenth embodiment of the invention.

FIG. 57(a) is a diagram for explaining multiplexing of data and generation of a transport stream in a conventional digital broadcasting, and FIG. 57(b) is a diagram for explaining networks and transport streams.

FIGS. 63(*a*)–63(*c*) are diagrams for explaining problems in extending a digital broadcasting system according to the prior art.

DETAILED DESCRIPTION OF THE PREFERRED EMBODIMENTS

Now, preferred embodiments of the present invention will be described with reference to figures.

Embodiment 1

A digital broadcasting transmitting method according to a first embodiment of the present invention is characterized in that an original network ID has network scanning method information indicative of a scanning method of video data transmitted over a network as information for each network.

In this embodiment, a digital broadcasting transmitting method, a digital broadcasting transmitting apparatus, and a digital broadcasting reproducing apparatus are illustrated, in which a transport stream or a network using data of a different scanning method is added to an existing system constructed for video data of a single scanning method, to extend the system. First, constructions of the digital broadcasting transmitting apparatus and reproducing apparatus will be described with reference to FIG. 1.

Figure 1:
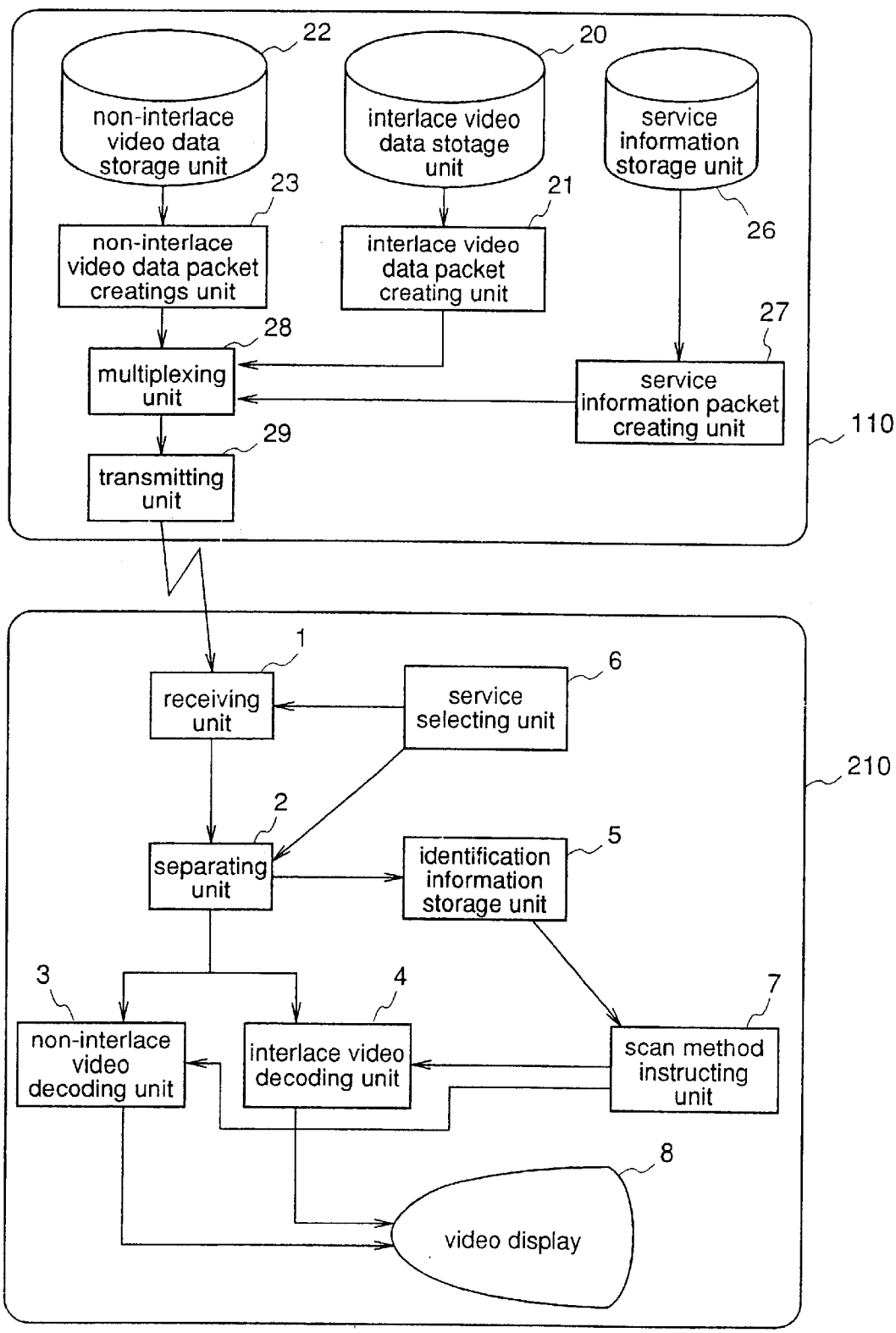
FIG. 1 is a block diagram illustrating a digital broadcasting transmitting apparatus and a digital broadcasting reproducing apparatus according to a first embodiment of the invention.

FIG. 1 shows a digital broadcasting transmitting apparatus, and a digital broadcasting reproducing apparatus of the first embodiment referred to herein by reference numerals 110 and 210, respectively.

The digital broadcasting transmitting apparatus 110 comprises an interlace video data storage unit 20, an interlace video data packet creating unit 21, a non-interlace video data storage unit 22, a non-interlace video data packet creating unit 23, a service information storage unit 26, a service information packet creating unit 27, a multiplexing unit 28, and a transmitting unit 29. More specifically, the interlace video data storage unit 20 is used for storing interlace video data. The interlace video data packet creating unit 21 is used for creating packets-to-be-transmitted from the video data stored in the interlace video data storage unit 20. The non-interlace video data storage unit 22 is used for storing the non-interlace video data. The non-interlace video data packet creating unit 23 is used for creating packets-to-be-transmitted from the video data stored in the non-interlace video data storage unit 22. The service information storage unit 26 is used for storing information about transmitted data which is added to multiplexed data to-be-transmitted. The service information packet creating unit 27 is used for creating packets to-be-transmitted from the information stored in the service information storage unit 26. The multiplexing unit 28 is used for multiplexing the packets of the interlace video data, the packets of the non-interlace video data, and the packets of the service information, to create multiplexed data to-be-transmitted. The transmitting unit 29 is used for transmitting the multiplexed data from the multiplexing unit 28.

Figure 59:
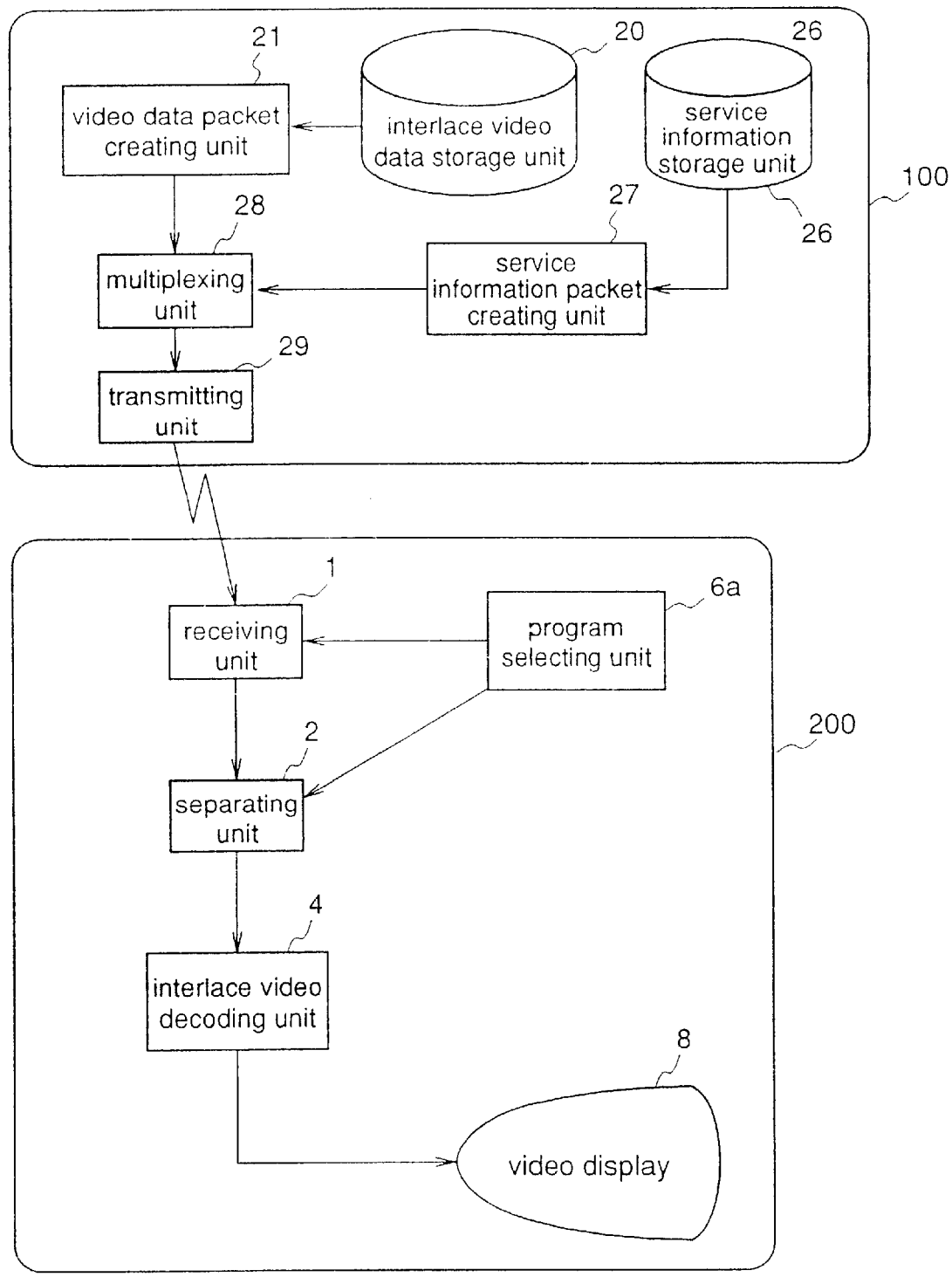
FIG. 59 is a block diagram illustrating a digital broadcasting transmitting apparatus and a digital broadcasting reproducing apparatus according to the prior art.
Figure 60:
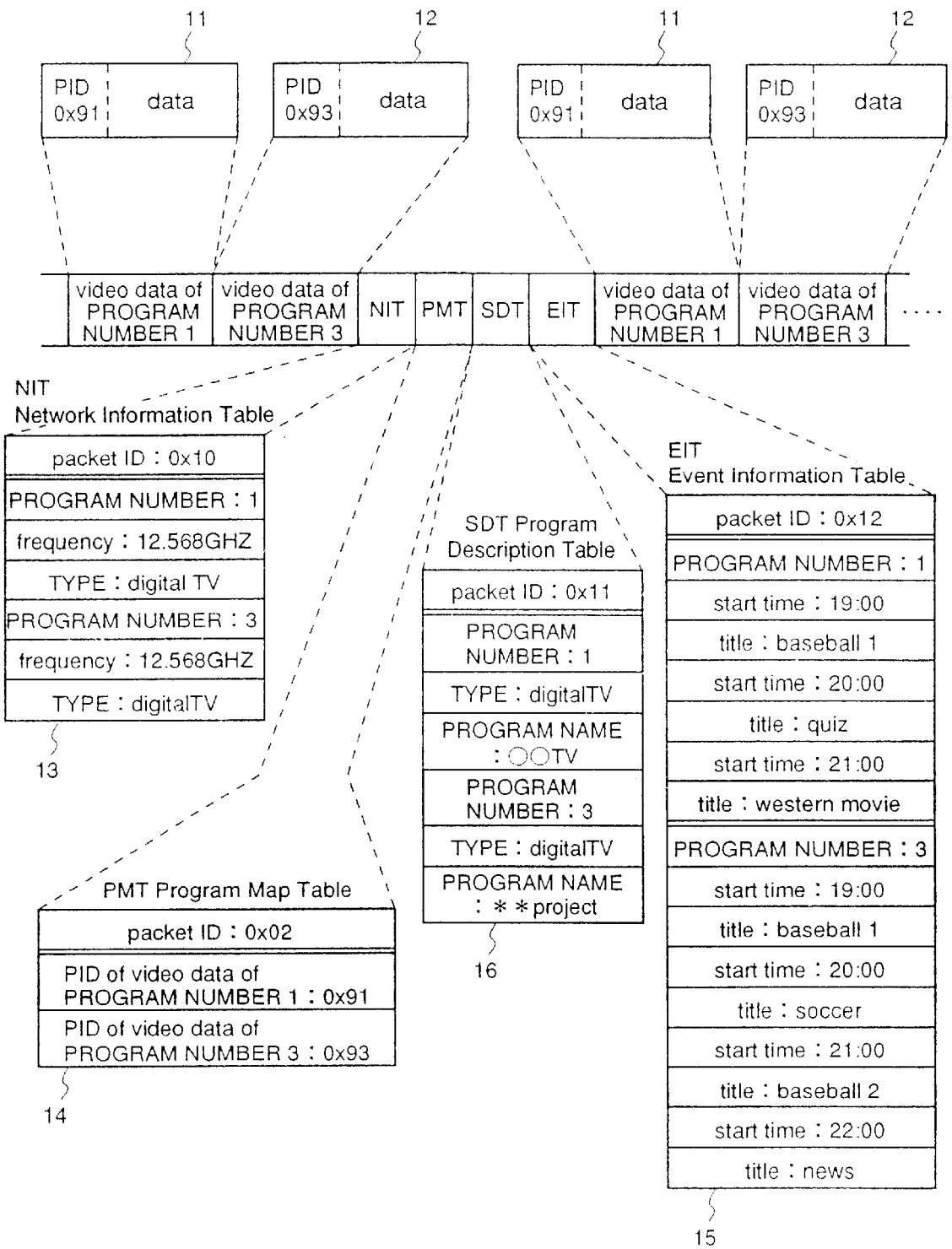
FIG. 60 is a diagram illustrating the structure of a transport stream (multiplexed data) transmitted in a digital broadcasting transmitting method according to the prior art.
Figures 61, 62:
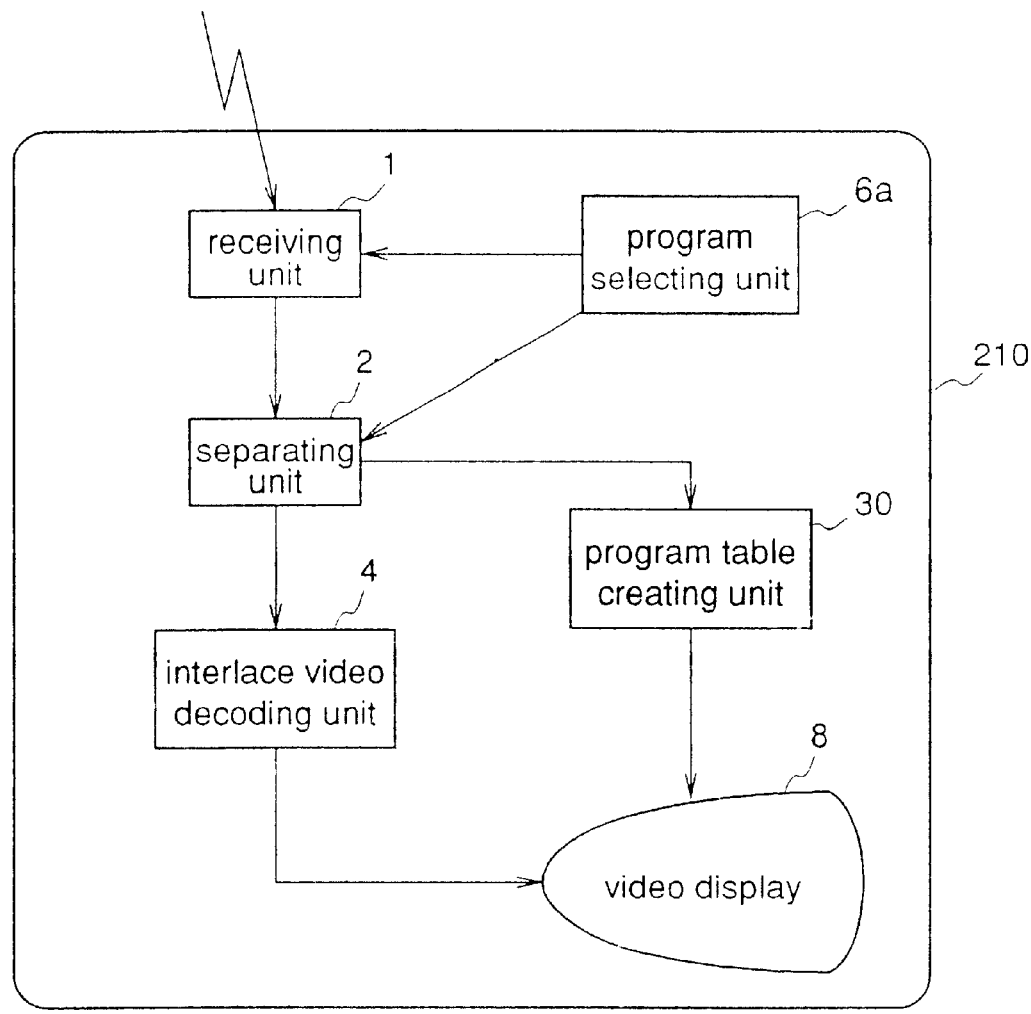
FIG. 61 is a block diagram illustrating a digital broadcasting reproducing apparatus having program table display function according to the prior art.
FIG. 62 is a diagram illustrating a program table displayed on a display screen in the digital broadcasting reproducing apparatus according to the prior art.

Thus, in the digital broadcasting transmitting apparatus 110 of this embodiment, the non-interlace video data storage unit 22 and the non-interlace video data packet creating unit 23 are added to the prior art transmitting apparatus in FIG. 59. Also, as in the case of the prior art example, packeting audio data and multiplexing packeted audio data will not be described for simplicity.

The digital broadcasting reproducing apparatus 210 comprises a receiving unit 1, a separating unit 2, a non-interlace video decoding unit 3, an interlace video decoding unit 4, an identification information storage unit 5, a service selecting unit 6, a scanning method instructing unit 7, and a video display 8. More specifically, the receiving unit 1 is used for receiving the transmitted multiplexed data as a transport stream. The separating unit 2 is used for separating video data or required information from the multiplexed data received by the receiving unit 1. The non-interlace video decoding unit 3 is used for decoding the non-interlace video data separated by the separating unit 2 and outputting a decoded video signal. The interlace video decoding unit 4 is used for decoding the interlace video data separated by the separating unit 2 and outputting a decoded video signal. The identification information storage unit 5 is used for storing scanning method information of the video data separated by the separating unit 2. The service selecting unit 6 is used for accepting program selection of the viewer and informing the receiving unit 1 and the separating unit 2 of the program selected by the viewer, and a remote controller for program selection, a TV channel button, a mouse for personal computers, and so forth are used for input, as in the case of the program selecting unit 6*a* of the prior art example. The scanning method instructing unit 7 is used for giving a instruction on whether the video data separated by the separating unit 2 will be decoded by the non-interlace video decoding unit 3 or the interlace video decoding unit 4, to the unit 3 or the unit 4, respectively, on the basis of the scanning method information stored in the identification information storage unit 5. The video display 8 is implemented by monitor and display, and used for displaying the decoded video signal as video.

Thus, in the digital broadcasting reproducing apparatus 210 of this embodiment, the non-interlace video decoding unit 3, the identification information storage unit 5, and the scanning method instructing unit 7 are added to the prior art reproducing apparatus in FIG. 59. Also, as in the case of the prior art example, a decoding unit for audio data and so forth will not be described for simplicity.

Figure 2:
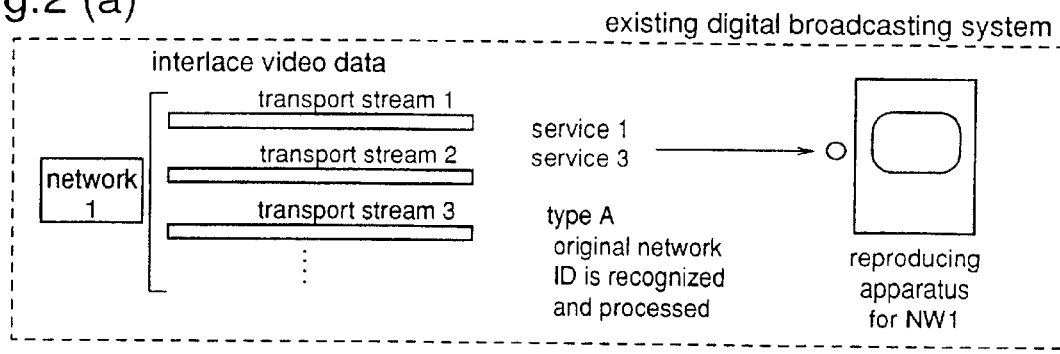
FIGS. 2(a)–2(c) are diagrams for explaining the relationship between a digital broadcasting system according to the first embodiment and the existing digital broadcasting system.
Figure 2:
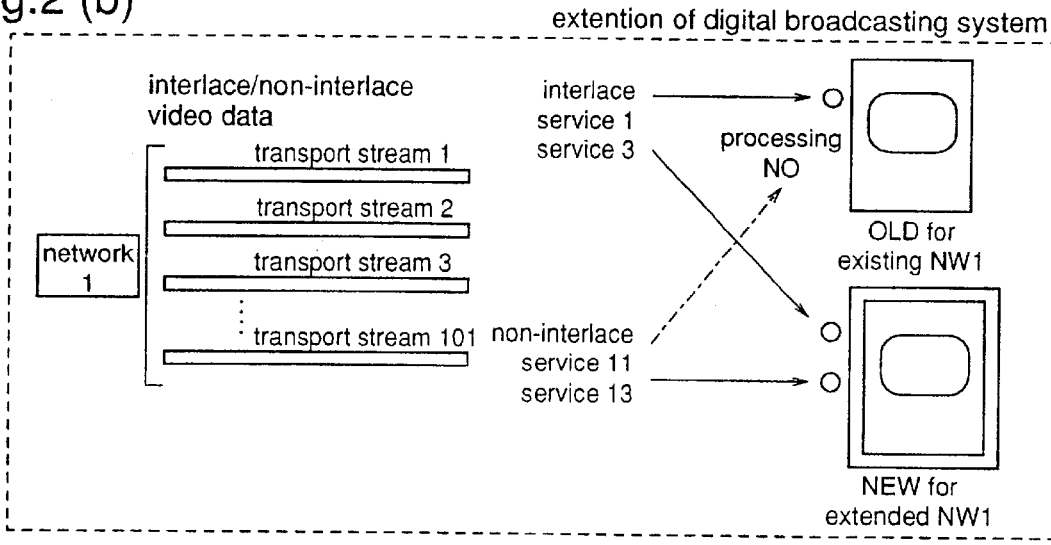
Figure 2:
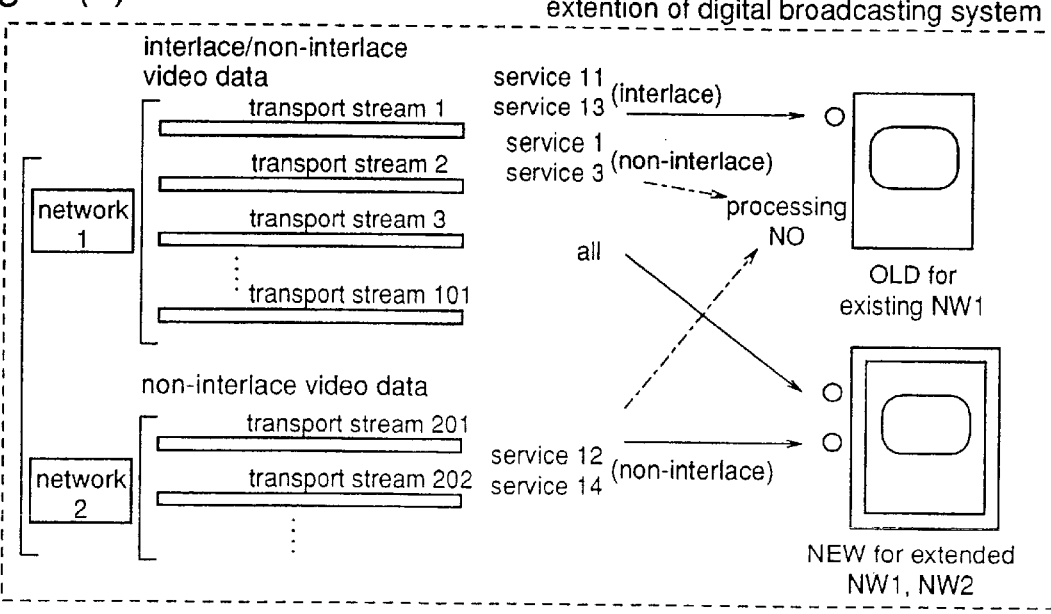

FIG. 2(*a*) shows a digital broadcasting system using only interlace video data, and FIGS. 2(*b*) and 2(*c*) show addition/extension in which non-interlace video data is used. The system extension can be performed by transmitting non-interlace video data over an existing network 1 (see FIG. 2(*b*)), and by adding a network using services including the non-interlace video data (see FIG. 2(*c*)).

The system extension in FIG. 2(*b*) will now be described. Assume that the existing system includes services 1 and 3 (corresponding to PROGRAM 1 and PROGRAM 3 in the prior art example), and system extension is performed by adding services 11 and 13 using only the non-interlace video data.

Also assume that in the existing system, A. In an receiving end, normal receiving and processing is carried out only when an original network ID is recognized, and is identical to a network ID as in the prior art example. Use of the original network ID allows video data of a different scanning method to be used in an extended digital broadcasting system without adversely affecting the reproducing apparatus only for the existing system.

Figure 3:
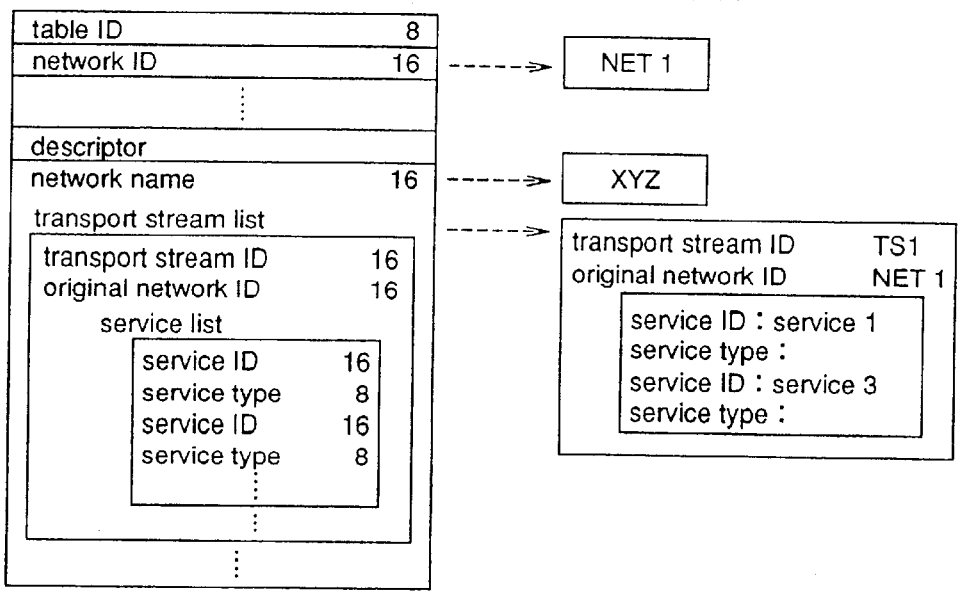
FIGS. 3(a) and 3(b) are diagrams each illustrating an NIT (network information table) transmitted in the digital broadcasting transmitting method according to the first embodiment.
Figure 3:
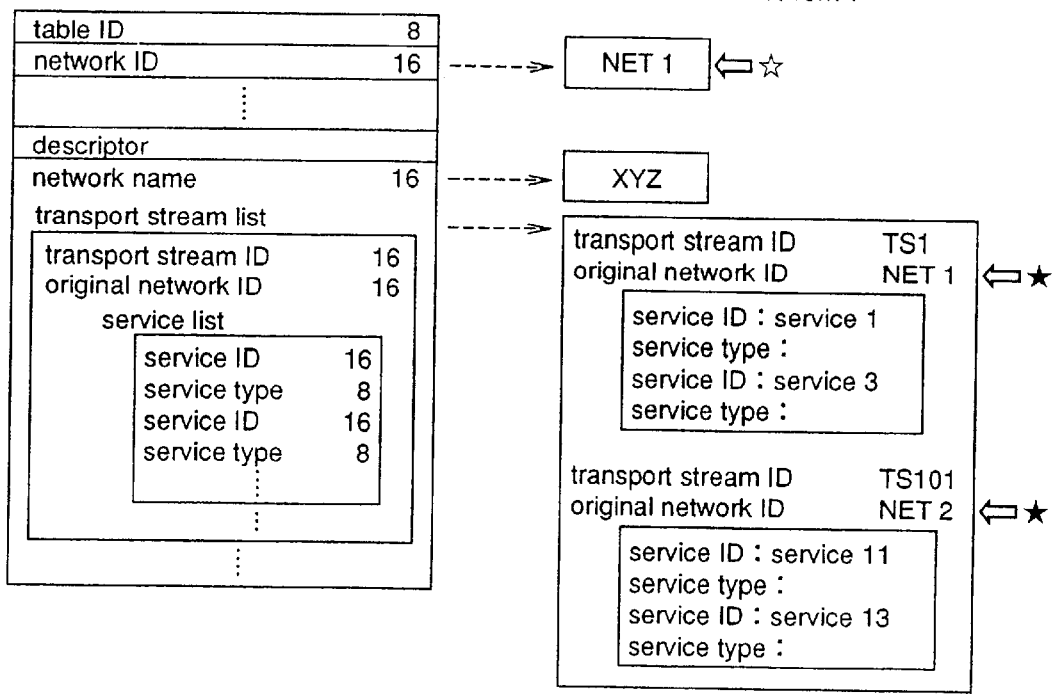

FIGS. 3(a) and 3(b) show NIT for use in the first embodiment, and FIGS. 4(a) and 4(b) show transport streams TS1 and TS101 to-be-transmitted in the extended digital broadcasting system. As in the prior art example, the transport stream is multiplexed data consisting of video data packets and packets of various types of service information.

In the NIT in FIG. 3(a), a network ID, and an original network ID, i.e., information about a transport stream TS1, are "NET 1", and therefore the TS1 is received and processed by the reproducing apparatus (OLD) for the existing network 1 in FIG. 2. On the other hand, in the NIT in FIG. 3(b), a transport stream TS1 is identical to the above-described transport stream TS1, but to a transport stream TS101, an original network ID "NET 2" different from a network ID "NET 1" is given, and therefore the transport stream TS101 is not processed by the OLD if received. Thus, using the NIT packet in FIG. 3(b), the transport stream TS101 cannot be processed by the reproducing apparatus OLD.

The transport streams TS1 and TS101 in FIGS. 4(a) and 4(b) are respectively multiplexed data including the NIT in FIG. 3(b). Video data packet of each service is identified by packet ID PID in front of each packet as in the prior art example. With respect to the service information packets, the NIT packet contains information about a network and a transport stream as mentioned previously, in addition to a frequency band as in the prior art example. A PMT packet contains PID of video data of each service as in the prior art example, which is used along with the PID of the video data packet to extract video data packets. An EIT (Event Information Table) packet contains information about events (programs) to-be-broadcast by each service as in the prior art example. An SDT (Service Description Table) packet contains information for each service. The service information packets are identified by their respective packet identifiers ID in front of respective packets as in the prior art example. It should be noted that the packet identifiers ID in the figures are only illustrative, and not restricted thereto so long as they may be given to respective packets to-be-identified.

Next, operation of the digital broadcasting transmitting apparatus and the reproducing apparatus of this embodiment (1) "CREATION AND TRANSMISSION OF MULTI-PLEXED DATA OF DIGITAL BROADCASTING TRANSMITTING APPARATUS", and (2) "REPRODUCTION OF DIGITAL BROADCASTING REPRODUCING APPARATUS" will be described.

(1) Creation and Transmission of Multiplexed Data of Digital Broadcasting Transmitting Apparatus Referring to FIG. 1 again, the interlace video data packet creating unit 21 obtains video data required for program creation of services 1 and 3 from the interlace video data storage unit 20 to create interlace video data packets and outputs the interlace video data packets to the multiplexing unit 28.

The non-interlace video data packet creating unit 23 obtains video data required for program creation of services 11 and 13 from the non-interlace video data storage unit 22 to create non-interlace video data packets and outputs the non-interlace video data packets to the multiplexing unit 28.

The service information packet creating unit 27 creates the NIT packet in FIG. 3(b) by setting an original network ID of TS1 to be "NET 1" and an original network ID of TS101 to be "NET 2" for each transport stream in a transport stream list in the NIT packet. The other service information packets are created as already described in the prior art example. The service information packet creating unit 27 outputs all the service information packets to the multiplexing unit 28.

The multiplexing unit 28 multiplexes the video data packets and the service information packets in fixed sizes, respectively, to create multiplexed data including video data of services 1 and 3 in FIG. 4(a), and multiplexed data including video data of services 11 and 13 in FIG. 4(b) and outputs these multiplexed data to the transmitting unit 29, which transmits these multiplexed data as transport streams TS1 and TS101 over the network 1 (see FIG. 2).

(2) Reproduction of Digital Broadcasting Reproducing Apparatus

The transport streams TS1 and TS101 are received and processed (including decoding) by the reproducing apparatus 201, to reproduce and display video. Here, the viewer can utilize broadcast video.

Figure 5:
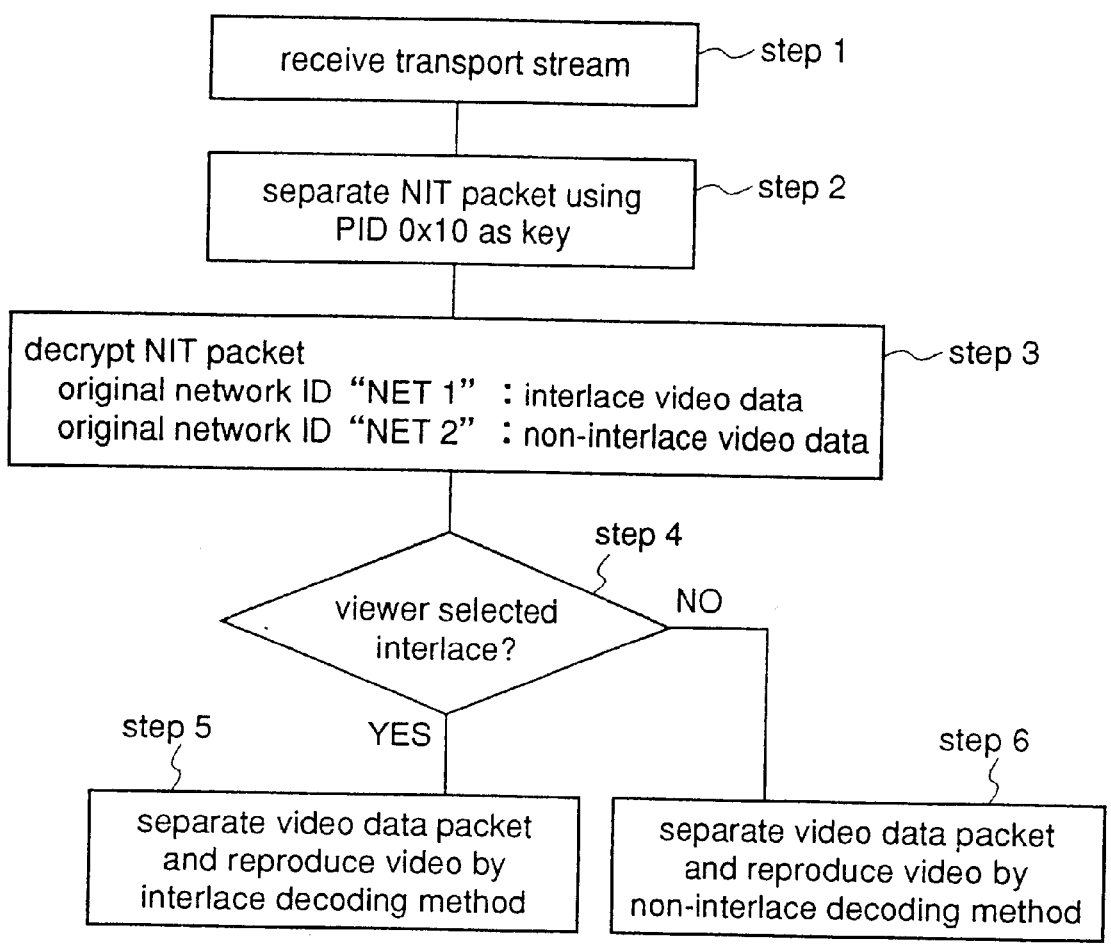
FIG. 5 is a flowchart for explaining the operation of the digital broadcasting reproducing apparatus according to the first embodiment.

FIG. 5 is a flowchart showing processing procedure of the reproducing apparatus 210 after receiving the transport streams. Hereinafter, operation of the reproducing apparatus 210 will be described following flow in FIG. 5. Assume that the reproducing apparatus 210 is for the extended system in FIG. 2(b) (expressed as "NEW").

In step 1, the receiving unit 1 receives the transport stream, i.e., multiplexed data transmitted over the network 1, and passes the multiplexed data to the separating unit 2. In step 2, the separating unit 2 separates the NIT packet using packet ID 0x10 as a key for extraction. In step 3, the NIT packet is decrypted to obtain scanning method information of video data from the information of the original network ID.

In a case where the transport stream TS1 in FIG. 4(a) is received, since the original network ID of TS1 is "NET 1" from the contents of the NIT in FIG. 3(b), it is decided that the video data is interlace video data. Likewise, in a case where the transport stream TS101 in FIG. 4(b) is received, since the original network ID of TS101 is "NET 2", it is decided that the video data is non-interlace video data. The scanning method information obtained in step 3 is stored in the identification information storage unit 5. As in the case of the prior art example, the packet ID of video data included in the PMT packet is also separated by the separating unit 2 and stored in the identification information storage unit 5.

The service selecting unit 6 accepts selection by the viewer using a remote controller, channel, and so forth, as selection of service number as in the case of the prior art example. In step 4, decision on the selection is made.

Where the service 1 or 3 is selected, it is decided that the service 1 or 3 is an interlace service since it is included in the transport stream TS1 and based on the information of the NIT stored in the identification information storage unit 5. Where the service 11 or 13 is selected, it is decided that the service 11 or 13 is a non-interlace service since it is included in the transport stream TS101. Based on the decision in step 4, step 5 is performed to the interlace service, and step 6 is performed to the non-interlace service.

In step 5, the service selecting unit 6 instructs the separating unit 2 to obtain the scanning method information of the service 1 or 3 and the packet ID from the identification information storage unit 5, separate and extract the corresponding video data packet, and output the video data packet to the interlace video data decoding unit 4. In accordance with the instruction, the separating unit 2 outputs the extracted video data packet to tho interlace video decoding unit 4. The scanning method instructing unit 7 instructs the interlace video decoding unit 4 to perform decoding on the basis of the information from the identification storage unit 5. The interlace video decoding unit 4 decodes the video data packet, and the resulting video is displayed by the video display 8.

In step 6, the service selecting unit 6 instructs the separating unit 2 to obtain the scanning method information of the service 11 or 13 and the packet ID from the identification information storage unit 5, separate and extract the corresponding video data packet, and output the video data packet to the non-interlace video data decoding unit 3. In accordance with the instruction, the separating unit 2 outputs the extracted video data packet to the non-interlace video decoding unit 3. The scanning method instructing unit 7 instructs the non-interlace video decoding unit 3 to perform decoding on the basis of the information from the identification storage unit 5. The non-interlace video decoding unit 3 decodes the video data packet, and the resulting video is displayed by the video display 8.

The operation described above is performed in the reproducing apparatus NEW in FIG. 2(b), whereas in the reproducing apparatus OLD in FIG. 2(b), the transport stream TS 101 is not processed as mentioned previously. This circumvents troubles (flicker) caused by processing inappropriate video data.

In the cases of (1) and (2), addition/extension in FIG. 2(b) has been described. Addition/extension in FIG. 2(c) will now be described.

Figure 6:
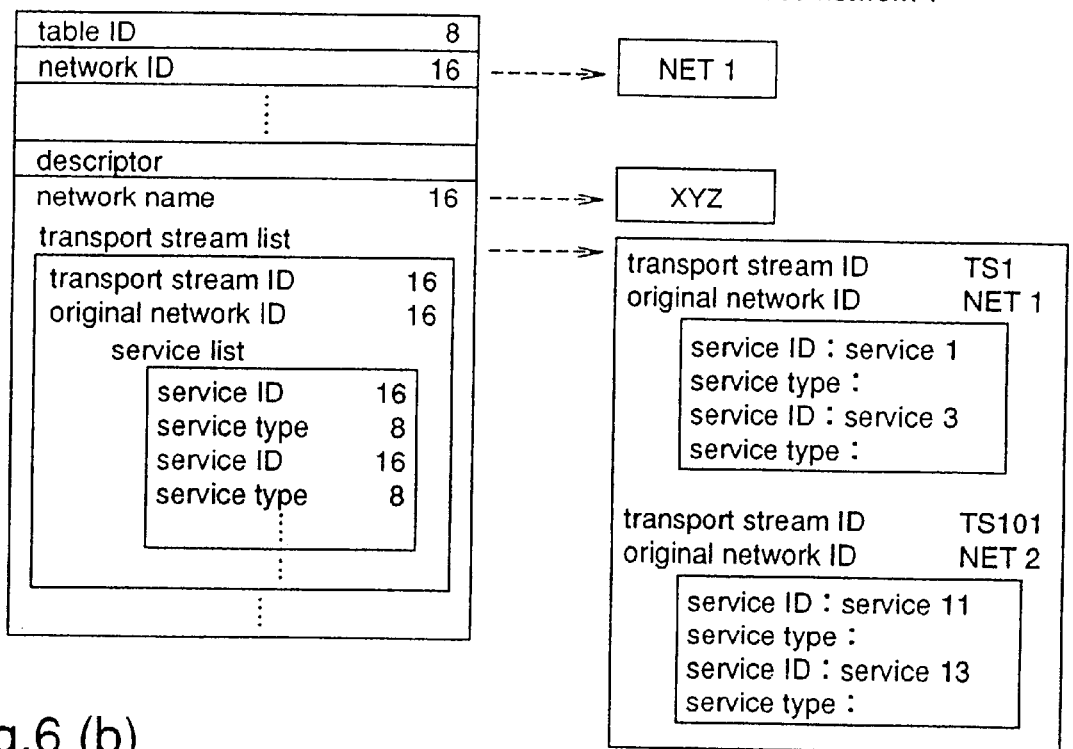
FIGS. 6(a) and 6(b) are diagrams each illustrating an NIT transmitted in another example of the digital broadcasting transmitting method according to the first embodiment.
Figure 6:
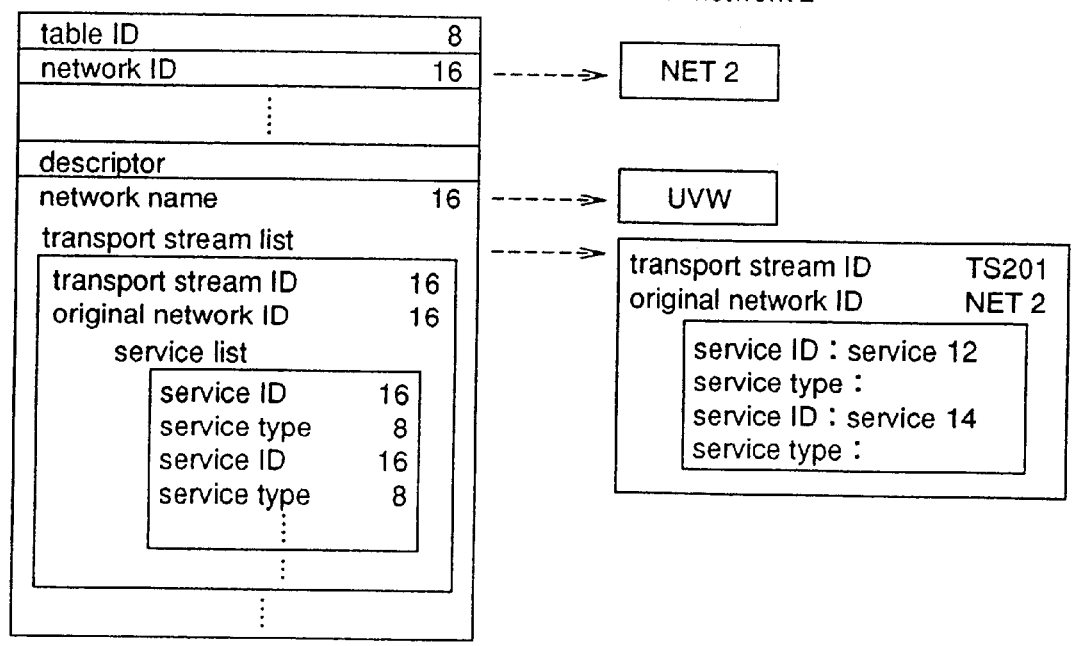

FIGS. 6(a) and 6(b) show NIT packets created and transmitted on this occasion. The transport stream TS 101 to be added to the network 1 has already been described. Into transport streams transmitted over the network 1, the NIT packet in FIG. 6(a) is multiplexed.

With respect to an added network 2, an NIT packet in FIG. 6(b) is multiplexed into the corresponding transport stream and transmitted.

Since the reproducing apparatus OLD in FIG. 2(c) is intended for the network 1, even if it receives a transport stream for the network 2 using non-interlace video data, the apparatus decides that the transport stream is not of the network to which the apparatus itself belongs, and will not process the same because its network ID is "NET 2".

On the other hand, the reproducing apparatus NEW is intended for the networks 1 and 2, it receives and processes transport streams transmitted over these two networks. As shown in FIG. 6(b), an original network ID of a transport stream TS 201 transmitted over the network 2 is "NET 2" and indicates that video data of services 12 and 14 transmitted in the TS 201 is non-interlace video data as in the case of the TS 101 transmitted over the network 1.

Thus, in the digital broadcasting transmitting method of the first embodiment, a transport stream, i.e., multiplexed data is transmitted, with scanning method information of video data transmitted in the transport stream given to the original network ID of the NIT packet of service information packets included in the transport stream. Therefore, addition/extension is performed, in which, to the existing digital broadcasting system using data of a specified scanning method, data of another scanning method is added, without adversely affecting the reproducing apparatus for the existing system.

This addition/extension allows use of video data of plural scanning methods, whereby degree of freedom in program construction is improved.

In addition, in the digital broadcasting transmitting apparatus of this embodiment, the non-interlace video data storage unit 22 and the non-interlace video packet creating unit 23 are added to the prior art transmitting apparatus in FIG. 59, to use non-interlace video data to-be-transmitted.

Yet in addition, in the digital broadcasting reproducing apparatus of this embodiment, the non-interlace video decoding unit 3, the identification information storage unit 5, and the scanning method instructing unit 7 are added to the prior art reproducing apparatus in FIG. 59, to use non-interlace video data to-be-reproduced.

Further, it should be noted that various types of information, code allocation, and processing procedure in a flowchart are only illustrative, and restricted thereto.

Embodiment 2

A digital broadcasting transmitting method of the second embodiment is characterized in that an original network ID has network scanning method information indicative of a scanning method of video data as information for each network and a digital broadcasting system can be extended as in the first embodiment.

A transmitting apparatus and a reproducing apparatus of the second embodiment are identical to those of the first embodiment, and therefore will be described with reference to FIG. 1. Also, the digital broadcasting system is extended as in the first embodiment, and therefore will be described with reference to FIG. 2.

Although in the first embodiment, the original network ID of the NIT indicates a network to which the corresponding transport stream belongs, that is, it indicates the scanning method of video data, in the second embodiment, scanning method information for each network is given to a part of service information other than the original network ID. In the first embodiment, whether an original network ID of a transport stream is "NET 1" or "NET 2" indicates interlace video data or non-interlace video data, respectively. On the other hand, in the second embodiment, when indicating "NET 1", video data is processed as interlace video data, whereas when indicating "NET 2", on assumption that it requires decision ("decision required"), the information given to the part of the service information other than the original network ID is used to decide a scanning method of video data multiplexed into a transport stream.

FIG. 7(a) shows an NIT of service information which is created and transmitted by the digital broadcasting transmitting method according to a first example of the second embodiment. In the NIT in FIG. 7(a), an original network ID of an added transport stream is "NET 2" as in FIG. 3(b). The scanning method information of video data for each service is given to a "service type", in a service list of an NIT descriptor. In this example, services 11 and 13 are non-interlace services. FIG. 7(b) shows code allocation of service types in which a scanning method of video data can be specified. In this example, the service types include scanning method information and information about type of digital broadcasting.

As described above, in the second embodiment, when the original network ID is "NET 2", video data of a service included in the corresponding transport stream indicates "decision required", and for the service of the transport stream indicative of "decision required", the scanning method information is given to the service type in the service list for each service.

Hereinafter, operation of the digital broadcasting transmitting apparatus and the reproducing apparatus of this embodiment (1)-1 "CREATION AND TRANSMISSION OF MULTIPLEXED DATA OF DIGITAL BROADCASTING TRANSMITTING APPARATUS", and (2)-1 "REPRODUCTION OF DIGITAL BROADCASTING REPRODUCING APPARATUS" will be described. Herein, as in the first embodiment, addition of the TS101 in FIG. 2(b) will be described.

(1) Creation and Transmission of Multiplexed Data of Digital Broadcasting Transmitting Apparatus The video data packet creating units 21 and 23 respectively create video data packets as in the case of (1) of the first embodiment.

The service information packet creating unit 27 sets original network identifiers ID of the TS1 and the TS101 to be "NET 1" and "NET 2", respectively, in the transport stream list in the NIT packet.

In addition, the service information packet creating unit 27 creates an NIT packet by giving codes indicating that services 11 and 13 are non-interlace to service types in the service list of the descriptor. The unit 27 creates the other service information packets and the multiplexing unit 28 creates multiplexed data as in the case of (1) of the first embodiment, and the transmitting unit 29 transmits the resulting transport stream.

(2) Reproduction of Digital Broadcasting Reproducing Apparatus

Figure 8:
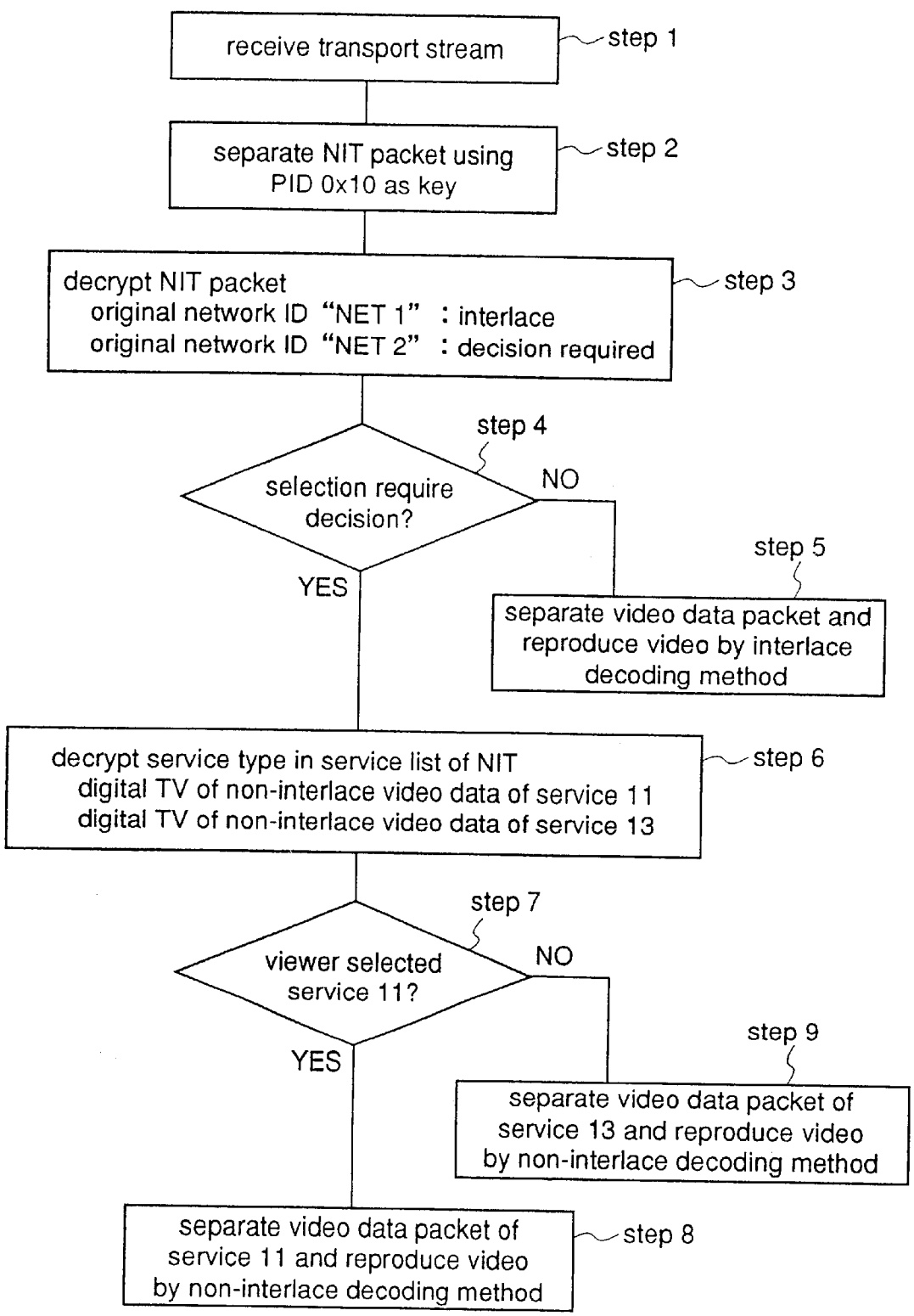
FIG. 8 is a flowchart for explaining the operation of a digital broadcasting reproducing apparatus according to the first example of the second embodiment.

The transport streams transmitted in (1) are received and processed by the reproducing apparatus 210 to reproduce and display video. Here, the viewer can utilize broadcasting. FIG. 8 shows a flowchart of processing procedure of the first example reproducing apparatus of the second embodiment. Hereinafter, operation of the reproducing apparatus 210 will be described following flow in FIG. 8. Assume that the reproducing apparatus 210 is "NEW" in FIG. 2(b) as in the first embodiment.

In steps 1 and 2, the NIT packet is separated as in (2) of the first embodiment. In step 3, the NIT packet is decrypted to obtain information of a scanning method of video data from information of original network ID. Although in (2) of the first embodiment, "NET 1" or "NET 2" indicates interlace or non-interlace, respectively, in this example, "NET 1" indicates interlace, whereas "NET 2" indicates "decision required", and decision is made.

In a case where the transport stream TS1 in FIG. 4(a) is received, since the original network ID of the TS1 is "NET 1", it is decided that the video data is interlace. Likewise, in a case where the transport stream TS101 in FIG. 4(b) is received, since the original network ID of the TS101 is "NET 2", it is decided that the video data indicates "decision required". The scanning method information obtained in step 3 is stored in the identification information storage unit 5. Also, as in the case of the prior art example, information about a packet ID contained in a PMT packet is also separated by the separating unit 2 and stored in the identification information storage unit 5.

The service selecting unit 6 accepts selection by the viewer using a remote controller, channel, and so forth, as in (2) of the first embodiment. In step 4, decision on the selection is made.

Where the service 1 or 3 is selected, it is decided that the selection is "interlace". Where the service 11 or 13 is selected, it is decided that the selection indicates "decision required". Based on the decision in step 4, step 5 is performed when "Interlace", and step 6 is performed when "decision required". The step 5 is performed as in the step 5 of (2) of the first embodiment, and the resulting interlace video data is reproduced and displayed.

Where the service 11 or 13 is selected, in step 6, it is decided that the service 11 or 13 includes non-interlace video data, from the service types in the service list of the NIT packet. This information is also stored in the identification storage unit 5.

In step 7, it is decided whether the selection of the viewer is service 11 or 13. Based on this decision, step 8 or 9 is performed. In this example, in steps 8 and 9, similar processing is performed. Specifically, the service selecting unit 6 instructs the separating unit 2 to obtain scanning method information of the selected service 11 or 13 and the packet ID from the identification information storage unit 5, separates and extracts the corresponding data packet, and output the video data packet to the non-interlace video data decoding unit 3. In accordance with the instruction, the separating unit 2 outputs the extracted video data packet to the non-interlace video decoding unit 3. The scanning method instructing unit 7 instructs the non-interlace video decoding unit 3 to perform decoding on the basis of the information from the identification storage unit 5. The non-interlace video decoding unit 3 decodes the video data packet, and the resulting video is displayed by the video display 8.

As in the case of (2) of the first embodiment, in the reproducing apparatus (OLD in FIG. 2) for the existing network 1, comparison and decision is made for the network ID and the original network ID, and the transport stream TS 101 is not processed if received. This circumvents troubles (flicker) caused by processing inappropriate video data.

Subsequently, a second example of the digital broadcasting transmitting method, the transmitting apparatus, and the reproducing apparatus of the second embodiment will be described. Also in this example, scanning method information is given to a part of service information other than the original network ID.

Figure 9:
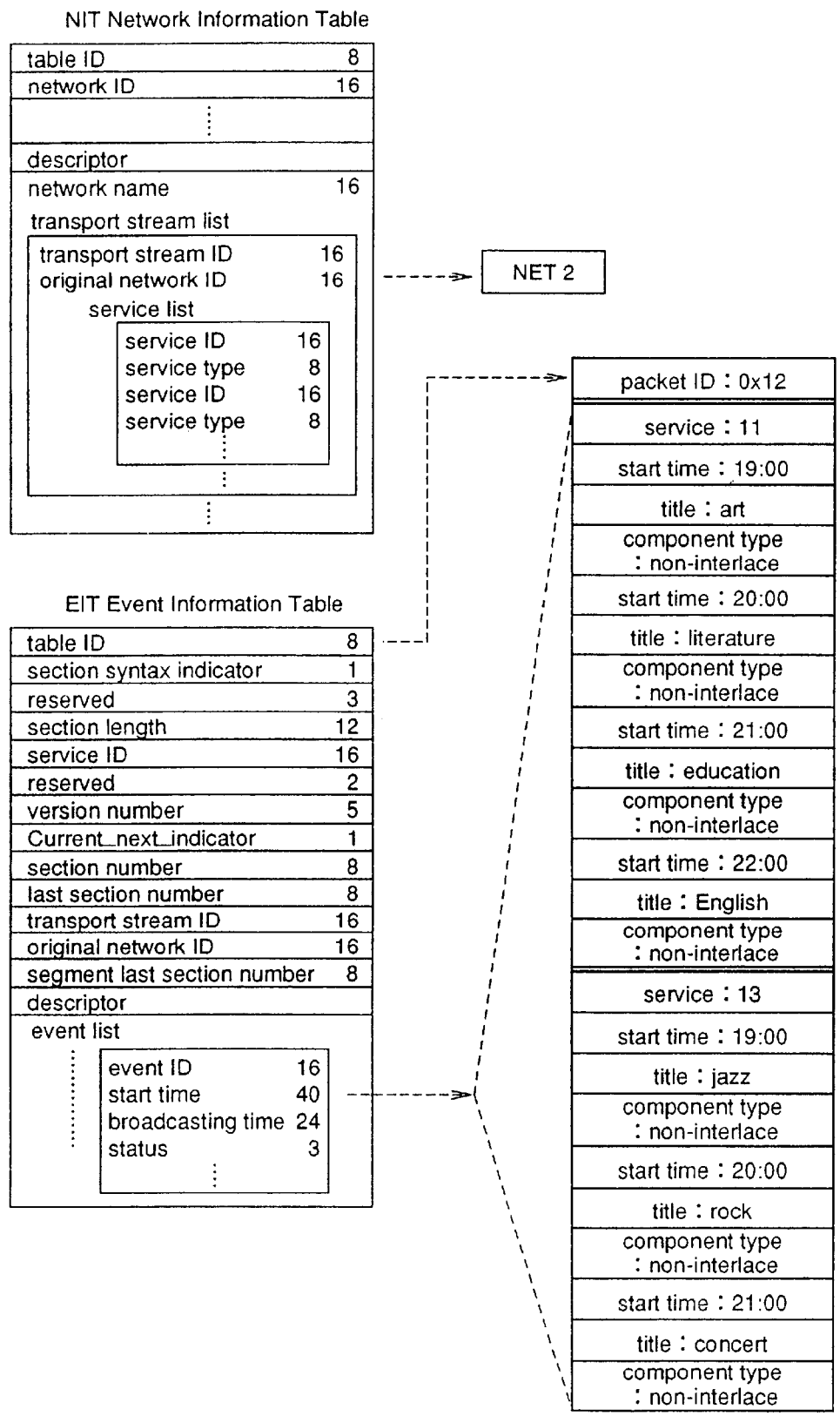
FIG. 9 is a diagram showing an NIT and an EIT (event information table) transmitted in a digital broadcasting transmitting method according to a second example of the second embodiment.

FIG. 9 shows an NIT and an EIT of service information according to the second example of the second embodiment. In the NIT, an original network ID of an added transport stream has "NET 2" as in the first example. While the scanning method information of video data for each service is given to the service type in the service list of the NIT descriptor in the first example, scanning method information for each event is given to an event list of an EIT descriptor in this example.

Figure 10:
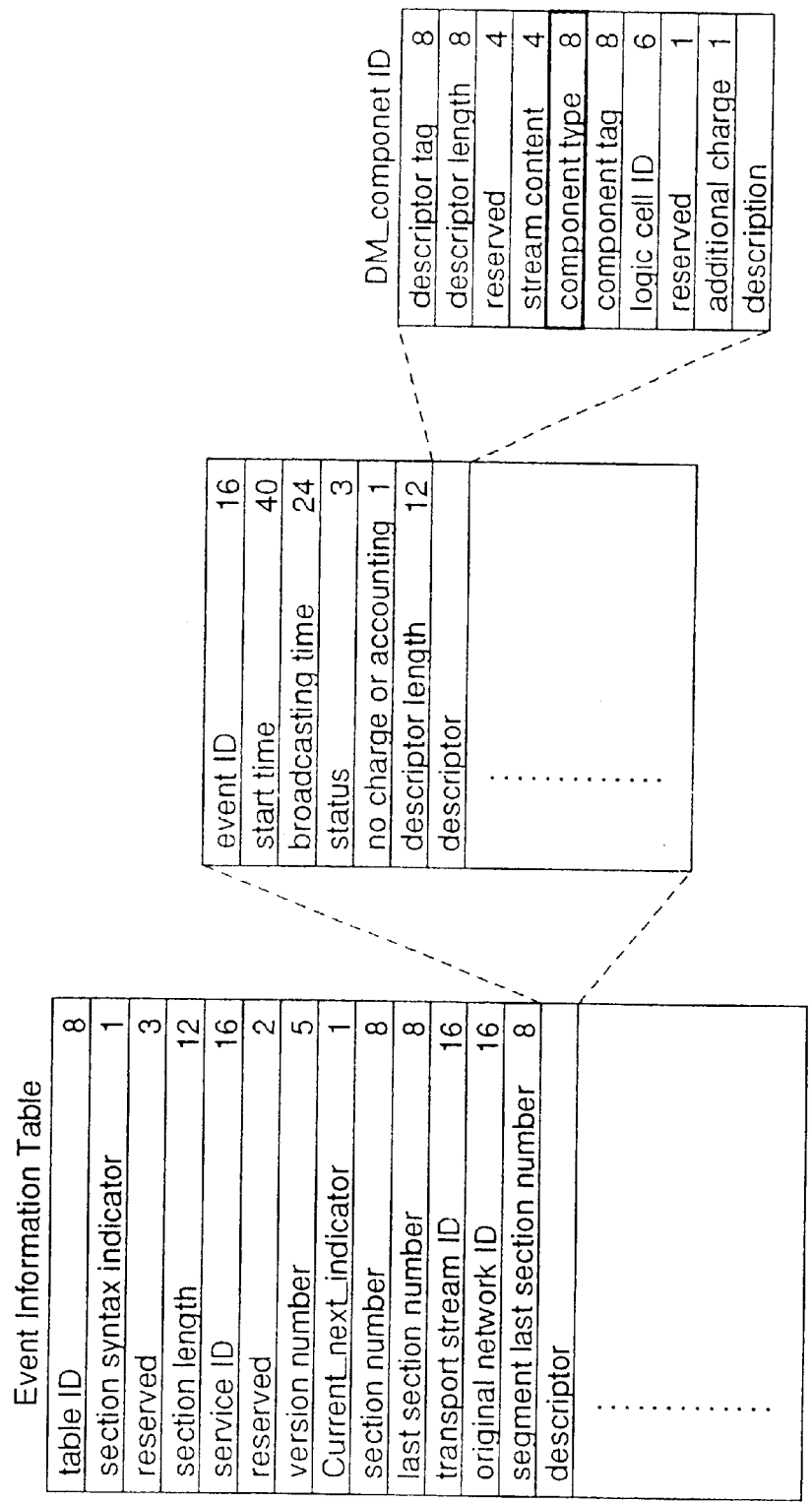
FIG. 10 is a diagram for explaining an example of scanning method specification using the EIT employed in the digital broadcasting transmitting method according to the second example of the second embodiment.

As shown in FIG. 9, services 11 and 13 transmitted in an added TS 101 each consists of non-interlace events. FIG. 10 shows that giving information for specifying a scanning method to the EIT in detail. As shown in the figure, the EIT descriptor includes the event list, and a descriptor of the event list includes a component type. In this example, to this component type, the scanning method information is given. FIGS. 11(a) and 11(b) show allocation of component type codes including information about scanning methods. Codes in FIG. 11(a) respectively indicate non interlace, and codes in FIG. 11(b) respectively indicate interlace. These codes indicate scanning methods along with the other information. Note that these specifications in FIGS. 10 and 11(a) and 11(b) are only illustrative, and not restricted thereto, so long as a scanning method is specified for each event.

In this example, when an original network ID is "NET 2", the corresponding video data is processed as being "decision required" as in the first example, and the information for decision is given to the EIT, thereby decision is made for each event.

Hereinafter, operation of the digital broadcasting transmitting apparatus and the reproducing apparatus according to the second example of this embodiment (1)-2 "CREATION AND TRANSMISSION OF MULTIPLEXED DATA OF DIGITAL BROADCASTING TRANSMITTING APPARATUS", and (2)-2 "REPRODUCTION OF DIGITAL BROADCASTING REPRODUCING APPARATUS" will be described. Herein, addition in FIG. 2(b) is illustrated as in the first example.

(1)-2 Creation and Transmission of Multiplexed Data of Digital Broadcasting Transmitting Apparatus Video data packets and the NIT packet are created as in the first example.

The service information packet creating unit 27 creates the EIT packet by giving codes indicating that events of services 11 and 13 are non-interlace to component types in the event list of the EIT packet to-be-multiplexed into the TS101. The unit 27 further creates the other service information packets and the multiplexing unit 28 creates multiplexed data as in the case of (1) of the first embodiment, and the transmitting unit 29 transmits the resulting transport stream.

(2)-2 Reproduction of Digital Broadcasting Reproducing Apparatus

Figure 12:
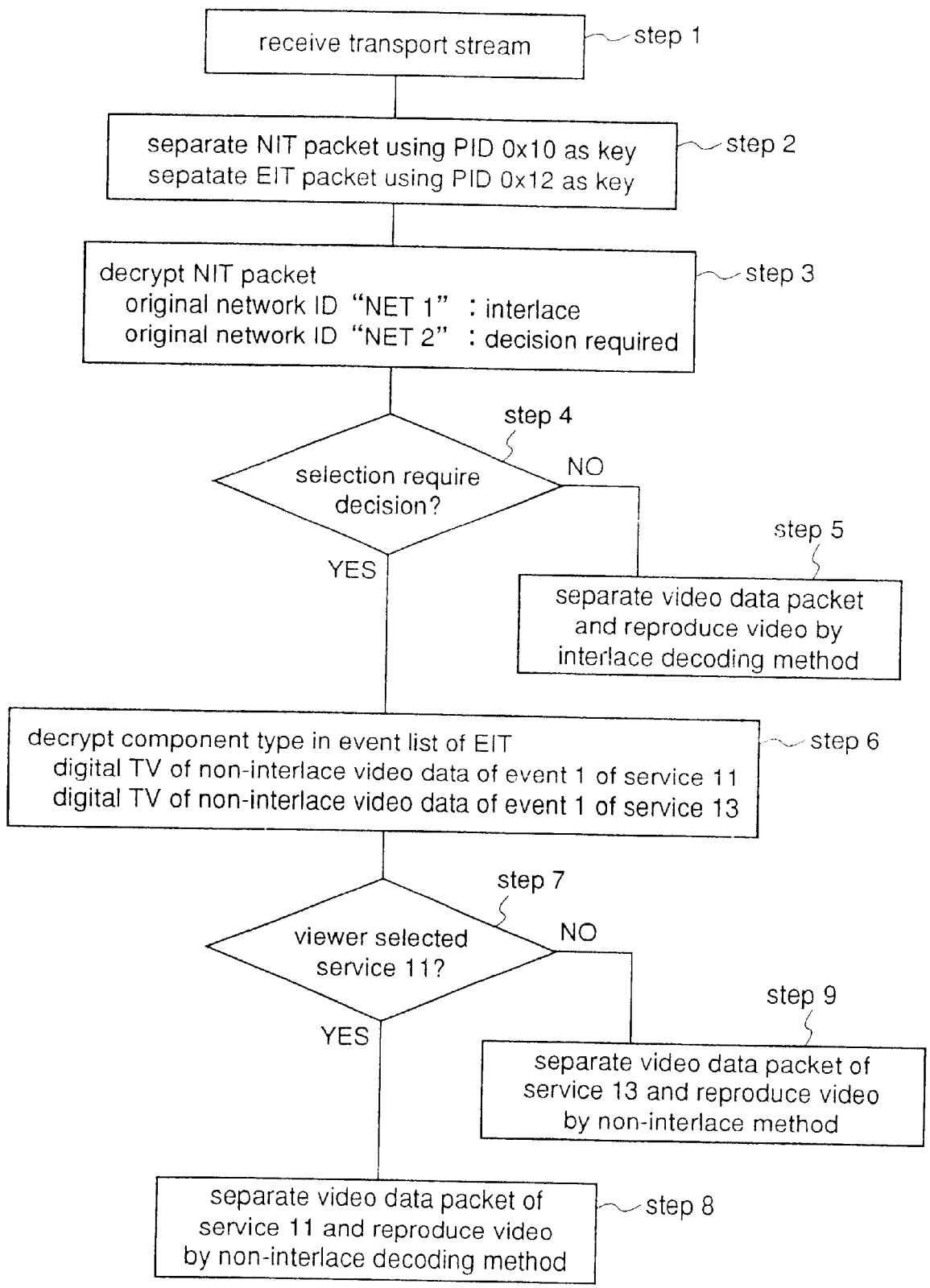
FIG. 12 is a flowchart for explaining the operation of a digital broadcasting reproducing apparatus according to the second example of the second embodiment.

The transport streams transmitted in (1)-2 are received and processed by the reproducing apparatus 210 to reproduce and display video. Here, the viewer can utilize broadcasting. FIG. 12 shows a flowchart of processing procedure of the reproducing apparatus according to the second example of this embodiment. Hereinafter, operation of the reproducing apparatus 210 will be described following flow in FIG. 12. Assume that the reproducing apparatus 210 is also NEW in FIG. 2(*b*).

Step 1 is performed as in the (2)-1, and subsequently in step 2, the NIT packet and EIT packet are separated. Step 3 to 5 are similar to steps of (2)-2. Also, the information about the packet ID contained in the PMT packet is separated by the separating unit 2 and stored in the identification storage unit 5.

Where the service 11 or 13 is selected, in step 4, it is decided that the selection indicates "decision required". In step 6, it is decided that the service 11 or 13 includes events of non-interlace video data, from component types in the event list contained in the EIT packet. This information is also stored in the identification storage unit 5. Step 7 and the following steps are performed as in the first example, and video data is reproduced by the non-interlace method.

Also in this example, in the reproducing apparatus (OLD in FIG. 2) for the existing network 1, comparison and decision is made for the network ID and the original network ID, and the TS 101 is not processed if received. This circumvents troubles (flicker) caused by processing inappropriate video data.

Extension in the two examples of the second embodiment has been described as being shown in FIG. 2(*b*). Alternatively, extension in FIG. 2(*c*) is possible as in the first embodiment.

As thus far described, in the digital broadcasting transmitting method according to the first example of the second embodiment, the scanning method information, or the information "decision required" is given to the original network ID of the NIT packet, and when the "decision required" is given thereto, the scanning method information is given to the service type in the service list of the NIT packet, thereby addition/extension is performed in the existing digital broadcasting system, in which video data of a different scanning method may be used.

In addition, in the digital broadcasting transmitting method according to the second example of the second embodiment, the scanning method information, or the information "decision required" is given to the original network ID of the NIT packet, and when the "decision required" is given thereto, the scanning method information is given to the component type in the event list of the EIT packet, thereby a network using video data of a different scanning method can be added to the existing digital broadcasting system.

This addition/extension allows use of video data of plural scanning methods, whereby degree of freedom in program construction is improved.

In addition, in the digital broadcasting transmitting apparatus of this embodiment, the non-interlace video data storage unit 22 and the non-interlace video packet creating unit 23 are added to the prior art transmitting apparatus in FIG. 59, to use non-interlace video data to-be-transmitted.

Yet in addition, in the digital broadcasting reproducing apparatus of this embodiment, the non-interlace video decoding unit 3, the identification information storage unit 5, and the scanning method instructing unit 7 are added to the prior art reproducing apparatus in FIG. 59, to use non-interlace video data to-be-reproduced.

Further, although transmission and reproduction are simple and speedy in the first embodiment, process steps are somewhat increased in the first and second examples of this embodiment. However, since these examples can flexibly deal with modified specification or further extension mentioned later, either setting may be selected depending on setting of the existing system or extension plan.

Figure 53:
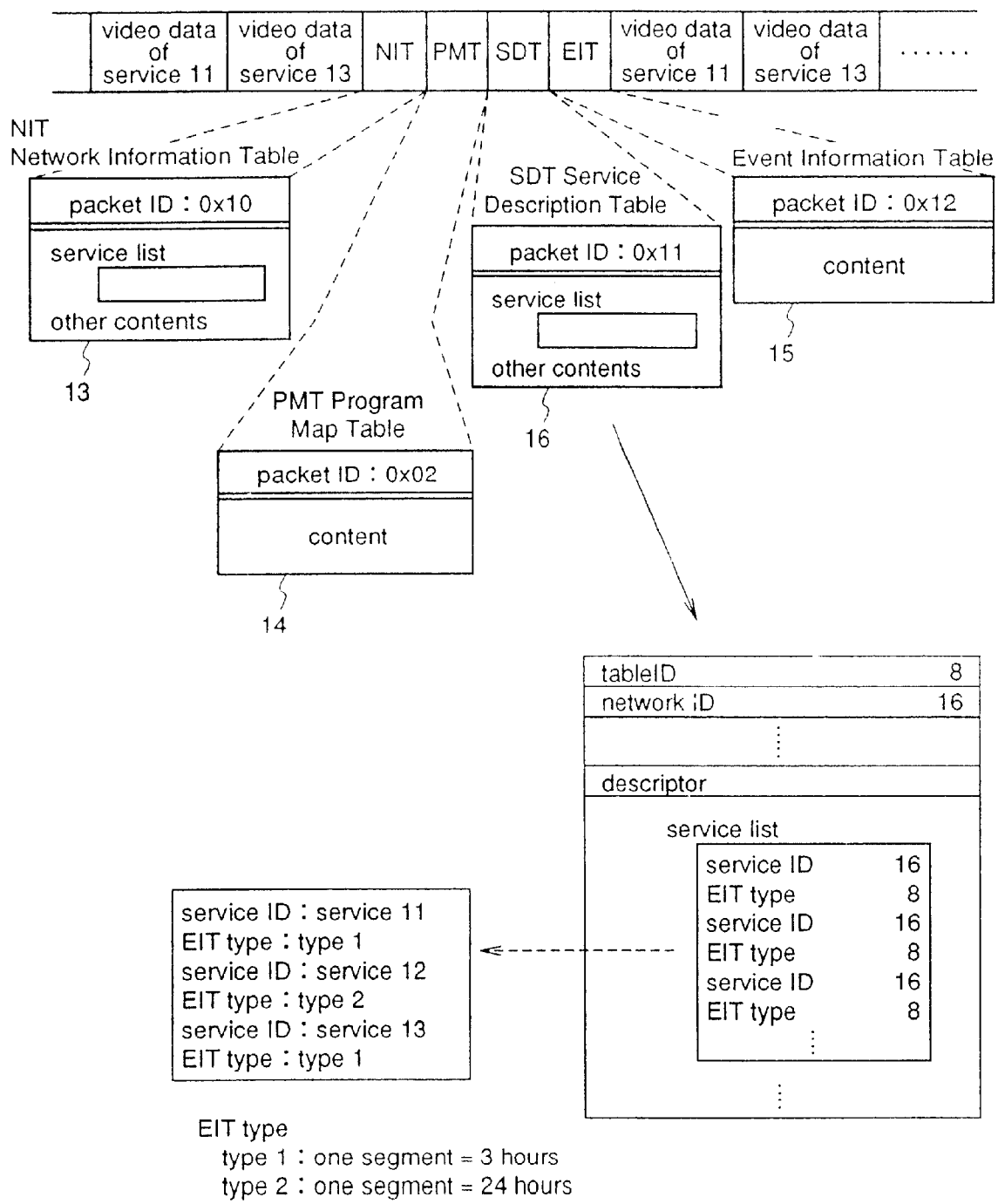
FIG. 53 is a diagram illustrating the structure of multiplexed data transmitted in a digital broadcasting transmitting method according to a fourth example of the eleventh embodiment.

Still further, although the scanning method information is given to the service type in the service list of the NIT in the first example, it is also possible that the scanning method information for each service is given to a service list of the SDT as shown in FIG. 53.

It should be noted that information, code allocation, and processing procedure in the flowchart of the second embodiment are illustrative and not restricted thereto.

Embodiment 3

A digital broadcasting transmitting method of a third embodiment is characterized in that an original network ID has network scanning method information indicative of a scanning method of video data as information for each network as in the first and second embodiments and a digital broadcasting system can be extended, in which scanning methods of services coexist (scanning methods vary service by service).

A transmitting apparatus and a reproducing apparatus of the third embodiment are identical to those of the first embodiment and therefore will be described with reference to FIG. 1.

Figure 13:
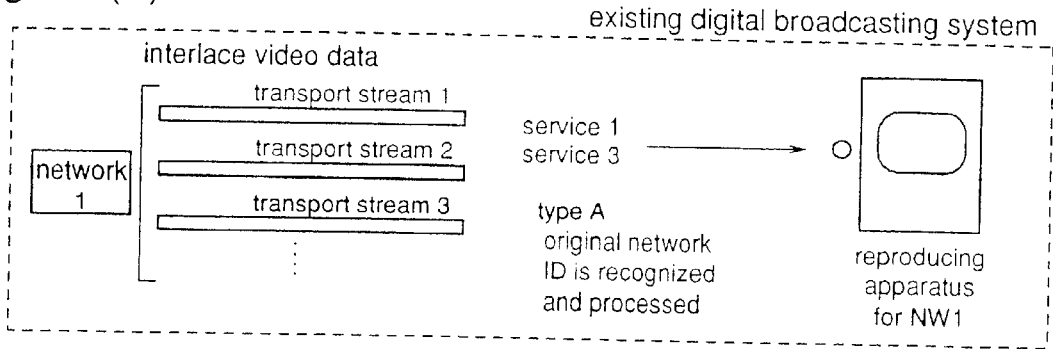
FIGS. 13(a)–13(c) are diagrams for explaining the relationship between a digital broadcasting system according to a third embodiment of the invention and the existing digital broadcasting system.
Figure 13:
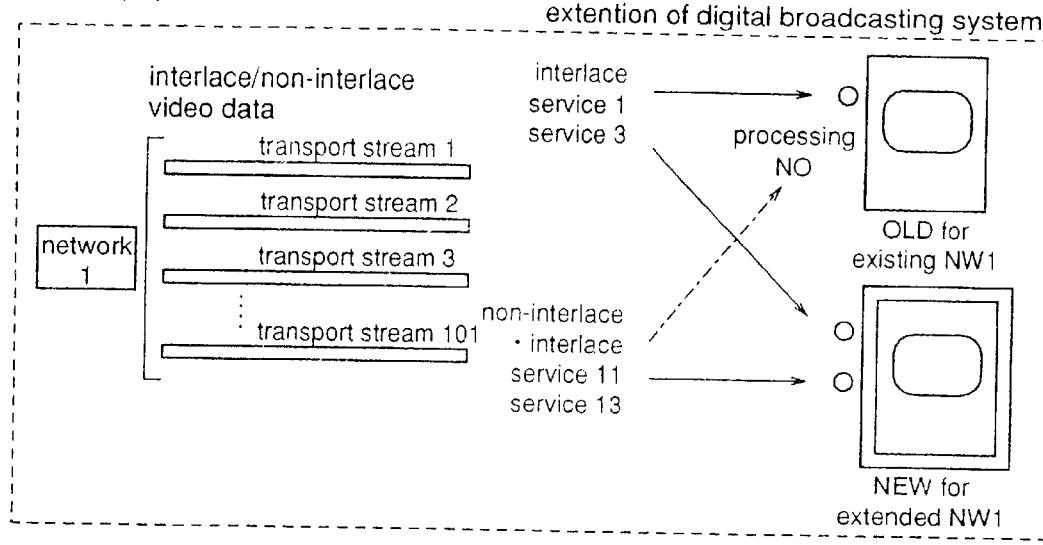
Figure 13:
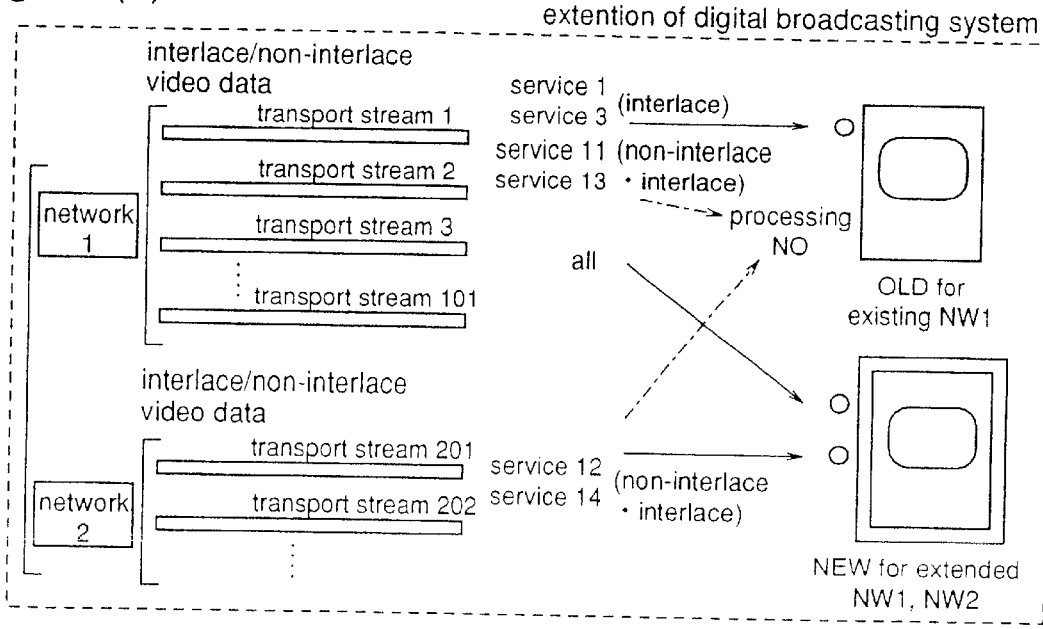

FIG. 13(*a*) shows a digital broadcasting system using interlace video data, and FIGS. 13(*b*) and 13(*c*) show addition/extension to/of the system in FIG. 13(*a*), which is performed by addition of a transport stream or a network as in the first embodiment. While in the first embodiment, addition/extension is performed by adding a transport stream of a scanning method, in the third embodiment, a transport stream where different scanning methods coexist is added, and whether a service of the transport stream includes programs (events) of interlace video data or non-interlace video data is specified.

More specifically, the TS 101 in FIG. 2(*b*) or the network 2 in FIG. 2(*c*) uses only non-interlace video data in the first embodiment. In the third embodiment, each service of a transport stream TS101 in FIG. 13(*b*) or a network 2 in FIG. 13(*c*) is interlace or non-interlace.

As in the case of the first embodiment, on condition that "A. In a receiving end, normal receiving and processing is carried out only when an original network ID is recognized, and is identical to a network ID" in the existing broadcasting system, video data of a different scanning method can be used in an extended digital broadcasting system by the use of the original network ID as network scanning method information, without adversely affecting the reproducing apparatus only for the existing system.

Figure 4:
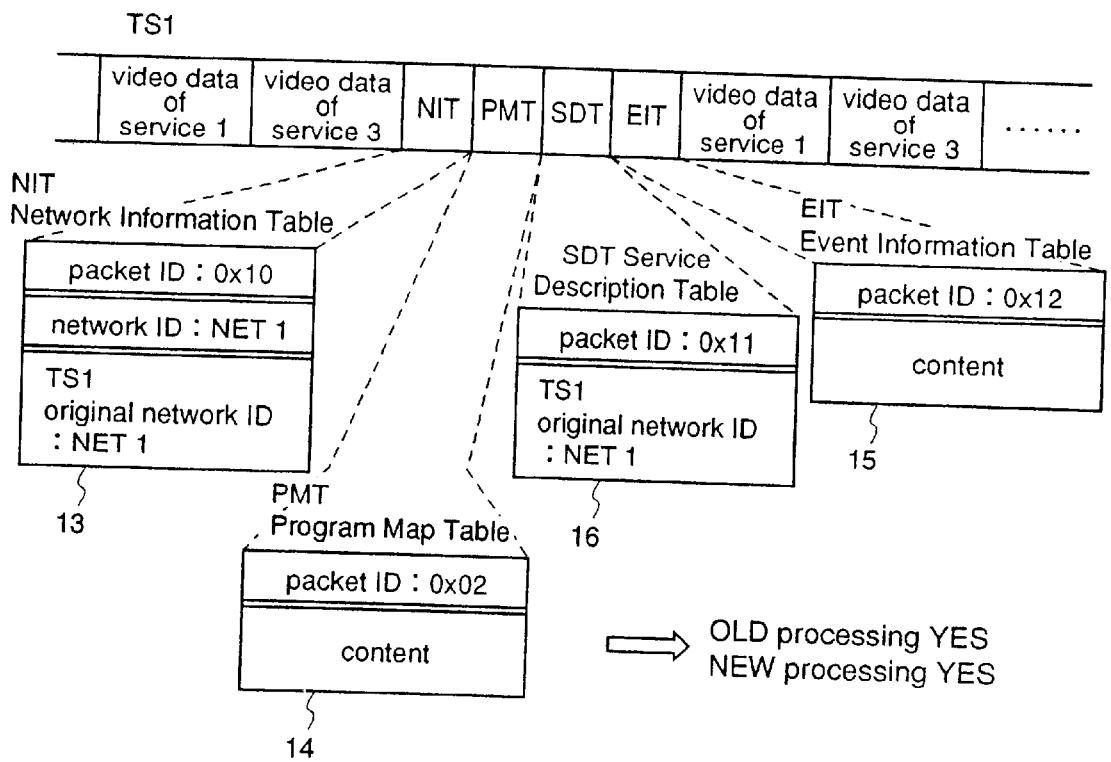
FIGS. 4(a) and 4(b) are diagrams each illustrating the structure of multiplexed data transmitted in the digital broadcasting transmitting method according to the first embodiment.
Figure 4:
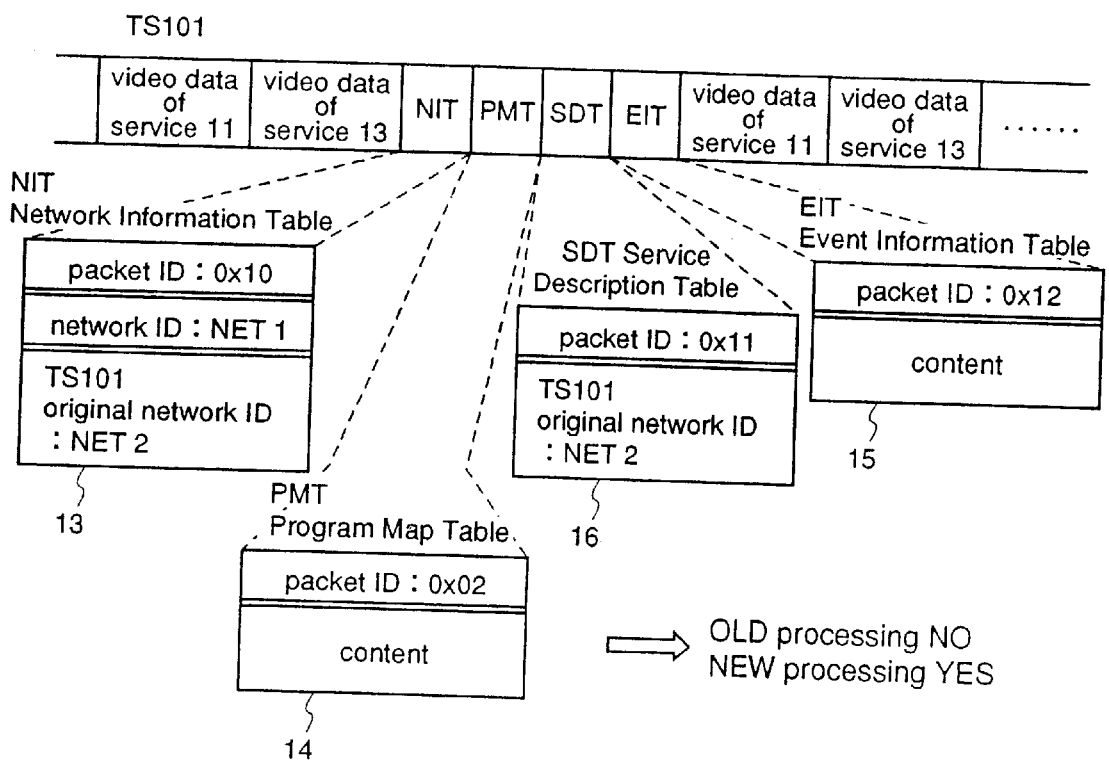

A structure of the transport stream transmitted over the network 1 or 2 is identical to that of FIG. 4(*a*) or 4(*b*), and the transport stream in FIG. 4(*b*) is not processed by the reproducing apparatus OLD in FIG. 13(*b*) or 13(*c*) if received as in the first embodiment.

Also in the third embodiment, assume that the existing system uses services 1 and 3 of interlace video data, and the system is extended by adding a transport stream TS 101 including a service 11 of non-interlace video data and a service 13 of interlace video data thereto.

Figure 7:
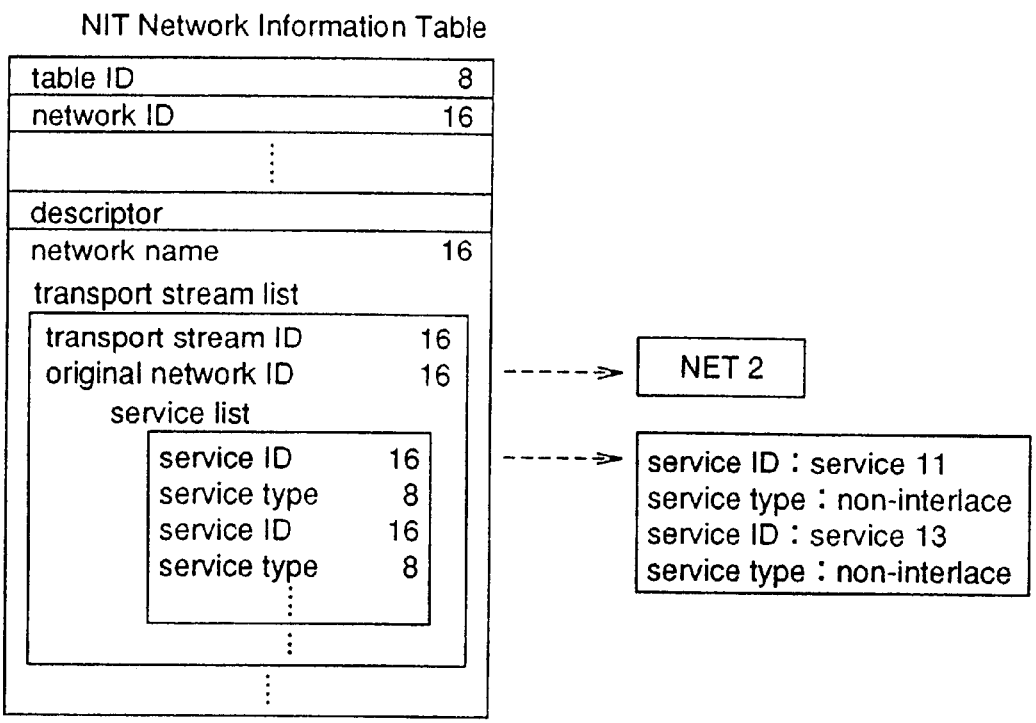
FIG. 7(a) is a diagram illustrating an NIT transmitted in a digital broadcasting transmitting method according to a first example of a second embodiment of the invention.
FIG. 7(b) is a diagram illustrating code allocation employed in the method.
Figure 14:
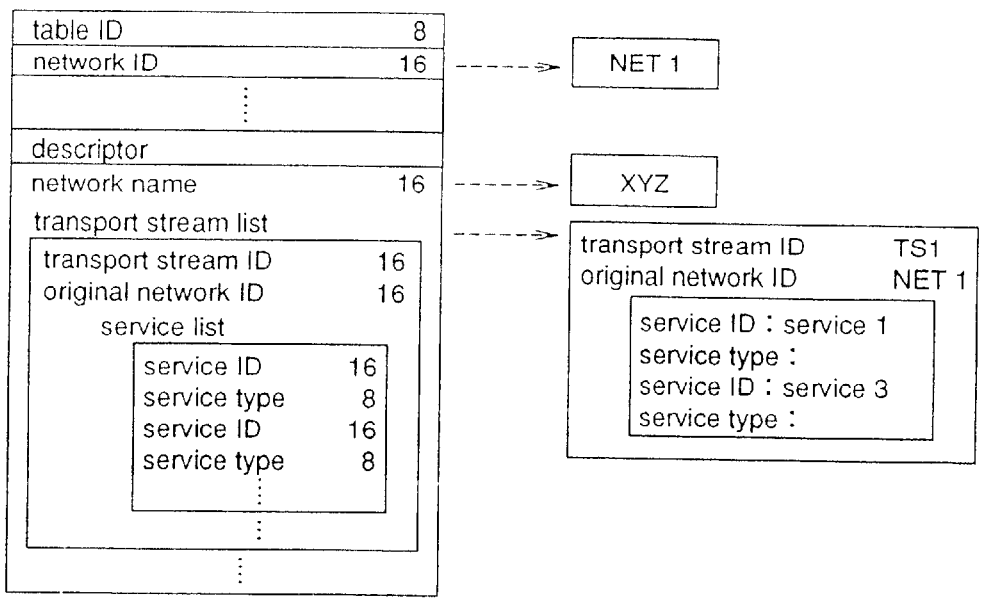
FIGS. 14(a) and 14(b) are diagrams each illustrating an NIT transmitted in a digital broadcasting transmitting method according to the third embodiment.
Figure 14:
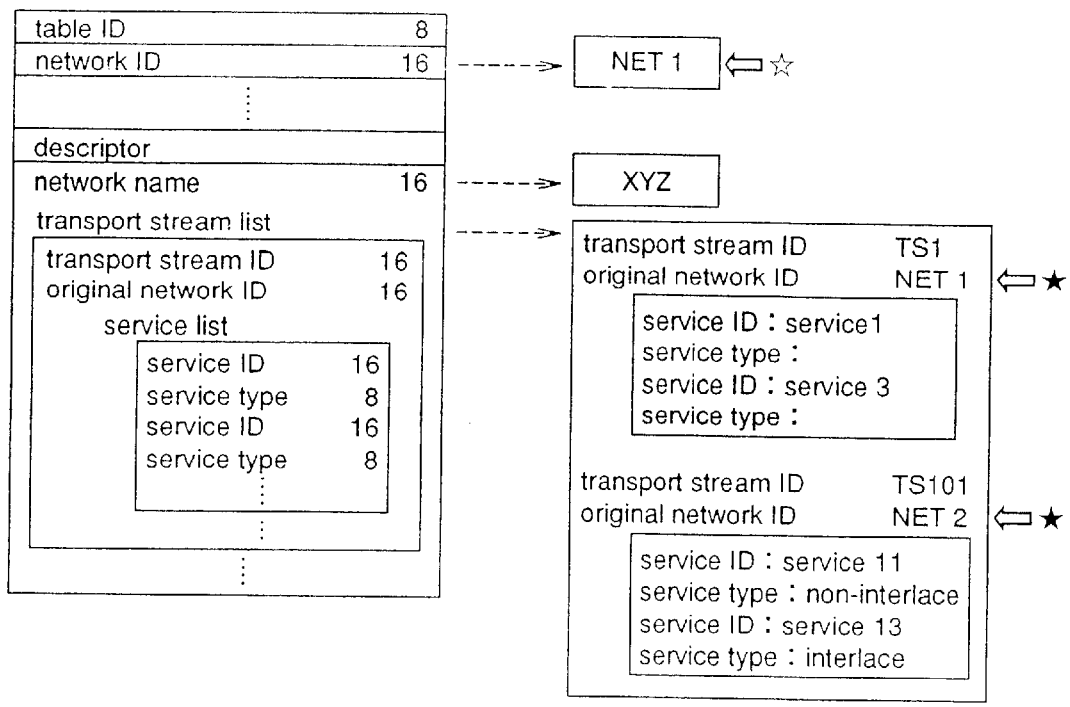

FIGS. 14(*a*) and 14(*b*) show NIT packets for use in the digital broadcasting transmitting method of the third embodiment. FIG. 14(*a*) shows NIT transmitted over the existing network 1 (FIG. 13(*a*)), which is identical to that of the first embodiment (FIG. 3(*a*)), and FIG. 14(*b*) shows NIT which is identical to that of the first example of the second embodiment (FIG. 7(*a*)). That is, a "service type" in a service list has information indicative of a scanning method as shown in FIG. 7(*a*), and code allocation in FIG. 7(*b*) is employed to indicate a scanning method as in the second embodiment.

Hereinafter, operation of the digital broadcasting transmitting apparatus and the reproducing apparatus of this embodiment (1) "CREATION AND TRANSMISSION OF MULTIPLEXED DATA OF DIGITAL BROADCASTING TRANSMITTING APPARATUS", and (2) "REPRODUCTION OF DIGITAL BROADCASTING REPRODUCING APPARATUS" will be described.

(1) Creation and Transmission of Multiplexed Data of Digital Broadcasting Transmitting Apparatus Referring to FIG. 1 again, the interlace video data packet creating unit 21 obtains video data required for program creation of services 1, 3 and 13 from the interlace video data storage unit 20 in which video data digitized by the interlace method is stored, to create interlace video data packets, and outputs the interlace video data packets to the multiplexing unit 28.

The non-interlace video data packet creating unit 23 obtains video data required for program creation of the service 11 from the non-interlace video data storage unit 22 in which video data digitized by the non-interlace method is stored, to create non-interlace video data packets, and outputs the non-interlace video data packets to the multiplexing unit 20.

The service information packet creating unit 27 sets original network identifiers ID of the TS1 and the TS101 to be "NET 1" and "NET 2", respectively, in the transport stream list of the NIT packet.

The service information packet creating unit 27 creates the NIT packet by giving a code indicative of non-interlace and a code indicative of interlace to service types of the services 11 and 13, respectively, in the service list of a descriptor in FIG. 14, and as in the first embodiment, it further creates other service information packets. Then, the creating unit 27 outputs the created packets to the multiplexing unit 28.

The multiplexing unit 28 creates multiplexed data as in the case of (1) of the first embodiment, and the transmitting unit 29 transmits the resulting transport stream.

(2) Reproduction of Digital Broadcasting Reproducing Apparatus

The transport stream transmitted in (1) is received and processed by the reproducing apparatus 210 to reproduce and display video. Here, the viewer can utilize broadcasting.

Figure 15:
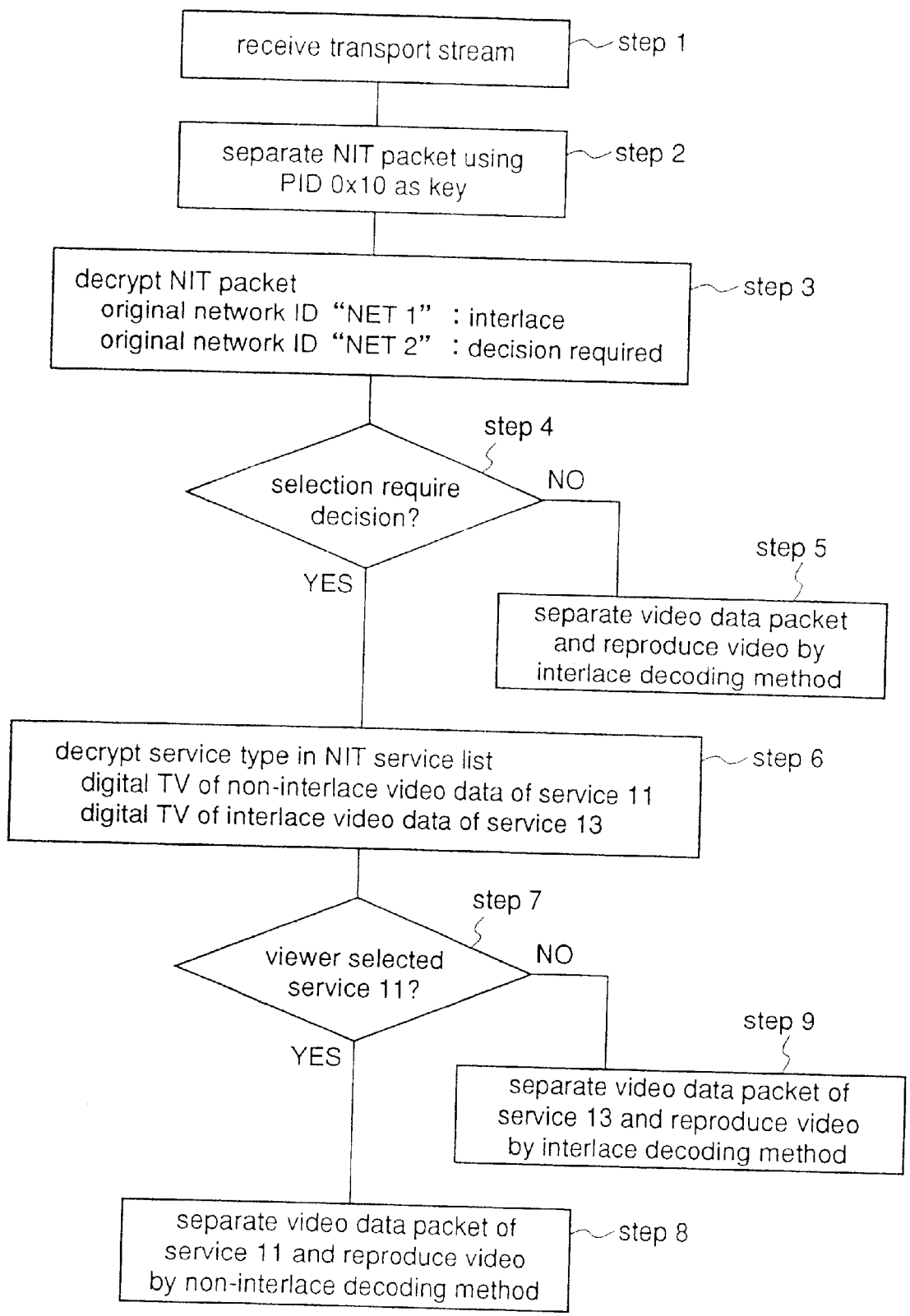
FIG. 15 is a flowchart for explaining the operation of a digital broadcasting reproducing apparatus according to the third embodiment.

FIG. 15 shows a flowchart of processing procedure of the reproducing apparatus of this embodiment after receiving the transport stream. Hereinafter, operation of the reproducing apparatus 210 will be described following flow in FIG. 15. Assume that the reproducing apparatus 210 is also NEW in FIG. 13(*b*) as in the first embodiment.

Steps 1 to 5 are performed as in the first example of the second embodiment. On the basis of decision in step 4, in step 6, it is decided that the services 11 and 13 include non-interlace video data and interlace video data, respectively, from service types in the service list of the NIT packet. This information is stored in the identification storage unit 5.

In step 7, it is decided whether the selection of the viewer is the service 11 or 13. On the basis of this decision, step 8 or step 9 is performed.

In step 8, the service selecting unit 6 instructs the separating unit 2 to obtain scanning method information of the service 11 and the packet ID from the identification information storage unit 5, separate and extract the corresponding video data packet, and output the video data packet to the non-interlace video data decoding unit 3. In accordance with the instruction, the separating unit 2 outputs the extracted video data packet to the non-interlace video decoding unit 3. The scanning method instructing unit 7 instructs the non-interlace video decoding unit 3 to perform decoding on the basis of the information from the identification storage unit 5. The non-interlace video decoding unit 3 decodes the video data packet, and the resulting video is displayed by the video display 8.

In step 9, the service selecting unit 6 instructs the separating unit 2 to obtain scanning method information of the service 13 and the packet ID from the identification information storage unit 5, separate and extract the corresponding video data packet, and output the video data packet to the interlace video data decoding unit 4. In accordance with the instruction, the separating unit 2 outputs the extracted video data packet to the interlace video decoding unit 4. The scanning method instructing unit 7 instructs the interlace video decoding unit 4 to perform decoding on the basis of the information from the identification storage unit 5. The interlace video decoding unit 4 decodes the video data packet, and the resulting video is displayed by the video display 8.

In the reproducing apparatus OLD for the existing network 1, comparison and decision is made for the network ID and the original network ID, and the TS 101 is not processed it received as in the case of the first embodiment. This circumvents troubles (flicker) caused by processing inappropriate video data.

A second example of the third embodiment will now be described. In this second example, addition/extension similar to that of the first example is performed.

Figure 16:
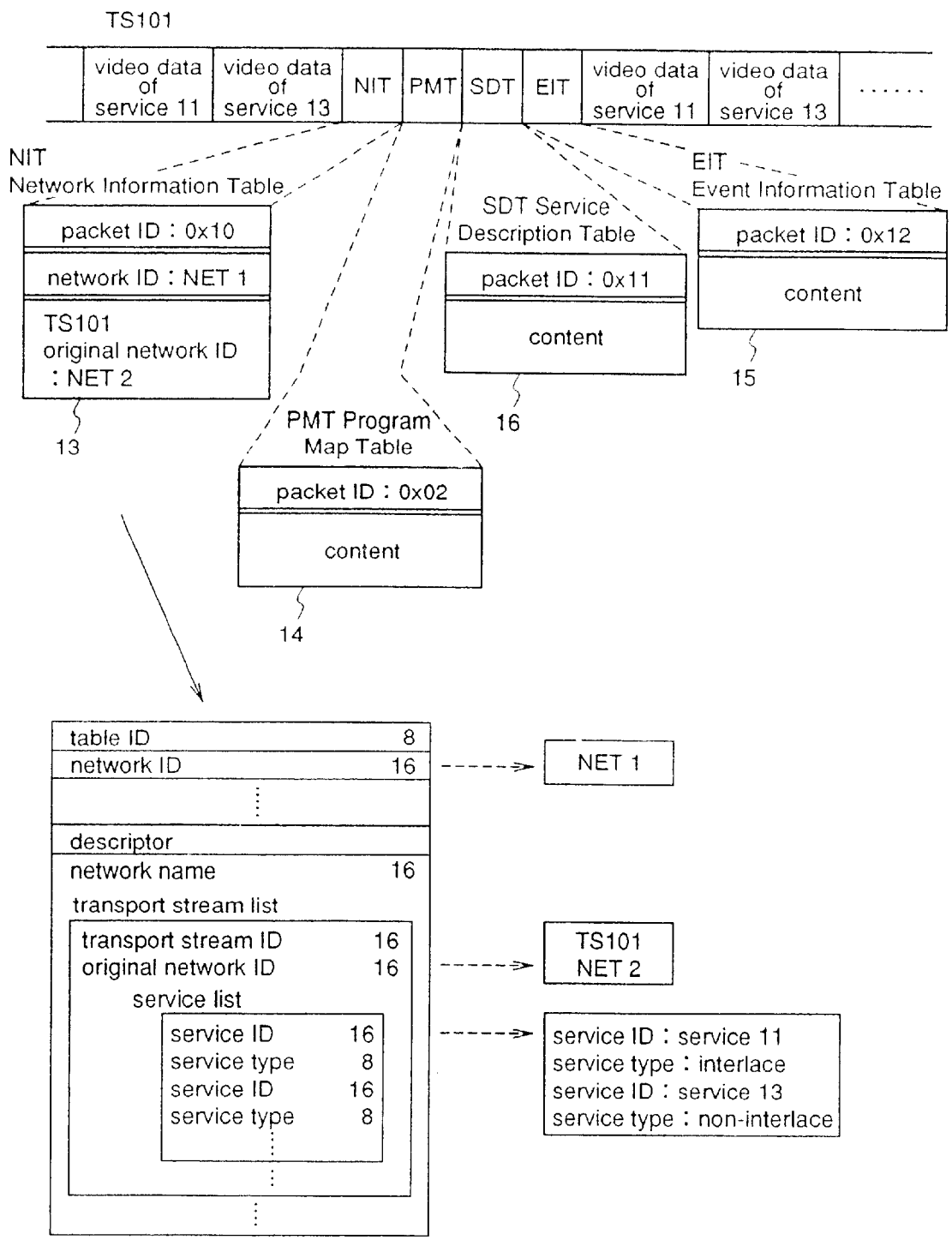
FIG. 16 is a diagram illustrating the structure of multiplexed data transmitted in the digital broadcasting transmitting method according to the third embodiment.
Figure 17:
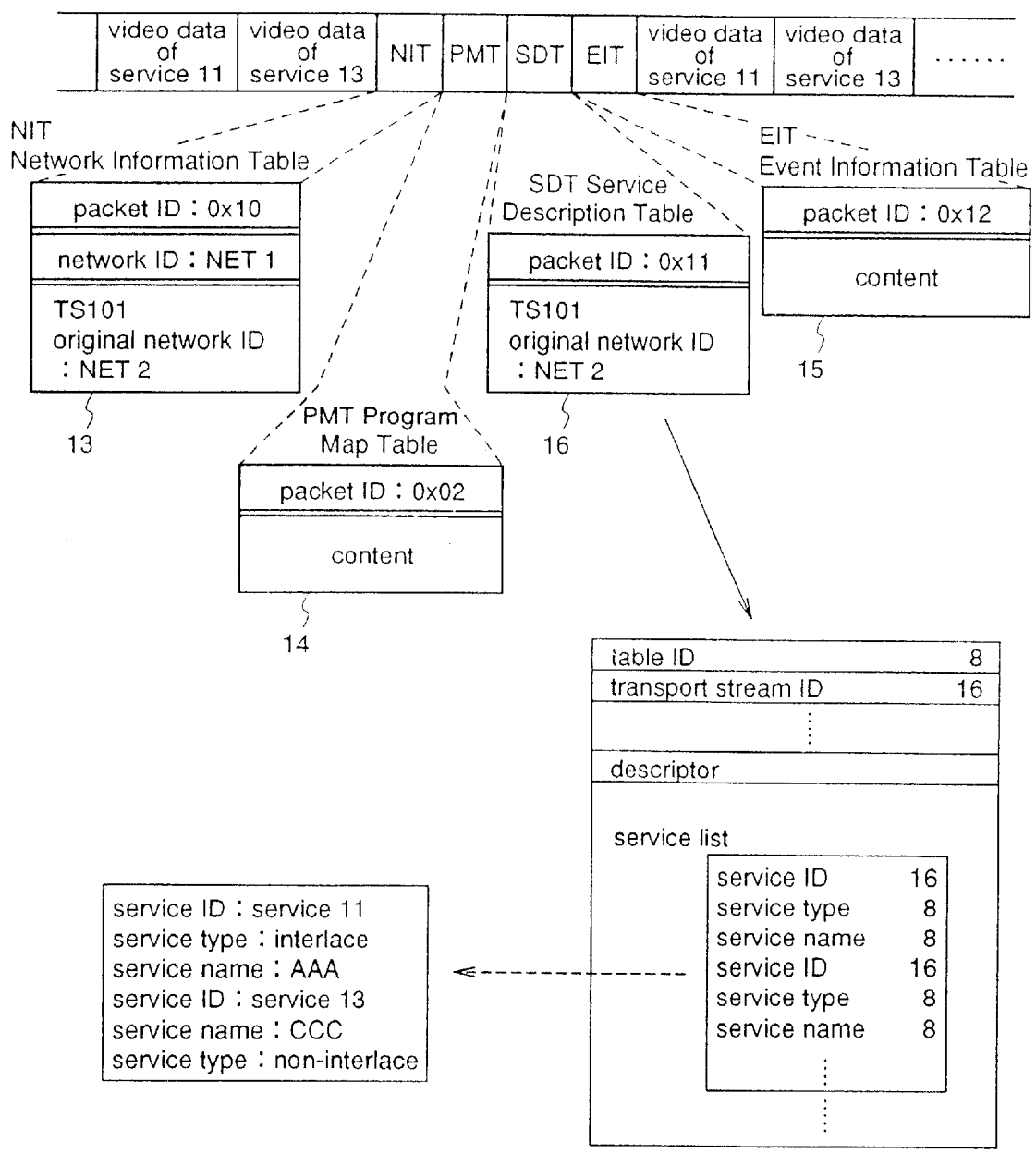
FIG. 17 is a diagram illustrating the structure of multiplexed data transmitted in a digital broadcasting transmitting method according to another example of the third embodiment.

FIGS. 16 and 17 show difference between the first and second examples. In the first example shown in FIG. 16, an original network ID of the TS 101 is "NET 2", and scanning method information of video data is given to the service list for each service of the NIT packet, whereas in the second example shown in FIG. 17, a "service type" in a service list of an SDT packet is used to indicate a scanning method for each service, although the original network ID of the NIT packet is "NET 2" as in the first example.

Operation of the transmitting apparatus 110 and the reproducing apparatus 210 in this example is identical to that of the first example except that the transmitting apparatus 110 gives the scanning method information for each service to the service type in the service list of the SDT in (1) and the reproducing apparatus 210 obtains the scanning method information from the service list of the SDT in (2).

While extension in FIG. 13(b) has been described in the first and second examples, the transport stream of the network 2 in FIG. 13(c) is processed as in the case of the TS101 in FIG. 13(b), thereby addition/extension in FIG. 13(c) is carried out.

As thus far described, in the digital broadcasting transmitting method according to the first example of the third embodiment, when the multiplexed data, i.e., the transport stream is transmitted, the scanning method information of video data of the transport stream is given to the original network ID of the NIT packet, and the scanning method information for each service is given to the service type in the service list descriptor of the NIT packet. Therefore, to the existing digital broadcasting system using video data of a specified scanning method, a network using data of another scanning method is added, without adversely affecting the reproducing apparatus for the existing system.

With respect to the network to be added, it is possible to use video data of plural scanning methods, whereby degree of freedom in program construction is improved.

In addition, while the transport stream which includes video data of one scanning method is added in the first and second examples, the transport stream may include plural services of different scanning methods in the third embodiment, and therefore system extension is rendered more flexible.

Yet in addition, in the digital broadcasting transmitting method of the second example of this embodiment, scanning method information for each service is given to the service type in the service list descriptor of the SDT packet rather than to the service type in the service list descriptor of the NIT packet in the first example, and the same effects as provided by the first example are obtained. Also, since the apparatuses of the first and second examples bear about the same processing burden, either can be selected depending upon setting of the existing system, or its later extension plan.

Further, in the digital broadcasting transmitting apparatus of this embodiment, the non-interlace video data storage unit 22 and the non-interlace video packet creating unit 23 are added to the prior art transmitting apparatus in FIG. 59, to use non-interlace video data to-be-transmitted.

Still further, in the digital broadcasting reproducing apparatus of this embodiment, the non-interlace video decoding unit 3, the identification information storage unit 5, and the scanning method instructing unit 7 are added to the prior art reproducing apparatus in FIG. 59, to use non-interlace video data to-be-reproduced.

It should be noted that information, code allocation, and processing procedure in a flowchart of the third embodiment are only illustrative and not restricted thereto.

Embodiment 4

A digital broadcasting transmitting method of a fourth embodiment is characterized in that an original network ID has network scanning method information indicative of a scanning method of video data as information for each network as in the case of the third embodiment, and extension of a digital broadcasting system is performed, in which scanning methods of events coexist (scanning methods vary event by event).

A transmitting apparatus and a reproducing apparatus of the fourth embodiment are identical to those of the first embodiment and therefore will be described with reference to FIG. 1. Extension of the digital broadcasting system will be described with reference to FIGS. 13(a) to 13(c).

In this embodiment, extension in FIG. 13(b) or 13(c) is performed on condition that a video data scanning method is predetermined for each event, and in the same manner as already described in the first to third embodiments. In the third embodiment, each service include interlace video data or non-interlace video data, while in the fourth embodiment, in addition to this, each service may include video data of two methods.

While the transport stream TS101 in FIG. 13(b) or the network 2 in FIG. 13(c) may include an interlace service and a non-interlace service, in this example, a "coexist" service may be further included. It is assumed that an event of interlace video data and an event of non-interlace video data may coexist in the "coexist" service.

As in the first to third embodiments, on condition that "A. In a receiving end, normal receiving and processing is carried out only when an original network ID is recognized, and is identical to a network ID" in the existing broadcasting system, video data of a different scanning method can be used in an extended digital broadcasting system, without adversely affecting the reproducing apparatus only for the existing system.

A structure of the transport stream transmitted over the network 1 or 2 is identical to that of FIG. 4(a) or 4(b), and the transport stream in FIG. 4(b) is not processed by the reproducing apparatus OLD in FIG. 13(b) or 13(c) if received as in the first to third embodiments.

Also in the fourth embodiment extension in FIG. 13(b) will he described, and assume that the existing system uses services 1 and 3 of interlace video data, and extension is performed by adding a transport stream TS 101 including a service 11 of non-interlace video data and a service 13 in which non-interlace and interlace events coexist.

Figure 18:
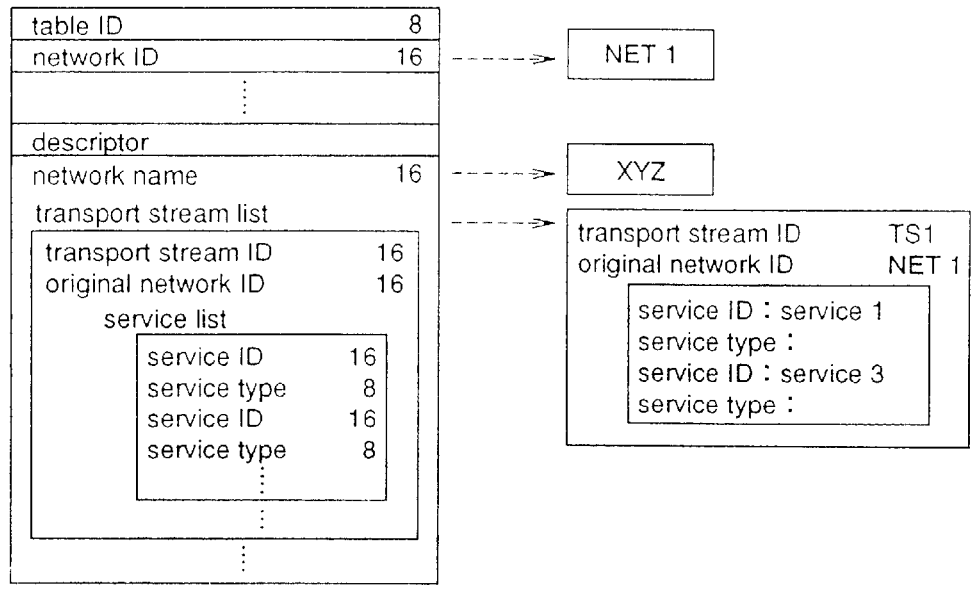
FIGS. 18(a) and 18(b) are diagrams each illustrating an NIT transmitted in a digital broadcasting transmitting method according to a fourth embodiment of the invention.
Figure 18:
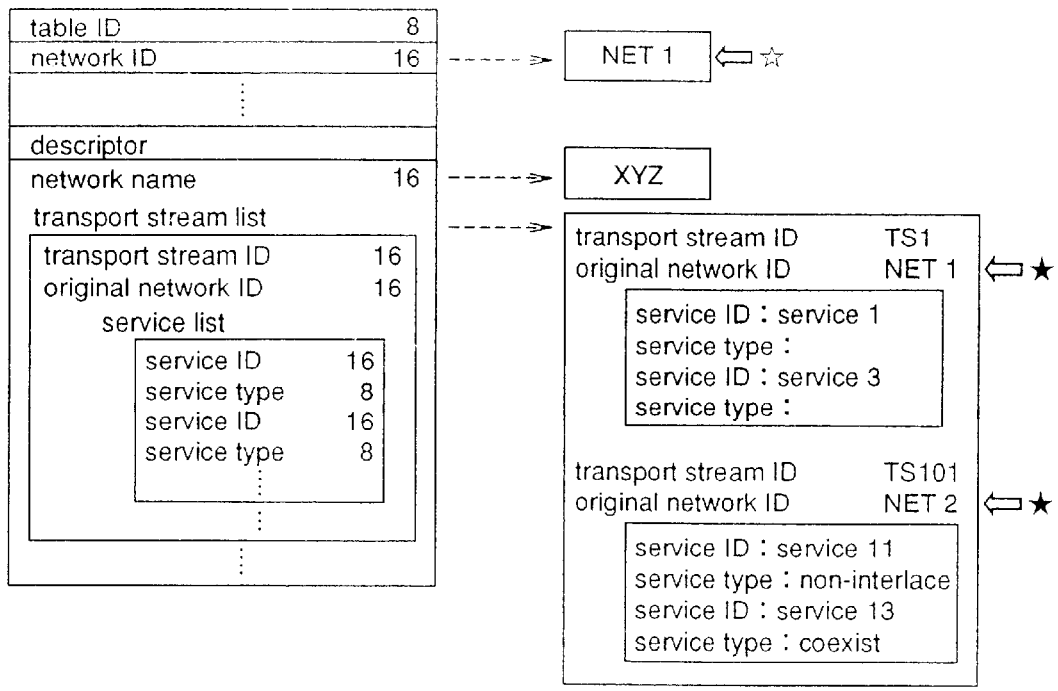

FIGS. 18(a) and 18(b) show NIT packets for use in the fourth embodiment, and they are identical to those of the third embodiment (see FIGS. 14(a) and 14(b)) except that a service type of the service 13 is "coexist". Note that the code allocation in FIG. 7(b) contains no code "coexist". FIG. 19 shows code allocation as a specifying method (scanning methods coexist). As shown in the figure, these codes respectively specify "interlace", "non-interlace", or "coexist" for each service.

FIG. 20 shows information indicative of a video data scanning method for each event of this embodiment. As shown in the figure, in a case where an NIT original network ID is "NET 2", a scanning method is represented by a service type in an NIT service list, and when "coexist", a scanning method is specified for each event in an EIT event list. In this specification, the component types in FIGS. 10 and 11 may be used. As a result, a scanning method of video data of each event of a service 13 is specified as shown in FIG. 20.

Hereinafter, operation of the digital broadcasting transmitting apparatus and the reproducing apparatus of this embodiment (1) "CREATION AND TRANSMISSION OF MULTIPLEXED DATA OF DIGITAL TRANSMITTING APPARATUS", and (2) "REPRODUCTION OF DIGITAL BROADCASTING REPRODUCING APPARATUS" will be described.

(1) Creation and Transmission of Multiplexed Data of Digital Broadcasting Transmitting Apparatus Referring to FIG. 1 again, the interlace video data packet creating unit 21 obtains video data required for interlace program creation of services 1, 3 and 13 from the interlace video data storage unit 20 in which video data digitized by the interlace method is stored, to create interlace video data packets, and outputs the interlace video data packets to the multiplexing unit 28.

The non-interlace video data packet creating unit 23 obtains video data required for non-interlace program creation of services 11 and 13 from the non-interlace video data storage unit 22 in which video data digitized by the non-interlace method is stored, to create non-interlace video data packets, and outputs the non-interlace video data packets to the multiplexing unit 28.

The service information packet creating unit 27 sets an original network identifiers ID of the TS1 and the TS101 to be "NET 1" and "NET 2", respectively, in the transport stream list of the NIT packet. The service information packet creating unit 27 creates the NIT packet by giving a code indicative of non-interlace and a code indicative of coexist to service types of the services 11 and 13, respectively, in the service list of the descriptor, and further, creates the EIT packet by giving codes indicative of scanning methods of events of the service 13 to the corresponding component types in the event list of the EIT packet, although this is not performed for the service 11 as shown in FIG. 20. The creating unit 27 outputs the NIT and EIT in FIG. 20 and other service information packets to the multiplexing unit 28.

The multiplexing unit 28 creates multiplexed data from service information packets of the NIT and EIT and video data packets and outputs the multiplexed data to the transmitting unit 29, which transmits the resulting transport streams, TS1 and TS101, over the network 1.

(2) Reproduction of Digital Broadcasting Reproducing Apparatus

The transport streams transmitted in (1) are received and processed by the reproducing apparatus 210 to reproduce and display video. Here, the viewer Can utilize broadcasting.

Figure 21:
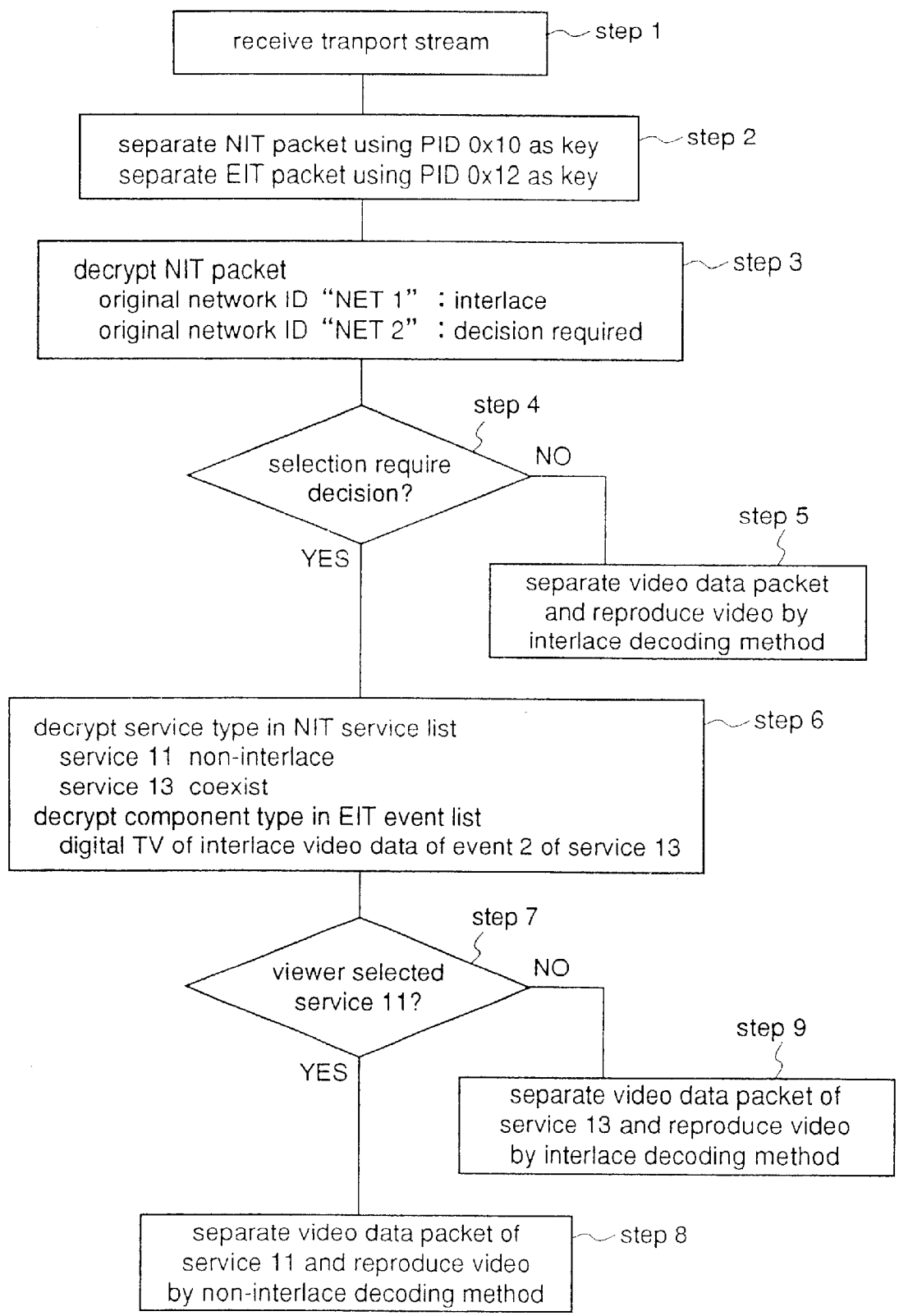
FIG. 21 is a flowchart for explaining the operation of a digital broadcasting reproducing apparatus according to the fourth embodiment.

FIG. 21 shows a flowchart of processing procedure of the reproducing apparatus 210 of this embodiment after receiving the transport streams. Hereinafter, operation of the reproducing apparatus 210 will be described following flow in FIG. 21. Assume that the reproducing apparatus 210 is also NEW in FIG. 13(*b*).

Steps 1 to 5 are performed as in the (2)-2 of the second embodiment. On the basis of decision in step 4, in step 6, it is decided that the services 11 and 13 are non-interlace and coexist, respectively, from the service types in the service list of the NIT packet. For the service 13 "coexist", scanning method information of events of the service 13 at that point of time is obtained, from the component types in the event list of the EIT packet. This information is also stored in the identification storage unit 5. Step 7 and the following steps are identical to those in FIG. 15, and video of respective services is reproduced.

Also as in the first to third embodiments, a transport stream including non-interlace video data is not processed by the reproducing apparatus OLD (FIG. 13(*b*)) if received, which circumvents troubles (flicker) caused by processing inappropriate video data.

A second example of the fourth embodiment will now be described. In the second example, addition/extension is performed as in the first example.

Figure 22:
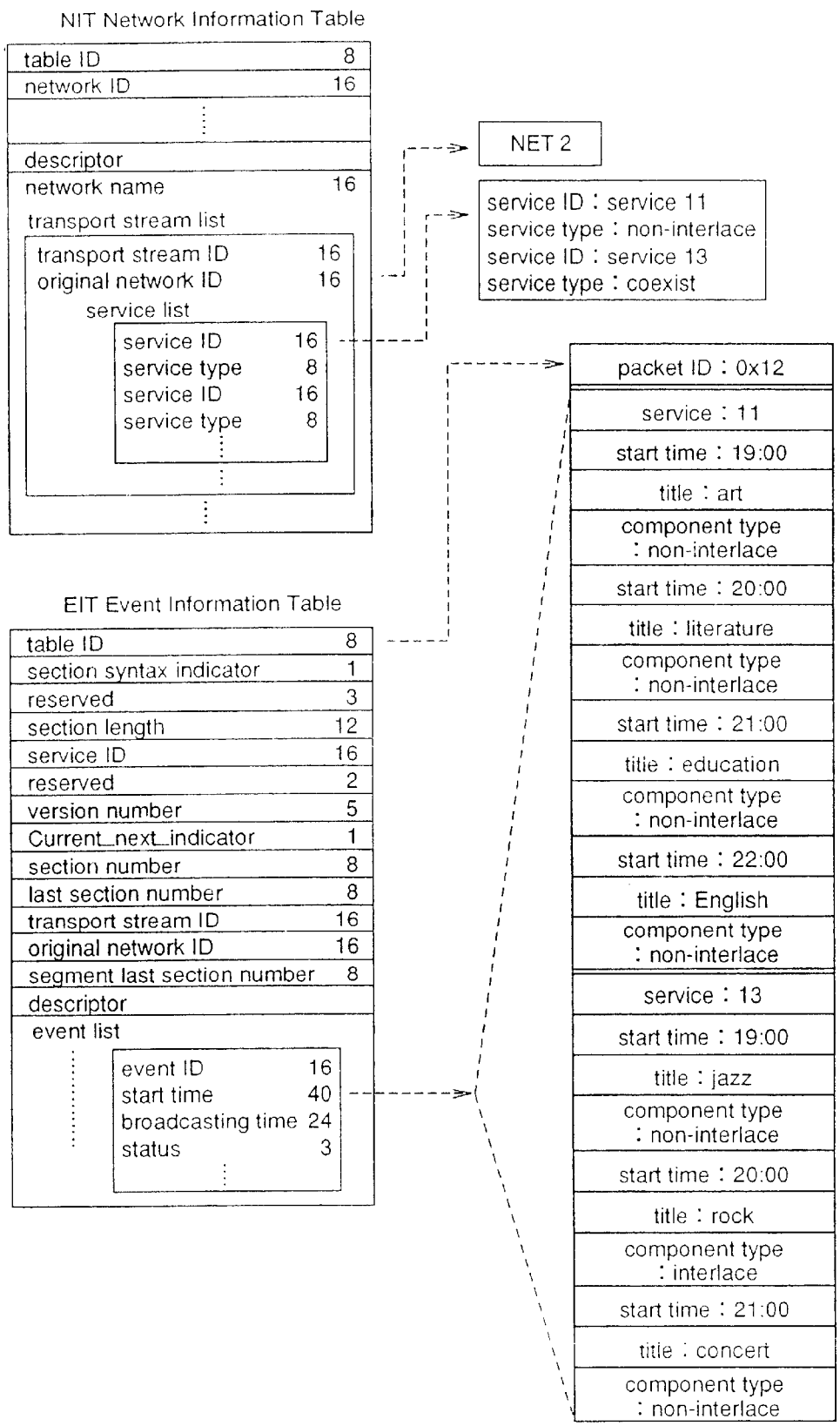
FIG. 22 is a diagram illustrating an NIT and an EIT transmitted in a digital broadcasting transmitting method according to another example of the fourth embodiment.
Figure 23:
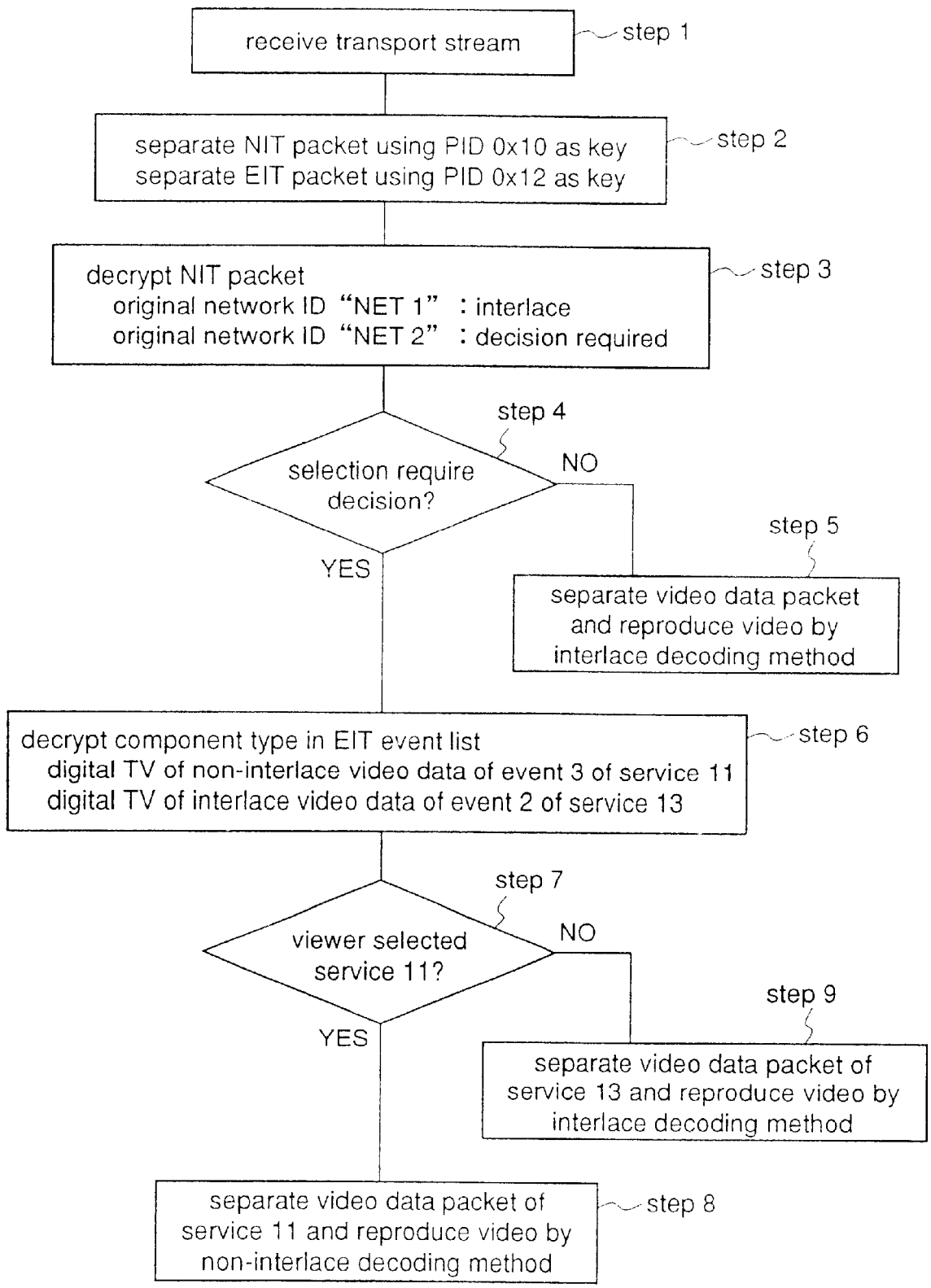
FIG. 23 is a flowchart for explaining the operation of a digital broadcasting reproducing apparatus according to the example of the fourth embodiment.

FIG. 22 shows NIT and EIT packets of this example. While the scanning method information of each event is given to the event list of the EIT for the service 13 which includes events "coexist" in the first example, the scanning method information for each event is also given to the event list of the EIT for the service 11. FIG. 23 shows a flowchart of processing procedure of the digital broadcasting reproducing apparatus 210 after receiving the transport stream.

Operation of the digital broadcasting transmitting apparatus of the second example is identical to that of the first example except that the service information packet creating unit 27 creates EIT by giving the scanning method information for each event to services 11 and 13. As a result, multiplexed data including the NIT and EIT in FIG. 22 is transmitted as a transport stream.

Operation of the reproducing apparatus of this example differs in step 6 in FIG. 23 from that of the first example. Specifically, in step 6 of this example, scanning method information of events of the services 11 and 13 is obtained from their respective component types in the event list, to be stored in the identification storage unit 5. The other steps are identical to those of the first example, and decoding adapted to the corresponding scanning methods is performed, thereby video is reproduced and displayed.

While the scanning method information for each service is given to the service type in the NIT service list according to the first example of the third embodiment, in these first and second examples, it may be given to the service type in an SDT service list according to the second example of the third embodiment, and events "coexist" are illustrated in the same manner.

In addition, while extension in FIG. 13(*b*) has been described in the first and second examples, extension in FIG. 13(*c*) is also possible as in the third embodiment.

As thus far described, in the digital broadcasting transmitting method according to the first example of the fourth embodiment, when the multiplexed data, i.e., the transport stream is transmitted, the scanning method information of video data of the transport stream is given to the original network ID of the NIT packet, and the scanning method information for each service is given to the service type in the service list descriptor of the NIT packet, and if the information for each service indicates "coexist", the scanning method information for each event is given to the event list of the EIT packet, and transmitted. As a result, to the existing digital broadcasting system using video data of a specified scanning method, a network using data of another scanning method is added, without adversely affecting the reproducing apparatus for the existing system.

With respect to the network to be added, it is possible to use video data of plural scanning methods, whereby degree of freedom in program construction is improved.

In addition, while the transport stream to-be-added includes video data of one scanning method in the first and second embodiments, and the transport stream to-be-added includes plural services of different scanning methods in the third embodiment, the transport stream to be added include the service of events of different scanning methods in the fourth embodiment. As a result, extension is rendered more flexible.

Yet in addition, in the digital broadcasting transmitting method according to the second example of this embodiment, the same effects as provided by the first example of this embodiment is obtained by giving scanning method specifying information is given to the EIT event list for each event, regardless of service types of the NIT service list.

Compared to the first example, the first example improves efficiency in transmission and reproduction rather than the second example, since scanning method information for each event is given only to a service including events "coexist" and this information is used for reproduction. However, setting of this example becomes possible depending upon setting of the existing system and its later extension plan, and addition/extension is performed, in which a service including events "coexist" can be used.

In addition, in the digital broadcasting transmitting apparatus of this embodiment, the non-interlace video data storage unit 22 and the non-interlace video packet creating unit 23 are added to the prior art transmitting apparatus in FIG. 59, to use non-interlace video data to-be-transmitted. As in the prior art example, audio data packeted and multiplexed into multiplexed data will not be described for simplicity.

Yet in addition, in the digital broadcasting reproducing apparatus of this embodiment, the non-interlace video decoding unit 3, the identification information storage unit 5, and the scanning method instructing unit 7 are added to the prior art reproducing apparatus in FIG. 59, to use non-interlace video data to-be-reproduced. Also as in the prior art example, a decoding unit for decoding audio data will not be shown for simplicity.

Further, it should be noted that information, code allocation, and processing procedure in a flowchart of the second embodiment are only illustrative and not restricted thereto.

Embodiment 5

A digital broadcasting transmitting method of a fifth embodiment is characterized in that a network ID has network scanning method information indicative of a scanning method of video data to-be-transmitted over a network as information for each network.

Also in the fifth embodiment, a digital broadcasting transmitting method, a digital broadcasting transmitting apparatus, and a digital broadcasting reproducing apparatus are illustrated, in which an existing system using video data of a scanning method is extended by adding a network using video data of another scanning method thereto.

C) Specifically, to a (original) digital broadcasting system using interlace video data (see FIG. 24(a)), a network using non-interlace video data is added (see FIG. 24(b)). Assume that "B. In a receiving end, normal receiving and processing is carried out even if an original network ID is not recognized or it is different from a network ID as already described in the prior art.

Therefore, while use of the original network ID circumvents adverse effects on the reproducing apparatus for the existing system in the transmitting methods of the first to fourth embodiments, this is unfeasible with the existing system of this embodiment. As a solution to this, assume that a network ID of each receiving apparatus is used as network scanning method information.

However, since a network ID of a network 2 to-be-added is different from that of the network 1, broadcasting of the network 2 is not received by the reproducing apparatus in the same way. In view of this, on assumption that information for specifying a network is obtained from another service information for the reproducing apparatus for the networks 1 and 2 in FIG. 24(b), broadcasting of the network 2 to-be-added is processed as in the network 1. Thus, video data of a different scanning method can be used in the extended digital broadcasting system without adversely affecting the existing system.

A transmitting apparatus and a reproducing apparatus of the fifth embodiment are identical to those of the first embodiment and therefore will be described with reference to FIG. 1.

Figure 25:
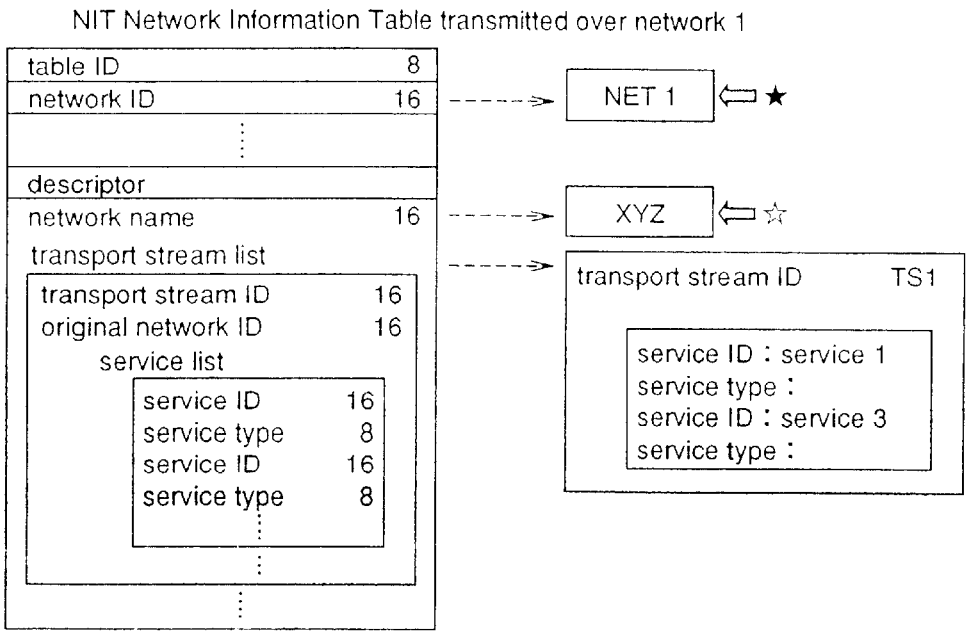
FIGS. 25(a) and 25(b) are diagrams each illustrating an NIT transmitted in a digital broadcasting transmitting method according to the fifth embodiment.
Figure 25:
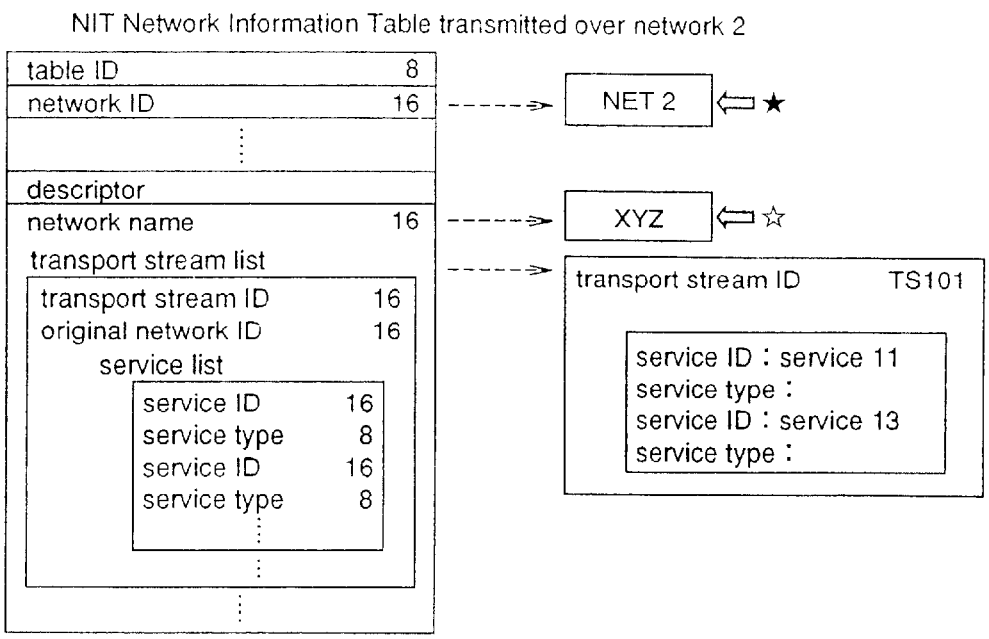
Figure 26:
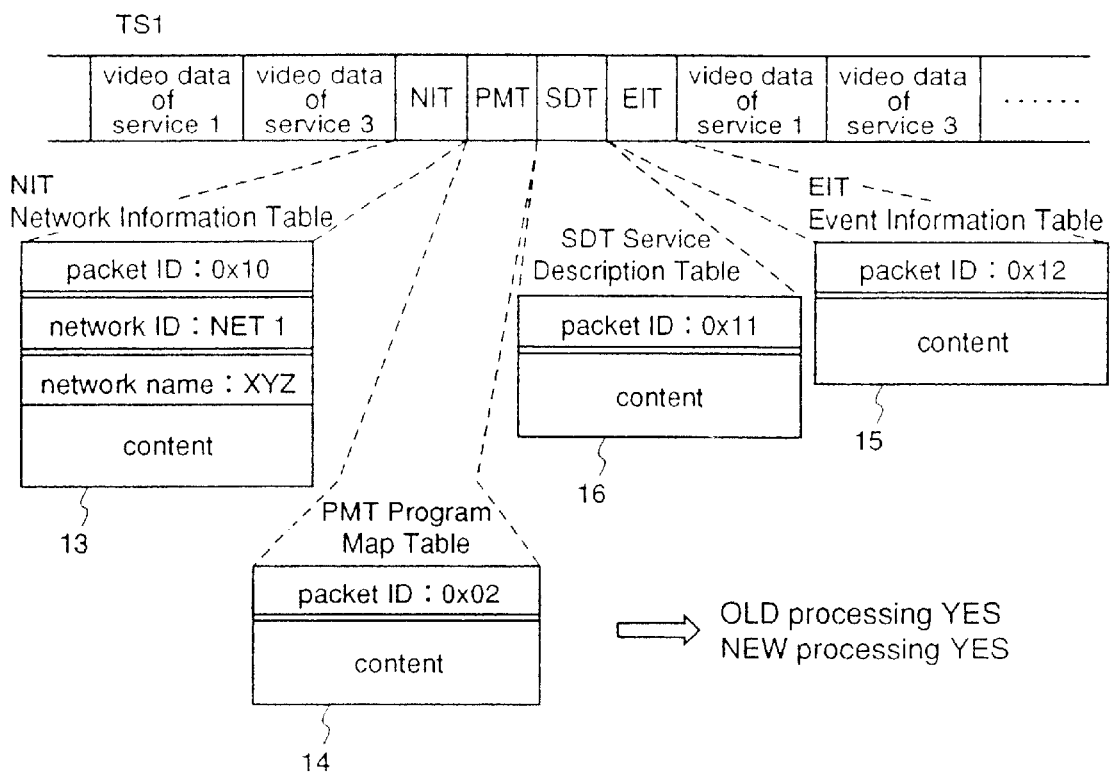
FIGS. 26(a) and 26(b) are diagrams each illustrating the structure of multiplexed data transmitted in the digital broadcasting transmitting method according to the fifth embodiment.
Figure 26:
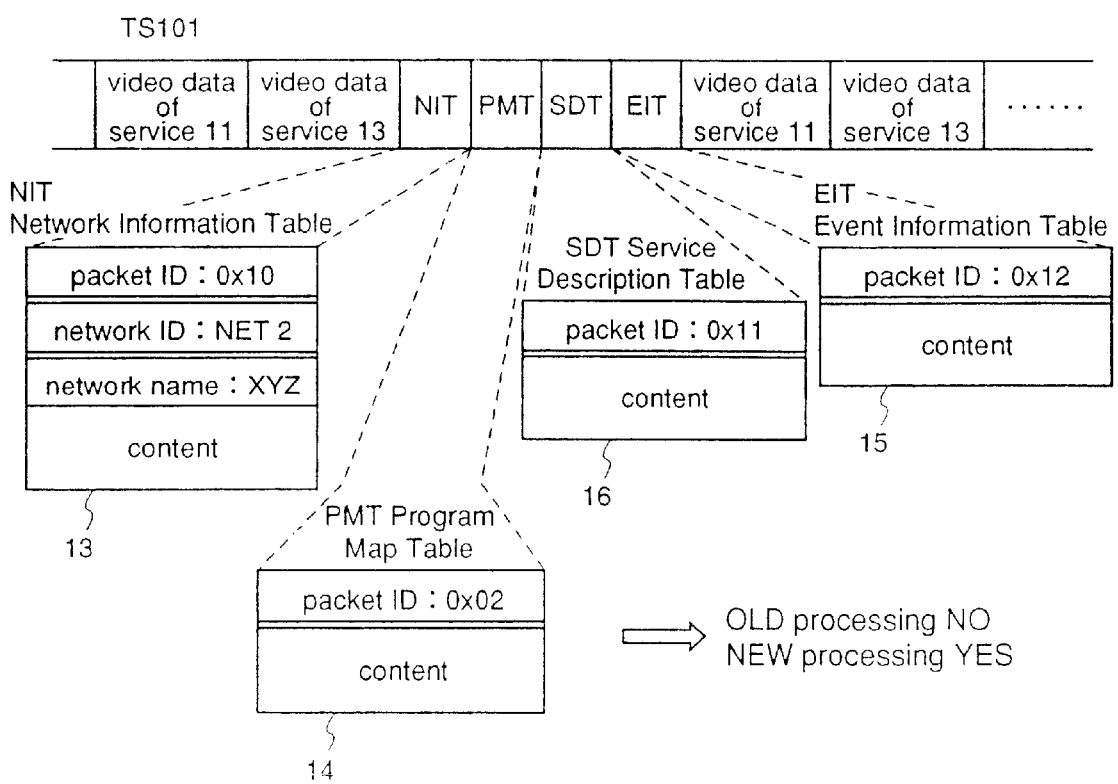

FIGS. 25(a) and 25(b) show NIT packets for use in the fifth embodiment. FIG. 26 shows transport streams TS1 and TS101 to-be-transmitted in the extended digital broadcasting system.

In the NIT in FIG. 25(a), a network ID and a network name of a TS1 are "NET 1" and "XYZ", respectively, and the TS1 is received and processed by the reproducing apparatus OLD in FIG. 24(b). On the other hand, in the NIT in FIG. 25(b), a network ID and a network name of a TS101 are "NET2" and "XYZ", respectively, and the TS101 is not processed by the reproducing apparatus OLD if received. This is because the OLD decides that the TS101 is not of the network 1 to which the OLD itself belongs, from "NET 2". That is, the TS101 including the NIT packet in FIG. 25(b) will not be received by the OLD.

On the other hand, the reproducing apparatus NEW for the networks 1 and 2 is set to decide a network from a network name, transport streams transmitted over the networks 1 and 2 are assumed to be of the same network, whereby extension is rendered flexible.

In transport streams TS1 and TS101 in FIGS. 26(a) and 26(b), the NIT packets differ from each other, but the other packets have the same structure, which has been already described in the first embodiment (see FIGS. 4(a) and 4(b)). It should be noted that illustrated packet identifiers ID are illustrative, and not restricted thereto so long as packets can be identified by them.

Hereinafter, operation of the digital broadcasting transmitting apparatus and the reproducing apparatus of the fifth embodiment (1) "CREATION AND TRANSMISSION OF MULTIPLEXED DATA OF DIGITAL TRANSMITTING APPARATUS", and (2) "REPRODUCTION OF DIGITAL BROADCASTING REPRODUCING APPARATUS" will be described.

(1) Creation and Transmission of Multiplexed Data of Digital Broadcasting Transmitting Apparatus The TS1 in FIG. 26(a) is created as in the prior art example and transmitted over the network 1 by the transmitting apparatus 29. Hereinafter, creation of the TS101 in FIG. 26(b) will be described.

Video data packets are created as in the first example. The service information packet creating unit 27 creates the NIT packet by setting a network ID and a network name to be "NET2" and "XYZ" (as in the case of NIT of the TS1), respectively, and further creates the other service information packets as in the first example. Then, the unit 27 outputs the service information packets to the multiplexing unit 28.

The multiplexing unit 28 multiplexes the video data packets and the service information packets in fixed sizes, respectively, to create multiplexed data in FIG. 26(b), and outputs the multiplexed data to the transmitting unit 29, which transmits the TS101 over the network 2.

(2) Reproduction of Digital Broadcasting Reproducing Apparatus

The transport streams transmitted in (1) are received and processed by the reproducing apparatus 210 to reproduce and display video. Here, the viewer can utilize broadcasting.

Figure 27:
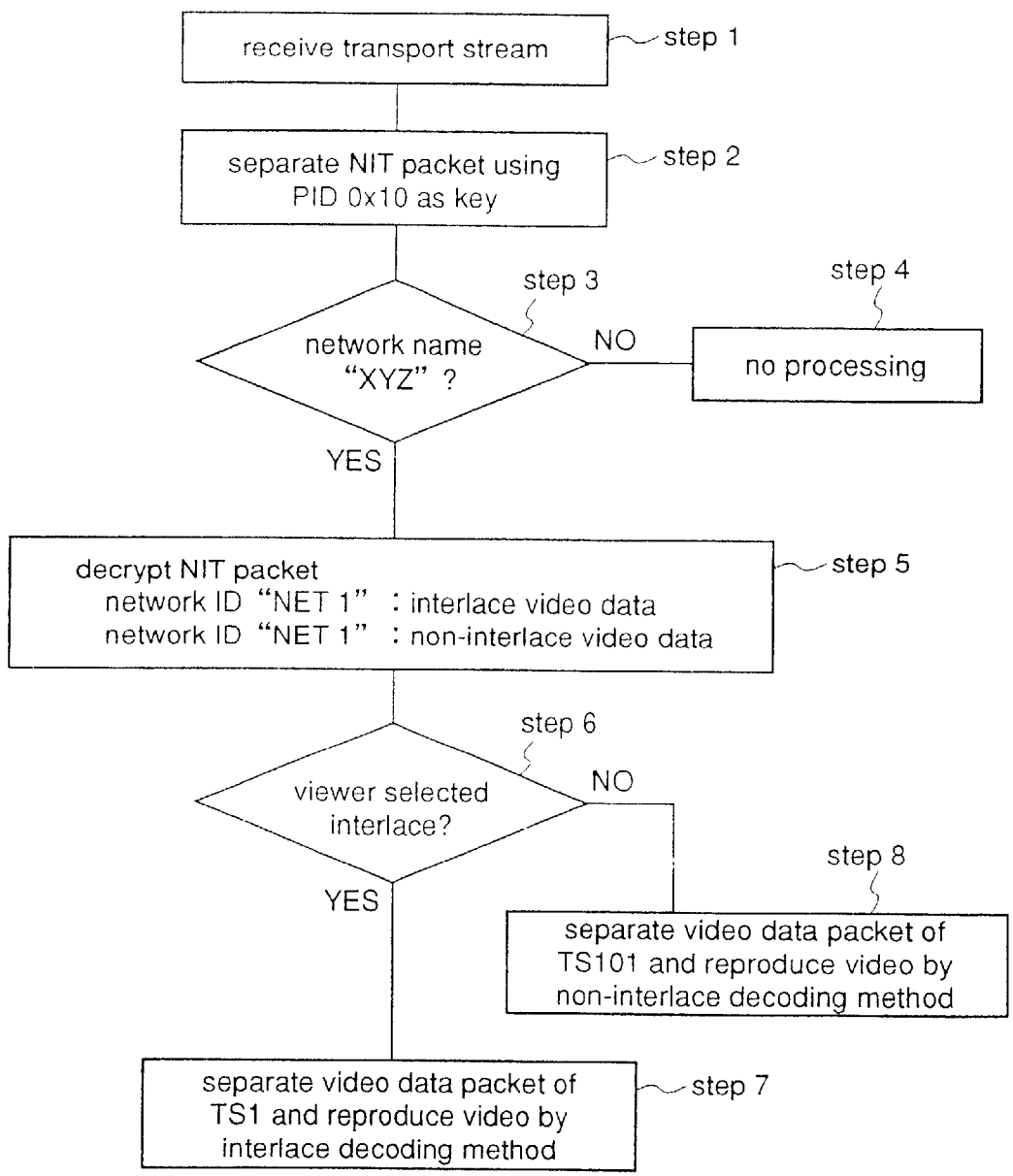
FIG. 27 is a flowchart for explaining the operation of a digital broadcasting reproducing apparatus according to the fifth embodiment.

FIG. 27 shows a flowchart of processing procedure of the reproducing apparatus 210 of this embodiment after receiving the transport stream. Hereinafter, operation of the reproducing apparatus 210 will be described following flow in FIG. 27. Assume that the reproducing apparatus 210 is NEW for the networks 1 and 2 in FIG. 24 (b).

In step 1, the receiving unit 1 receives multiplexed data, i.e., the transport stream transmitted over a transmission medium, and outputs the multiplexed data to the separating unit 2. In step 2, the separating unit 2 separates the NIT packet using packet ID 0x10 as a key.

In step 3, "network name" contained in the NIT packet is identified. Whether the TS1 or the TS101 is received, it includes "XYZ", and therefore is processed by the reproducing apparatus 210 in the same way.

Subsequently, in step 5, the NIT packet is decrypted, to obtain scanning method information of video data from information of the network ID.

More specifically, where the TS1 is received over the network 1, it is shown that the TS1 includes interlace video data from "NET 1", while where the TS101 is received over the network 2, it is shown that the TS101 includes non-interlace video data from "NET 2". This information is stored in the identification storage unit 5. In addition, as in the prior art example, information about a video data packet ID contained in the PMT packet is also separated by the separating unit 2 and stored in the identification storage unit 5.

Then, the service selecting unit 6 accepts viewer's selection. Subsequent steps 6 to 8 in FIG. 27 are identical to the steps 4 to 6 in FIG. 4 of the first embodiment, and video is reproduced and displayed.

Figure 24:
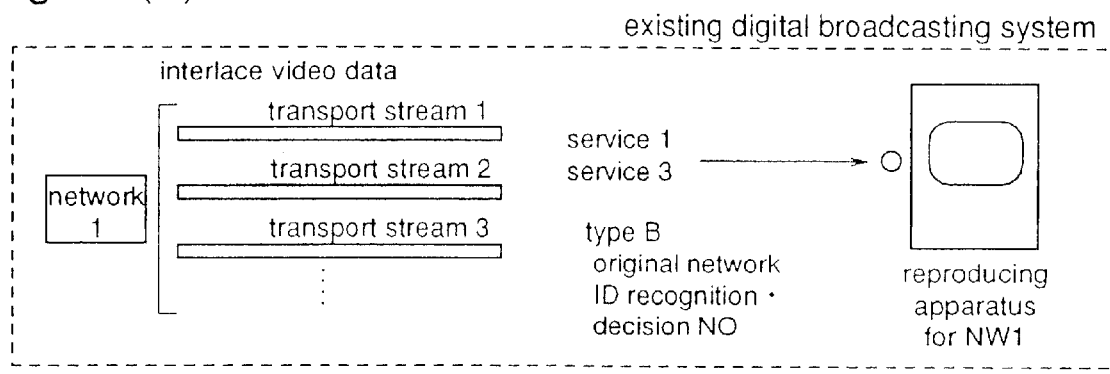
FIGS. 24(a) and 24(b) are diagrams for explaining the relationship between a digital broadcasting system according to a fifth embodiment of the invention and the existing digital broadcasting system.
Figure 24:
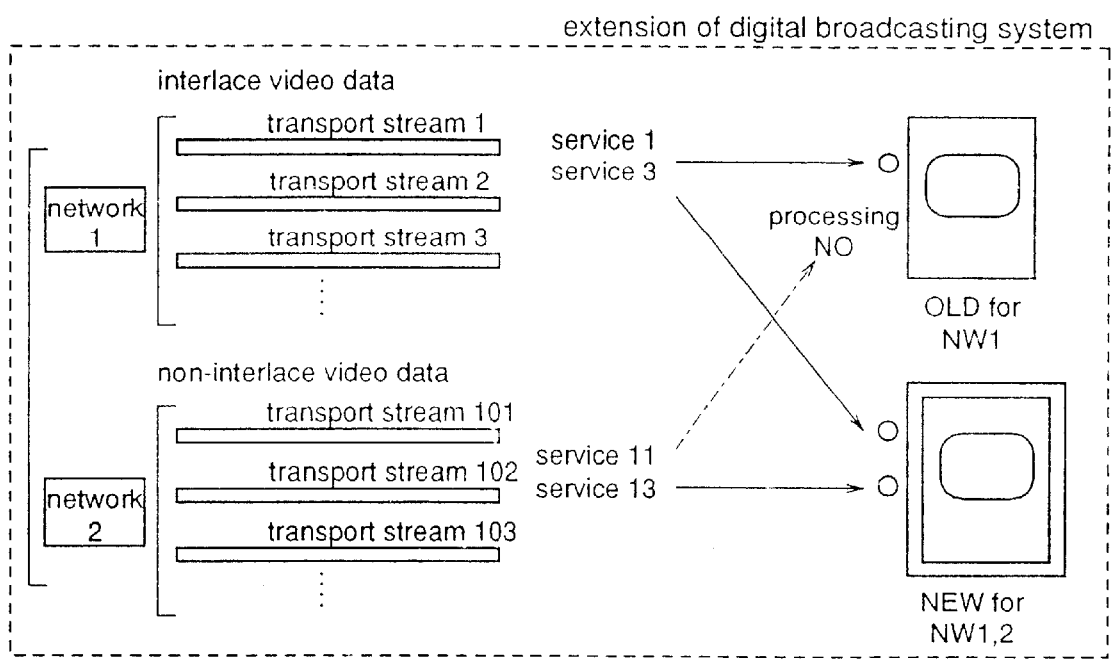

While the reproducing apparatus NEW for the networks 1 and 2 has been described, in the reproducing apparatus OLD for the network 1 in FIG. 24(*b*), it is decided that the TS101 is not of the network 1 to which the OLD itself belongs, from "NET 2", and will not be processed. This circumvents troubles (flicker) caused by processing inappropriate video data.

As thus far described, in the digital broadcasting transmitting method of the fifth embodiment, when the multiplexed data, i.e., the transport stream TS101 is transmitted, the scanning method information of video data is given to the network ID of the NIT packet, and the information for specifying a network is given to the network name of the NIT. Therefore, to the existing digital broadcasting system using video data of a specified scanning method, a network using data of another scanning method is added, without adversely affecting the reproducing apparatus for the existing system.

With respect to the network to be added, it is possible to use video data of plural scanning methods, whereby degree of freedom in program construction is improved.

In addition, in the digital broadcasting transmitting apparatus of this embodiment, the non-interlace video data storage unit 22 and the non-interlace video packet creating unit 23 are added to the prior art transmitting apparatus in FIG. 59, to use non-interlace video data to-be-transmitted.

Yet in addition, in the digital broadcasting reproducing apparatus of this embodiment, the non-interlace video decoding unit 3, the identification information storage unit 5, and the scanning method instructing unit 7 are added to the prior art reproducing apparatus in FIG. 59, to use non-interlace video data to-be-reproduced.

Further, while the scanning method information is directly given to the network ID according to the first embodiment, assuming that the network ID has scanning method information or information "decision required" according to the first and second examples of the second embodiment, and when "decision required", the scanning method information may be given to the other part of the service information, for example, the service type of the NIT list, resulting in superior later extensibility as in the second embodiment.

Still further, it should be noted that information, code allocation, and processing procedure in a flowchart of the fifth embodiment are only illustrative and not restricted thereto.

Embodiment 6

A digital broadcasting transmitting method of a sixth embodiment is characterized in that a network ID has network scanning method information indicative of a scanning method of video data information for each network as in the fifth embodiment, and, further, extension of the digital broadcasting system in which service scanning methods coexist (scanning methods vary service by service) is performed.

A digital broadcasting transmitting apparatus and a reproducing apparatus of the sixth embodiment are identical to those of the first embodiment, and therefore will be described with reference to FIG. 1.

Figure 28:
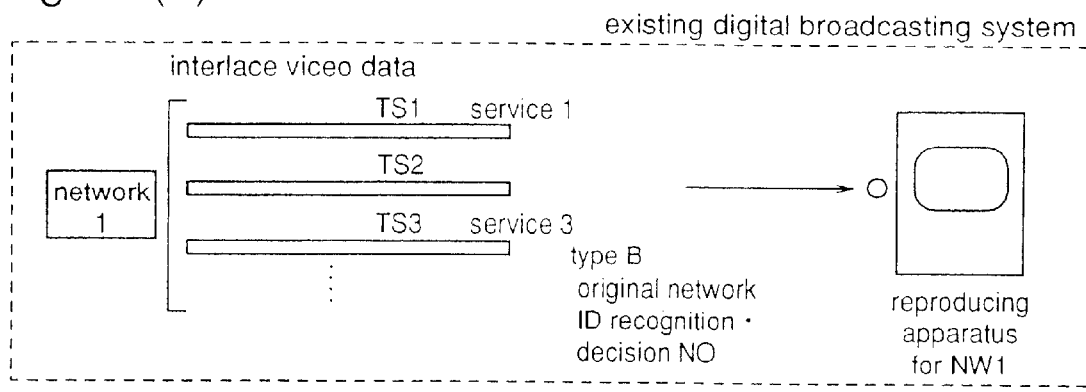
FIGS. 28(a) and 28(b) are diagrams for explaining the relationship between a digital broadcasting system according to a sixth embodiment of the invention and the existing digital broadcasting system.
Figure 28:
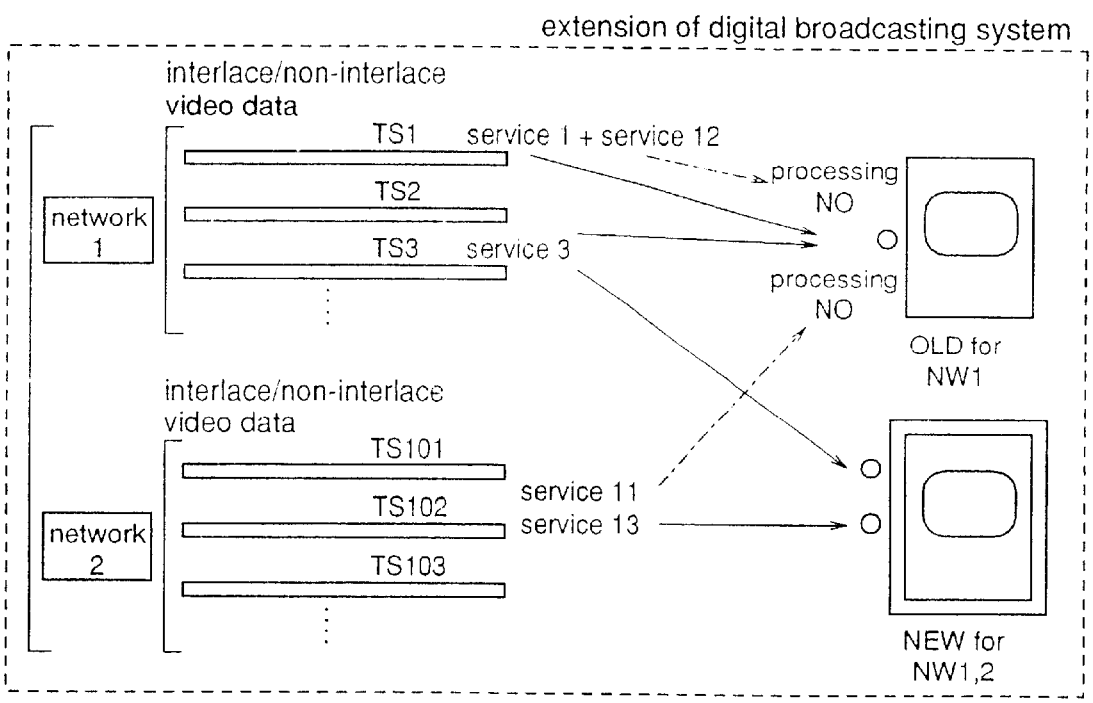

FIG. 28(*a*) shows a digital broadcasting system using interlace video data, and FIG. 28(*b*) shows extension by addition of a service using non-interlace video data (service 12 to TS1) and a transport stream including services in which different scanning methods coexist (TS101 including services 11 and 13), using the digital broadcasting transmitting method of the sixth embodiment.

While the transport stream using the non-interlace video data is added by the network 2 in the fifth embodiment, a transport stream of the network 2 may include "interlace", "non-interlace", or "coexist" services in the sixth embodiment. Further, service of a different scanning method may be added to a transport stream of the existing network.

D) As in the case of the fifth embodiment, "B. In a receiving end, normal receiving and processing is carried out even if an original network ID is not recognized or it is different from a network ID. Therefore, use of the original network ID cannot circumvent adverse effects on the reproducing apparatus for the existing system. In view of this, the network ID is used as network scanning method information, and information for specifying a network is obtained from another service information for the reproducing apparatus for the networks 1 and 2 as in the fifth embodiment, thereby services to-be-added are processed as in the network 1.

In this embodiment, extension in FIG. 28(*b*) will be described. Assume that the existing system transmits a TS1 including a service 1, and a TS3 including a service 3 using interlace video data over the network 1.

In this extension, a service 12 using non-interlace video data is added to the TS1, and a service 11 using non-interlace video data and a service 13 using interlace video data transmitted in a TS101 over the network 2 are added by the network 2.

Figure 29:
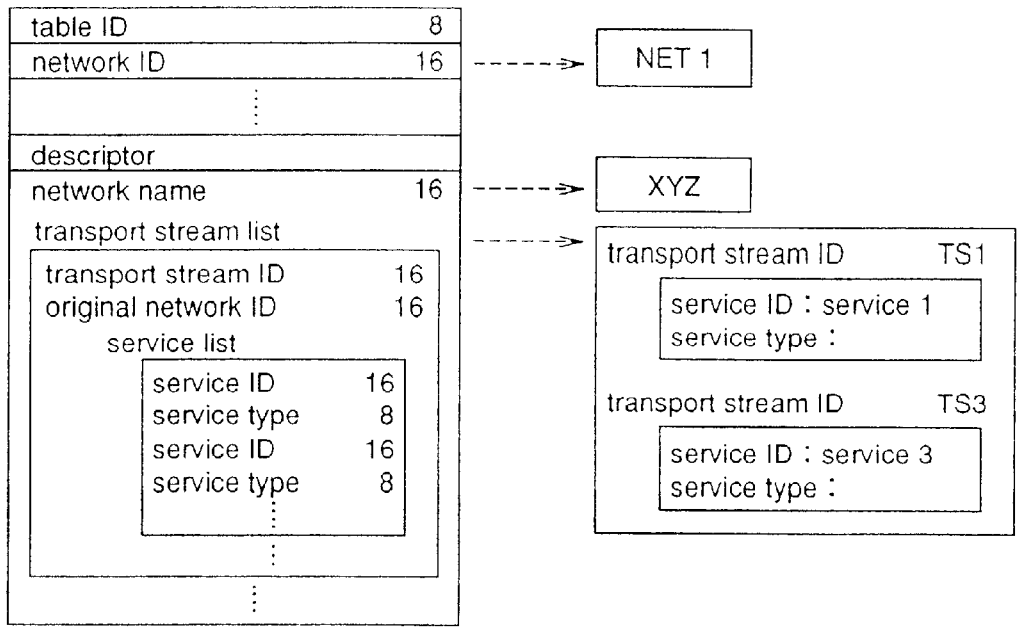
FIGS. 29(a) and 29(b) are diagrams each illustrating an NIT transmitted in a digital broadcasting transmitting method according to the sixth embodiment.
Figure 29:
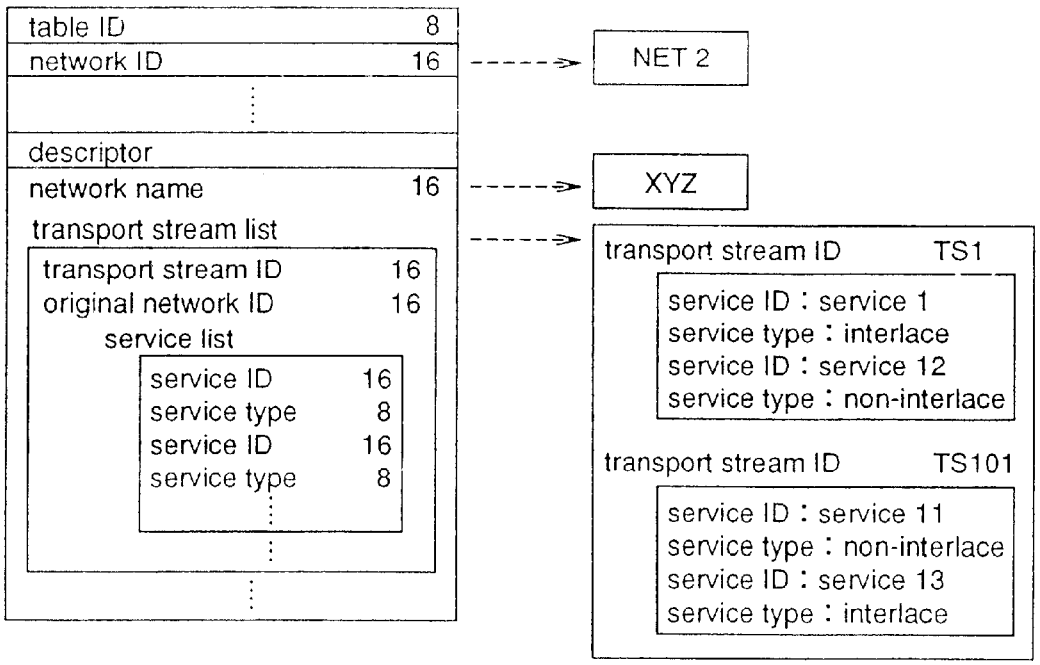
Figure 30:
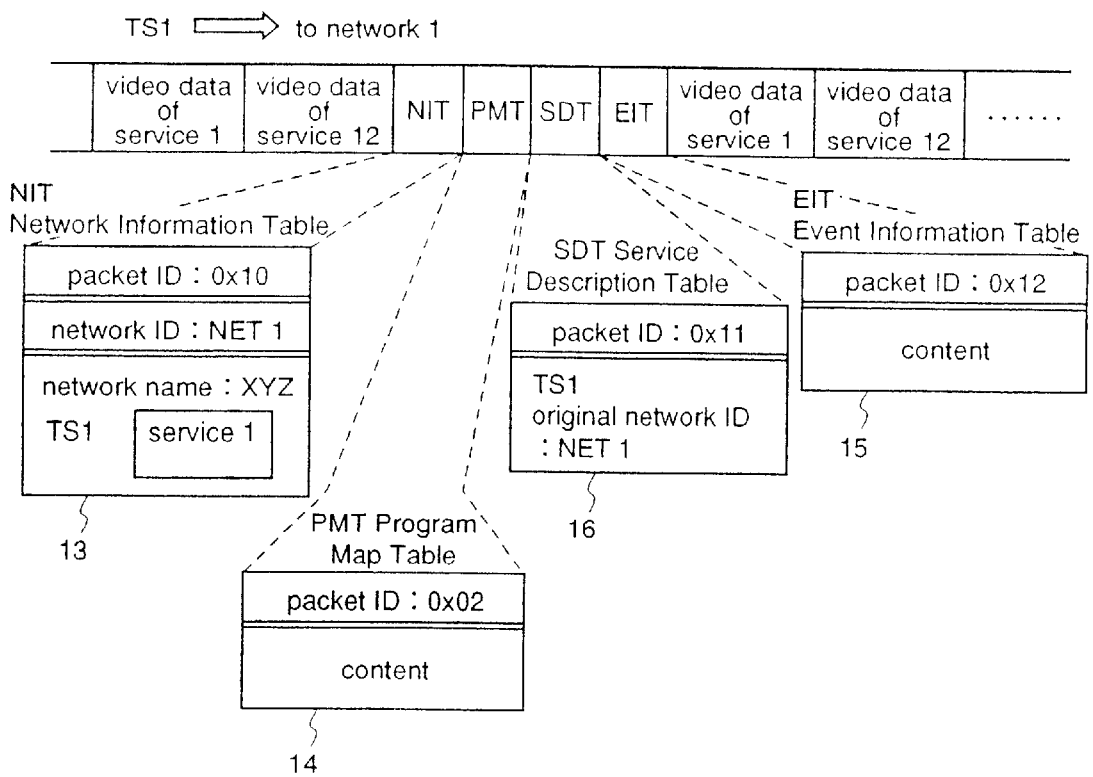
FIGS. 30(a) and 30(b) are diagrams each illustrating the structure of multiplexed data transmitted in the digital broadcasting transmitting method according to the sixth embodiment.
Figure 30:
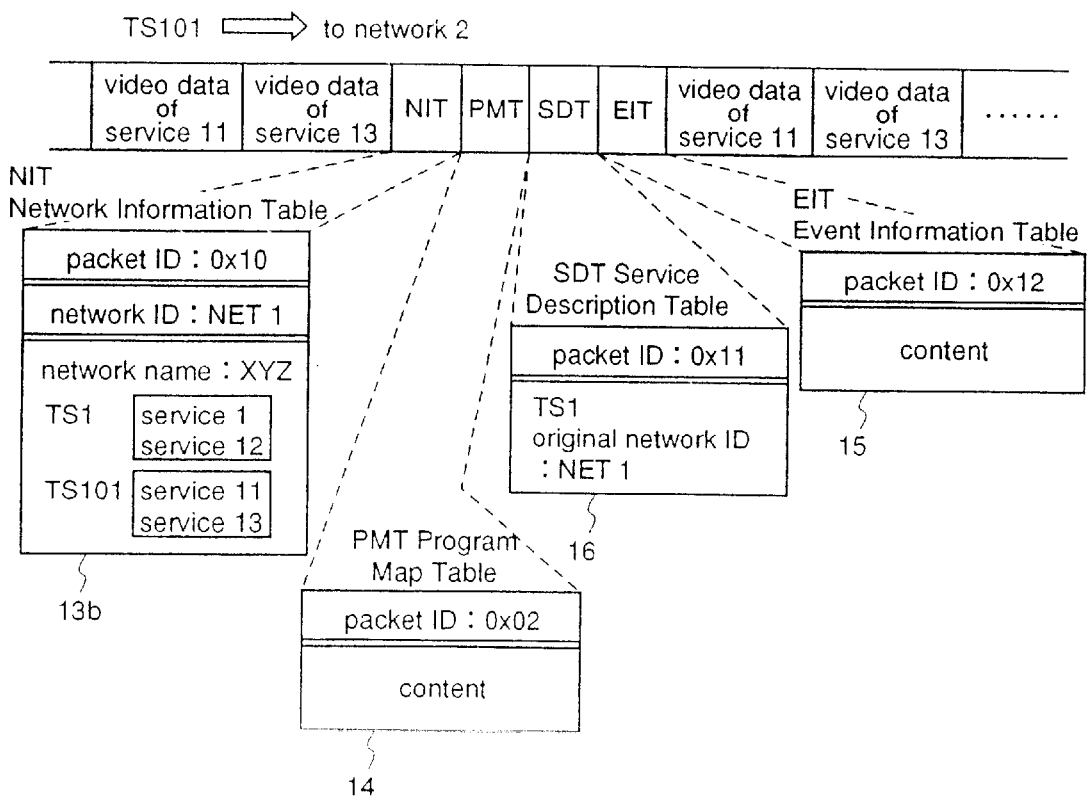

FIGS. 29(*a*) and 29(*b*) show NIT packets for use in the sixth embodiment, and FIGS. 30(*a*) and 30(*b*) show transport streams to-be-transmitted in an extended digital broadcasting system.

In the NIT in FIG. 29(*a*), a network ID and a network name of the TS1 are "NET 1", and "XYZ", respectively, and therefore the TS1 is received and processed by a reproducing apparatus OLD for the existing network 1 in FIG. 28(*b*). On the other hand, in the NIT in FIG. 29(*b*), a network ID and a network name of the TS101 are "NET2" and "XYZ", respectively, and therefore the TS101 is not processed by the OLD if received. This is because the OLD decides that the TS101 is not of the network 1 to which the OLD itself belongs, from "NET 2". That is, the TS101 including the NIT packet in FIG. 29(*b*) will not be received by the OLD.

On the other hand, since the reproducing apparatus NEW for the networks 1 and 2 is set to decide a network from a network name, transport stream transmitted over networks 1 and 2 are assumed to be of the same network and processed by the NEW. The NEW processes the TS1 transmitted over the network 1 and the TS101 transmitted over the network 2, and therefore obtains information from the NIT in FIG. 29(*a*) and the NIT in FIG. 29(*b*). That is, from the NIT in FIG. 29(*b*), the NEW obtains information about service 12 of the TS1, and the services 11 and 13 of the TS101.

Since the NEW recognizes network names and handles the networks 1 and 2 in the same way, the NIT transmitted over the network 2 is used to reproduce video data of the service 12 of the TS1 transmitted over the network 1.

On the other hand, the OLD which will not process the TS101 does not obtain information of the NIT in FIG. 29(b)), it will not reproduce the non-interlace service 12 of the TS1.

In brief, while the OLD reproduces the services 1 and 3 as in the prior art example (see FIG. 28(a)), the NEW reproduces the services 11 to 13 in addition to the service 1 and 3.

Also, as in the case of the third embodiment, a service type in the NIT service list in FIG. 29(b) indicates a scanning method for each service, and code allocation in FIG. 7(b) may be used.

In the TS1 and TS101 in FIGS. 30(a) and 30(b), the NIT packets differ from each other in structure, but the other packets have the same structure. Each packet has been already described in the first embodiment (see FIGS. 4(a) and 4(b)). It should be noted that illustrated packet identifiers ID are illustrative, and not restricted thereto so long as packets can be identified by them.

Hereinafter, operation of the digital broadcasting transmitting apparatus and the reproducing apparatus of the sixth embodiment (1) "CREATION AND TRANSMISSION OF MULTIPLEXED DATA OF DIGITAL BROADCASTING TRANSMITTING APPARATUS", and (2) "REPRODUCTION OF DIGITAL BROADCASTING REPRODUCING APPARATUS" will be described.

(1) Creation and Transmission of Multiplexed Data of Digital Broadcasting Transmitting Apparatus Referring to FIG. 1 again, the non-interlace video data packet creating unit 23 obtains video data required for program creation of the services 11 and 12 from the non-interlace video data storage unit 22 in which video data digitized by the non-interlace method is stored, to create non-interlace video data packets, and outputs the non-interlace video data packets to the multiplexing unit 28.

The interlace video data packet creating unit 21 obtains video data required for program creation of the services 1, 3, and 13 from the interlace video data storage unit 20 in which video data digitized by the interlace method is stored, to create interlace video data packets, and outputs the interlace video data packets to the multiplexing unit 28.

The service information packet creating unit 27 creates the NIT (see FIG. 29(a)) to be multiplexed into the TS1, in which the network ID and the network name are "NET 1" and "XYZ", respectively, and outputs the NIT to the multiplexing unit 28.

The service information packet creating unit 27 further creates the NIT (see FIG. 29(b)), by setting the network ID and the network name to be "NET2" and "XYZ", respectively, and by giving "interlace", "non-interlace", "non-interlace", and "interlace" to service types of the services 1 and 12 of the TS1, and the services 11 and 13 of the TS101, respectively, and the other service information packets as in the first embodiment, and outputs the service information packets to the multiplexing unit 28.

The multiplexing unit 28 multiplexes the video data packets and the service information packets in fixed sizes, respectively. More specifically, the unit 28 creates multiplexed data, i.e., the TS1 in FIG. 30(a) from video data packets of the services 1 and 12, and service information packets including the NIT in FIG. 29(a), the TS3 (not shown in FIG. 30) from a video data packet of the service 3, and service information packets including the NIT in FIG. 29(a), and the TS101 in FIG. 30(b) from video data packets of the services 11 and 13, and service information packets including the NIT in FIG. 29(b), and outputs the multiplexed data to the transmitting unit 29, which transmits the TS1 and TS3 to the network 1 and the TS101 to the network 2.

(2) Reproduction of Digital Broadcasting Reproducing Apparatus

Figure 31:
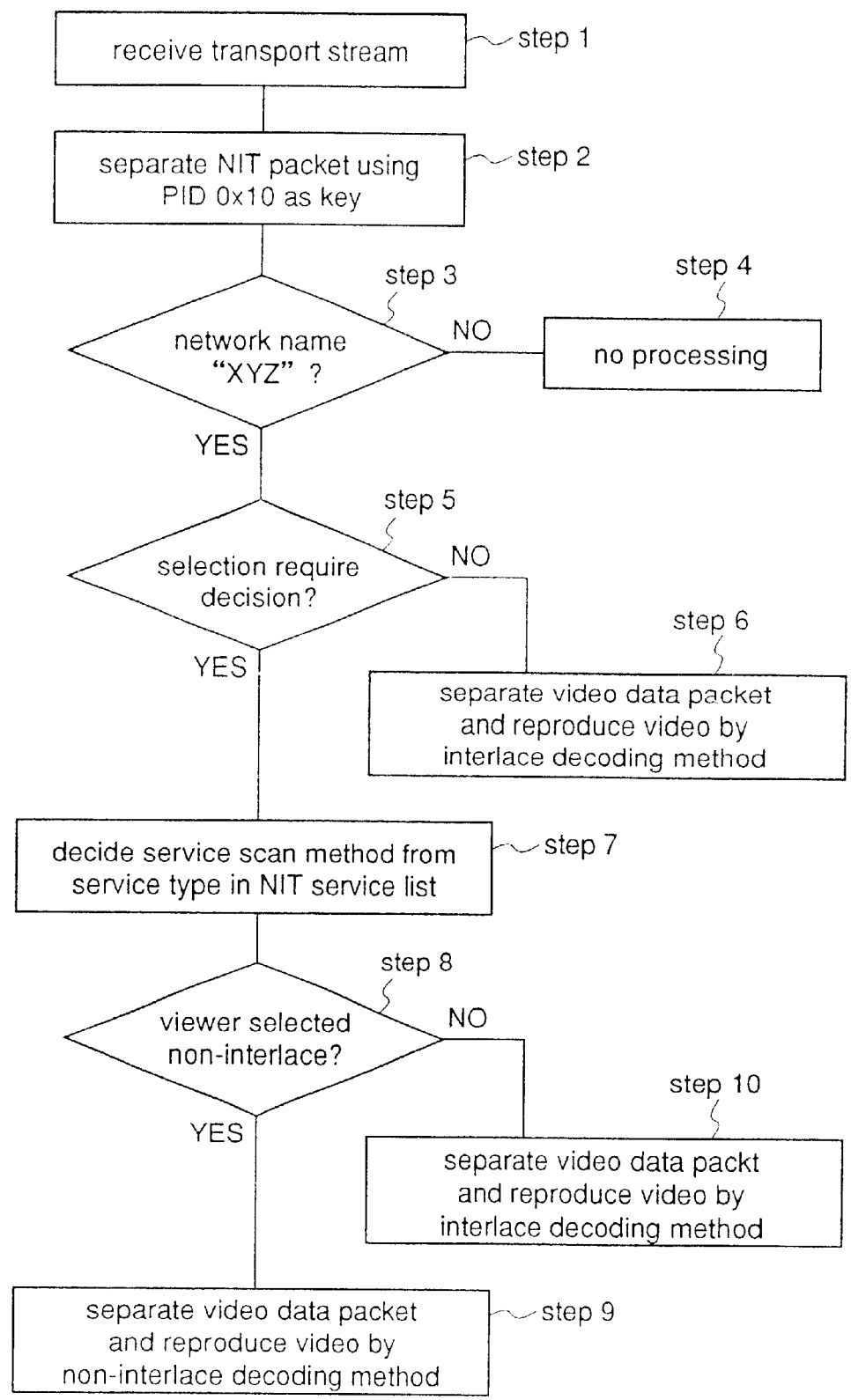
FIG. 31 is a flowchart for explaining the operation of a digital broadcasting reproducing apparatus according to the sixth embodiment.

FIG. 31 shows a flowchart of processing procedure of the reproducing apparatus 210 of this embodiment after receiving the transport streams. Hereinafter, operation of the reproducing apparatus 210 after receiving the transport streams in (1) will be described following flow in FIG. 31. Assume that the reproducing apparatus 210 is NEW in FIG. 28(b).

Steps 1 to 4 are identical to those in FIG. 13 of the third embodiments.

Upon accepting the viewer's selection, in step 5, the service selecting unit 6 makes comparison for the NIT packets in FIGS. 29(a) and 29(b) for each transport stream, to make decision. Transport stream identifiers TS1 and TS101 are contained in the NIT containing a network ID "NET 2" in FIG. 29(b) and therefore "decision required". On the other hand, a transport stream identifier TS3 is contained in the NIT containing "NET 1" FIG. 29(a) and not contained in the NIT containing "NET 2", and therefore it is decided that the TS3 is not "decision required" but "interlace". That is, in step 5, it is decided that step 6 is performed to the service 3 of the TS3, and step 7 is performed to the other service.

In step 6, video data of the service 3 is reproduced by the interlace method as in the step 5 in FIG. 8.

In step 7, scanning method information (services 1 and 13 (interlace), services 11 and 12 (non-interlace)) for each service in the NIT service list in FIG. 29(b) is separated and extracted by the separating unit 2, and stored in the identification storage unit 5.

In step 8, decision is made for the viewer's selection, and where the selection is service 11 or 12, it is found to be non-interlace from the stored information, and step 9 is performed to it. Where the selection is service 1 or 13, step 10 is performed to it.

Steps 9 and 10 are identical to steps 8 and 9 in FIG. 8, respectively, and video data of the selected service is reproduced by the corresponding scanning method.

The reproducing apparatus OLD in FIG. 28(b) reproduces video data of services 1 and 3 as described above, and will not reproduce video data of the other services.

While scanning method information for each service is given to the service type in the NIT service list for services of the transport stream indicative of "decision required" in the sixth embodiment, it may be given to the service type in the SDT service list as in the third embodiment.

As thus far described, in the digital broadcasting transmitting method of the sixth embodiment, when the multiplexed data, i.e., the transport stream TS101 is transmitted, the information "decision required" for the video data scanning method is given by the network ID of the NIT packet, and the network name of the NIT packet is used to indicate the network to which the transport stream belongs, and further, the scanning method information for each service is given to the service type in the service list descriptor of the NIT packet, or the service type in the service list descriptor of the SDT packet. Therefore, to the existing digital broadcasting system using video data of a specified scanning method, transport streams or services using video data of another scanning method are added without adversely affecting the reproducing apparatus for the existing system.

With respect to the services to be added, it is possible to use video data of plural scanning methods, whereby degree of freedom in program construction is improved.

In addition, according to the sixth embodiment, it is possible that services of different scanning methods are added to the existing transport stream, or a transport stream in which service scanning methods coexist is added, which cannot be achieved in the fifth embodiment. Although the transmitting apparatus or the reproducing apparatus bears increased burden during creation of service packet or decision, respectively, degree of freedom is further improved by extension.

Further, in the digital broadcasting transmitting apparatus of this embodiment, the non-interlace video data storage unit 22 and the non-interlace video packet creating unit 23 are added to the prior art transmitting apparatus in FIG. 59, to use non-interlace video data to-be-transmitted.

Still further, in the digital broadcasting reproducing apparatus of this embodiment, the non-interlace video decoding unit 3, the identification information storage unit 5, and the scanning method instructing unit 7 are added to the prior art reproducing apparatus in FIG. 59, to use non-interlace video data to-be-reproduced.

It should be noted that the information, code allocation, and processing procedure in a flowchart of this embodiment are illustrative and not restricted thereto.

Embodiment 7

In a digital broadcasting transmitting method of the seventh embodiment, extension of a digital broadcasting system is realized, in which service scanning methods coexist (scanning methods vary service by service) as in the sixth embodiment.

A transmitting apparatus and a reproducing apparatus of the seventh embodiment are identical to those of the first embodiment and therefore will be described with reference to FIG. 1. Extension of the system of this embodiment is performed as in the case of the sixth embodiment, and therefore will be described with reference to FIGS. 28(a) and 28(b). Also in this embodiment, assume that the existing system transmits a TS1 including a service 1, and a TS3 including a service 3 of interlace video data over the network 1.

In this extension, a service 12 using non-interlace video data is added to the TS1, and a service 11 using non-interlace video data and a service 13 using interlace video data transmitted in a TS101 are added by a network 2.

Figure 32:
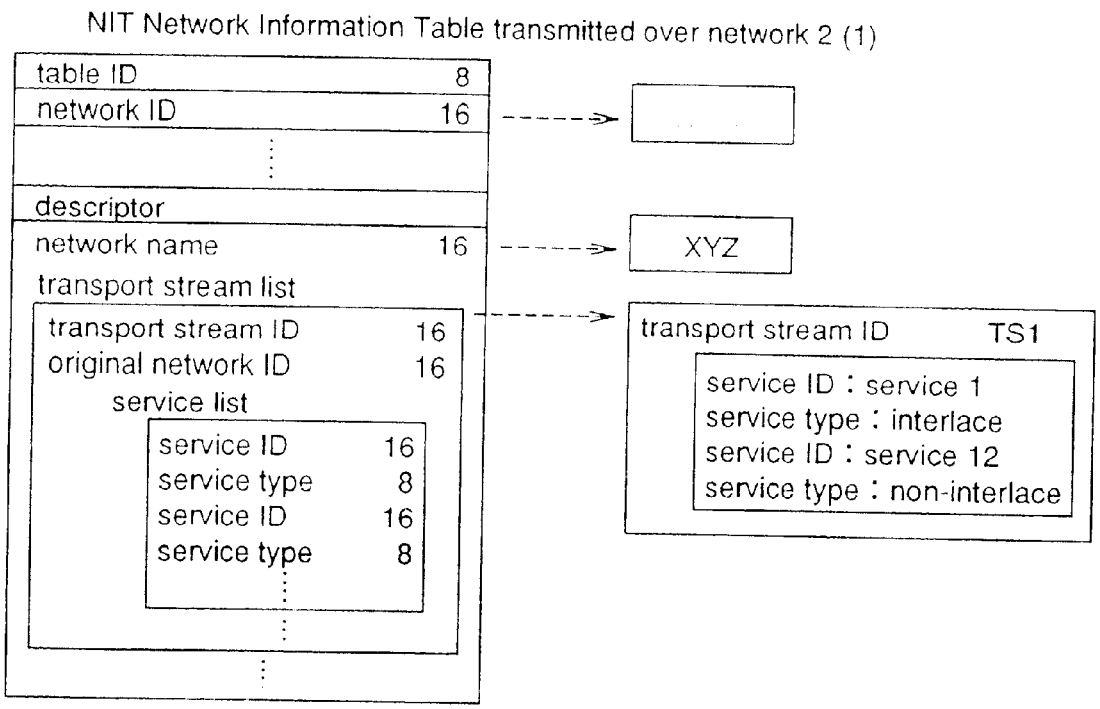
FIGS. 32(a) and 32(b) are diagrams each illustrating an NIT transmitted in a digital broadcasting transmitting method according to a seventh embodiment of the invention.
Figure 32:
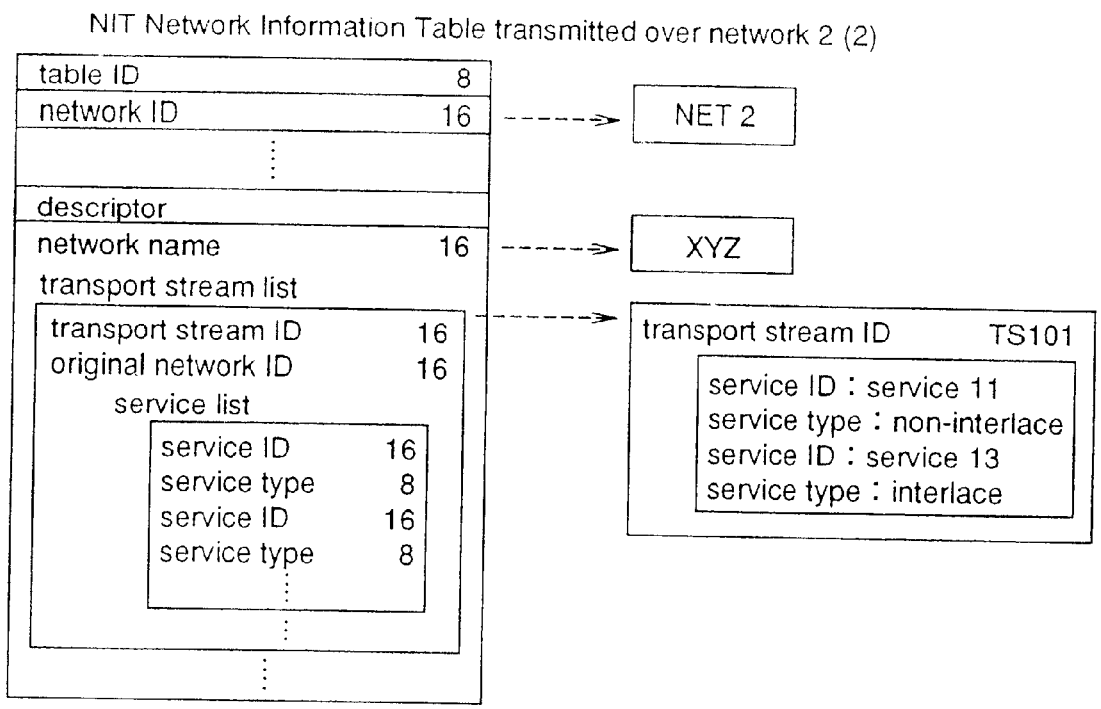
Figure 33:
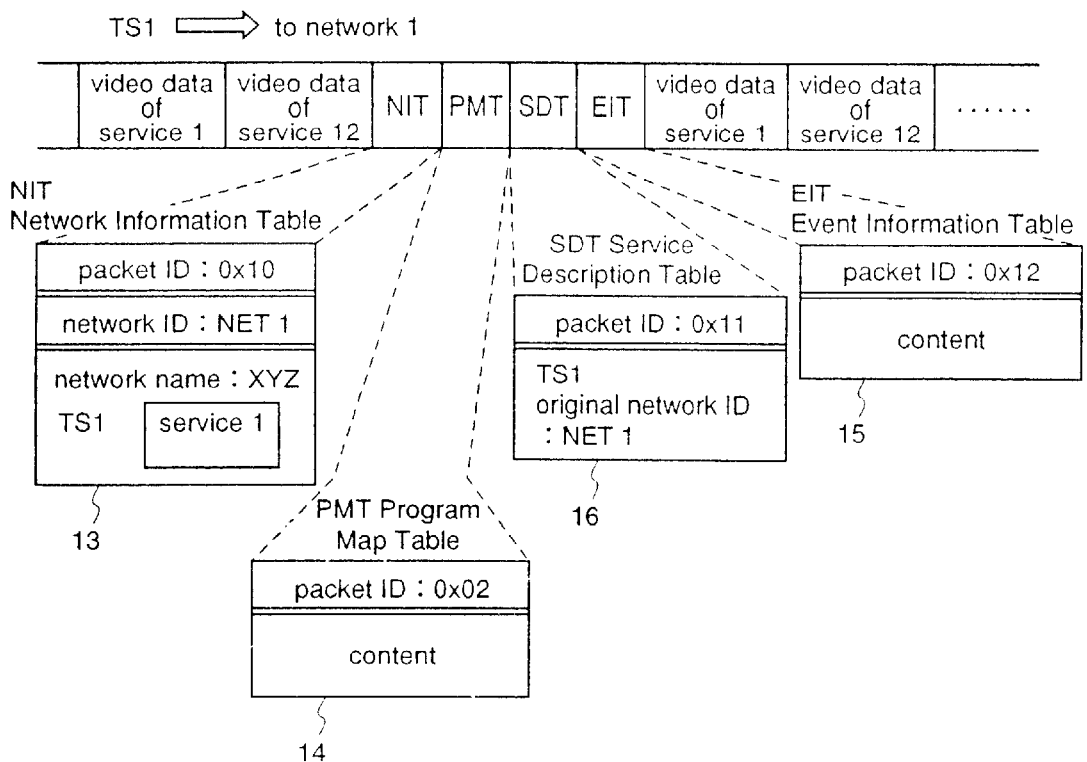
FIGS. 33(a) and 33(b) are diagrams each illustrating the structure of multiplexed data transmitted in the digital broadcasting transmitting method according to the seventh embodiment.
Figure 33:
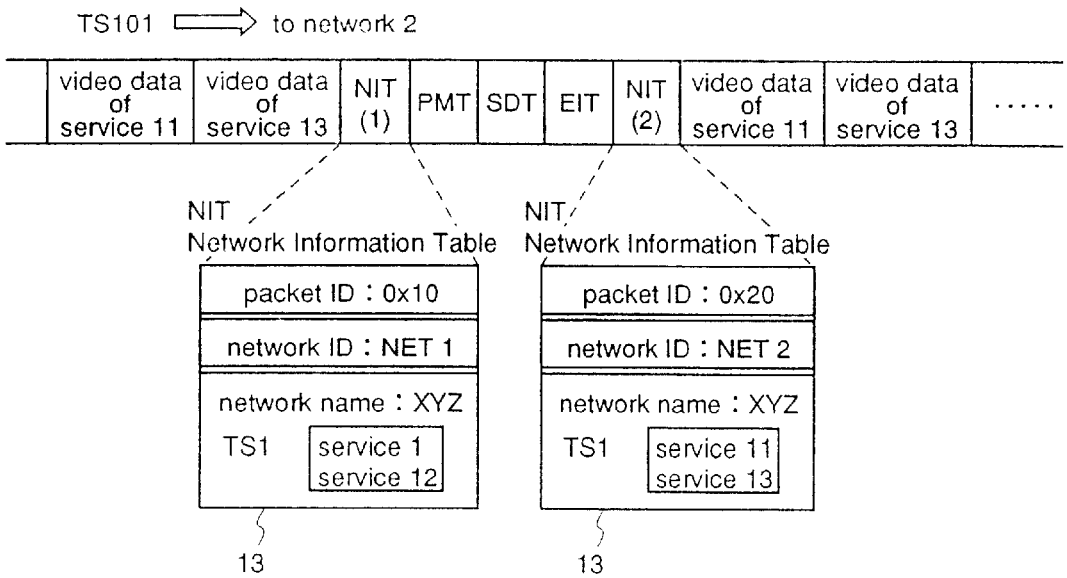

FIGS. 32(a) and 32(b) show NIT packets for use in the seventh embodiment, and FIGS. 33(a) and 33(b) show transport streams to-be-transmitted in an extended digital broadcasting system.

As shown in FIG. 33(a), the NIT packet of the transport stream TS1 transmitted over the network 1 is identical to that of FIG. 29(a), and therefore a network ID is "NET 1" and a network name is "XYZ". As shown in FIG. 29(a), a service list of TS1 of the NIT includes the service 1 and does not include the service 12.

The reproducing apparatus OLD in FIG. 28(b) obtains service information from the NIT in FIG. 29(a), and will not reproduce the service 12 using video data which cannot be handled.

As shown in FIGS. 32(a), 32(b), and 33(b), into a transport stream TS101 transmitted over the network 2, NIT(1) for the network 1 and NIT(2) for the network 2 are multiplexed. The NIT(1) in FIG. 32(a) includes a non-interlace service 12 in a TS1 service list, and therefore the service 12 is available for the reproducing apparatus NEW for the network 2 in FIG. 28(b). The NIT(2) in FIG. 32(b) includes information about the TS101 transmitted over the network 2. In this NIT(2), a network ID is "NET 2" and a network name is "XYZ", and therefore the NEW in FIG. 28(b) can handle the networks 1 and 2 as the same network. Since the TS101 includes the NIT(2) in which the network ID is "NET 2", the OLD will not process the TS101.

Thus, the OLD in FIG. 28(b) can use the services 1 and 3 as in the case of before extension, while the NEW can use the services 11 to 13 in addition to these.

Hereinafter, operation of the digital broadcasting transmitting apparatus and the reproducing apparatus of the seventh embodiment (1) "CREATION AND TRANSMISSION OF MULTIPLEXED DATA OF DIGITAL BROADCASTING TRANSMITTING APPARATUS", and (2) "REPRODUCTION OF DIGITAL BROADCASTING REPRODUCING APPARATUS" will be described.
(1) Creation and Transmission of Multiplexed Data of Digital Broadcasting Reproducing Apparatus The non-interlace video data packet creating unit 23 obtains video data required for program creation of services 11 and 12 from the non-interlace video data storage unit 22 in which video data digitized by non-interlace method is stored, to create non-interlace video data packets, and outputs the non-interlace video data packets to the multiplexing unit 28.

The interlace video data packet creating unit 21 obtains video data required for program creation of service 1, 3, and 13 from the interlace video data storage unit 20 in which video data digitized by the interlace method is stored, to create interlace video data packets, and outputs the interlace video data packets to the multiplexing unit 28.

The service information packet creating unit 27 creates the NIT (see FIG. 29(a)) to be multiplexed into the TS1, in which the network ID and the network name are "NET 1" and "XYZ", respectively and outputs the NIT to the multiplexing unit 28.

The service information packet creating unit 27 further creates the NIT(1) in FIG. 32(a) multiplexed into the TS101, by setting the network ID and the network name to be "NET1" and "XYZ", respectively, and by giving "interlace", and "non-interlace", to service types of the service 1 and the service 12 of the TS1, and outputs the service information packets to the multiplexing unit 28.

The service information packet creating unit 27 still further creates the NIT(2) in FIG. 32(b) multiplexed into the TS101, by setting the network ID and the network name to be "NET2" and "XYZ", respectively, and by giving "non-interlace", and "interlace", to service types of the service 11 and the service 13 of the TS101, and the other service information as in the case of the first embodiment, and outputs the service information packets to the multiplexing unit 28.

The multiplexing unit 28 multiplexes the video data packets and the service information packets in fixed sizes, respectively. More specifically, the unit 28 creates multiplexed data, i.e., the TS1 in FIG. 33(a) from video data packets of the services 1 and 12, and service information packets including the NIT in FIG. 29(a), and the TS3 (not shown in FIG. 33) from a video data of the service 3, and the service information including the NIT in FIG. 29(a), and the TS101 in FIG. 33(b) from video data packets of the service 11 and 13, and service information packets including the NIT in FIG. 32(b), and outputs the multiplexed data to the transmitting unit 29, which transmits the TS1 and TS3 to the network 1 and the TS101 to the network 2.
(2) Reproduction of Digital Broadcasting Reproducing Apparatus Operation of the reproducing apparatus of this embodiment is identical to that of the sixth embodiment except that it separates and extracts the NIT packets in FIGS. 32(a) and 32(b).

For services of a transport stream indicative of "decision required", service scanning method for each service is given to a service type in an NIT service list in this embodiment as in the sixth embodiment. Alternatively, it may be given to a service type in an SDT service list according to the third embodiment (see FIGS. 16 and 17).

As thus far described, in the digital broadcasting transmitting method of the seventh embodiment, when the multiplexed data, i.e., the transport stream TS101 is transmitted, the information "decision required" for the video data scanning method is given by the network ID of the NIT packet, and the network name of the NIT packet is used to indicate the network to which the transport stream belongs, and further, the scanning method information for each service is given to the service type in the service list descriptor of the NIT packet, or the service type in the service list descriptor of the SDT packet. Therefore, to the existing digital broadcasting system using video data of a specified scanning method, transport streams or services using video data of a different scanning method are added, without adversely affecting the reproducing apparatus for the existing system.

With respect to the services to be added, it is possible to use video data of plural scanning methods, whereby degree of freedom in program construction is improved.

In addition, according to the seventh embodiment, it is possible that services of different scanning methods are added to the existing transport stream, or a transport stream in which different service scanning methods coexist is added, which cannot be achieved in the fifth embodiment. Although the transmitting apparatus or the reproducing apparatus bears increased burden during creation of service packet or decision, respectively, degree of freedom is further improved by extension.

Further, in the digital broadcasting transmitting apparatus of this embodiment, the non-interlace video data storage unit 22 and the non-interlace video packet creating unit 23 are added to the prior art transmitting apparatus in FIG. 59, to use non-interlace video data to-be-transmitted.

Still further, in the digital broadcasting reproducing apparatus of this embodiment, the non-interlace video decoding unit 3, the identification information storage unit 5, and the scanning method instructing unit 7 are added to the prior art reproducing apparatus in FIG. 59, to use non-interlace video data to-be-reproduced.

It should be noted that the information, code allocation, and processing procedure in a flowchart of this embodiment are illustrative and not restricted thereto.

Embodiment 8

In a digital broadcasting transmitting method according to an eighth embodiment of the present invention, tho service ID has "service scanning method information" that shows, for each service, the scanning method of video data transmitted by the network and, furthermore, the scanning method for each program can be specified.

As in the fifth to seventh embodiments of the invention, with respect to the original digital broadcasting system, it is premised that, even when the receiver does not recognize the original network ID or it is different from the network ID, the normal receiving process is carried out. Since the original network ID is used, the adverse effect on the reproduction apparatus corresponding to the existing system alone cannot be avoided. So, in this eighth embodiment, like the fifth to seventh embodiments, the network ID that identifies the network is used as the network scanning method information.

In the digital broadcasting transmitting method according to the eighth embodiment, like the sixth and seventh embodiments, it is possible to perform addition/extension such that the scanning method varies service by service, and addition/extension using video data in which the scanning method varies event by event in the same service. Further, it is also possible to perform apparent addition within the existing service.

Figure 34:
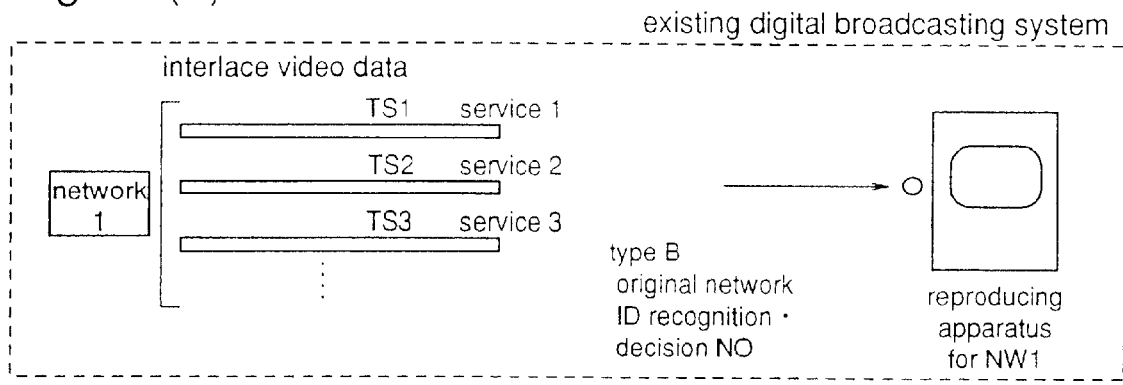
FIGS. 34(a) and 34(b) are diagrams for explaining the relationship between a digital broadcasting system according to an eighth embodiment of the invention and the existing digital broadcasting system.
Figure 34:
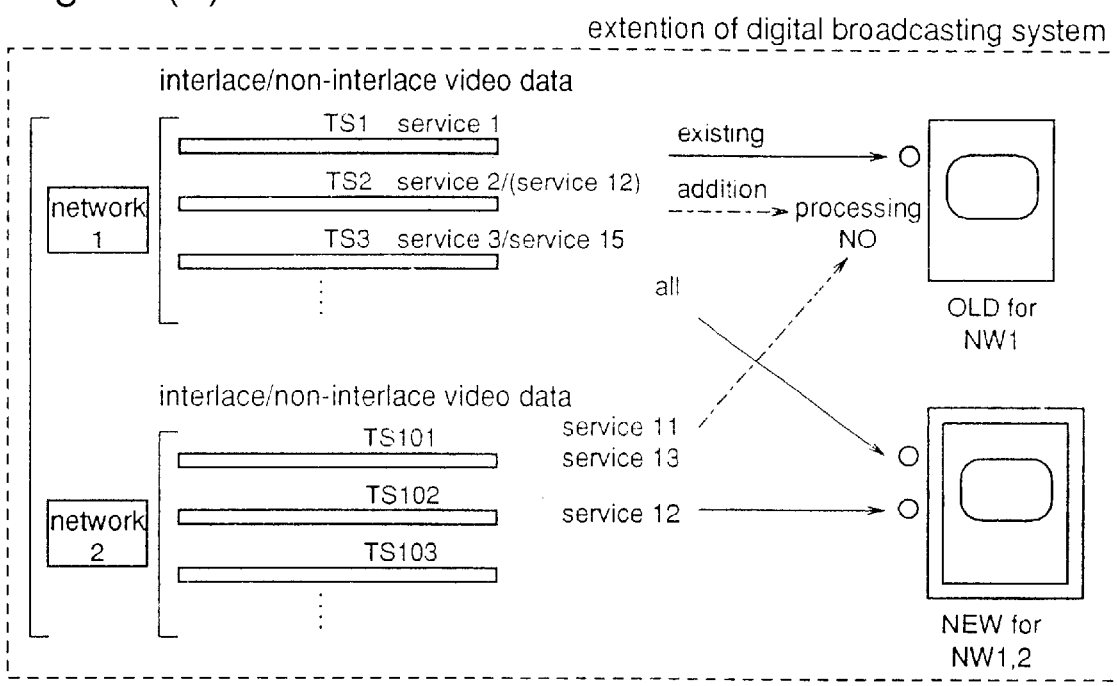

FIGS. 34(a), 34(b), 35(a) and 35(b) are diagrams for explaining addition/extension according to the eighth embodiment. As shown in FIGS. 34(a) and 34(b), also in this eighth embodiment, like the fifth and sixth embodiments, services 11~13 and 15 are added to the existing digital broadcasting system of type B (FIG. 34(a)) which is constructed on the premise that only the interlace video data is used and, therefore, cannot use the original network ID.

To simplify the description, it is assumed that the existing digital broadcasting system transmits the services 1, 2, and 3 by the transport streams TS1, TS2, and TS3, respectively, using the network 1. Further, in this eighth embodiment, the broadcasting state of the services 1~3 in the existing system is as shown in FIG. 35(a). That is, it is assumed that the service 1, Or which service name is "XXX", performs broadcasting all day long, the service 2, of which service name is "YYY", performs broadcasting in the night, and the service 3, of which service name is "ZZZ", does not perform broadcasting in the daytime.

FIG. 35(b) is a diagram showing the broadcasting state after the extension according to the eighth embodiment. In the first to sixth embodiments, extension like the service 11 or 13 shown in FIG. 35(b) is carried out. In this eighth embodiment, it is possible to perform extension which is apparently identical to the addition to the service 2 or 3, like the addition of service 12 or 15.

The addition of service 12 is different from the addition of service 15 in the following point. That is, as shown in FIG. 34(b), the video data of service 12 is transmitted by the transport stream TS102 which belongs to the network 2, while the video data of service 15 is transmitted by the transport stream TS3 that belongs to the existing network 1, like the addition of service 12 in the sixth embodiment (FIG. 28(b)). Although in this eighth embodiment the video data of service 15, which is treated as apparently the same service as the service 3, is transmitted by the transport stream TS3, it may be transmitted by another transport stream of the network 1.

Figure 36:
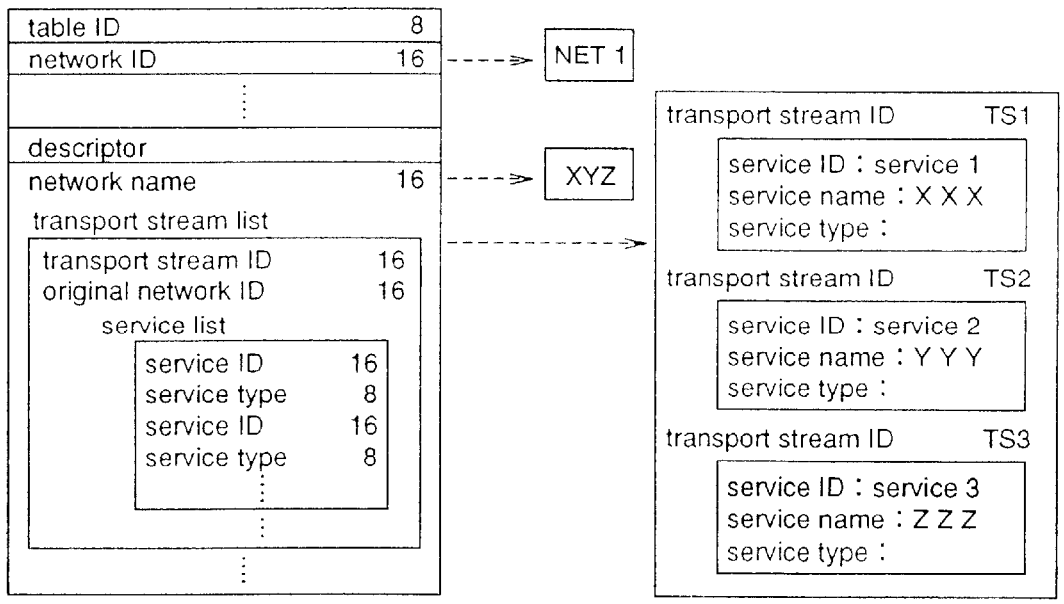
FIGS. 36(a) and 36(b) are diagrams each illustrating an NIT transmitted in the digital broadcasting transmitting method according to the eighth embodiment.
Figure 36:
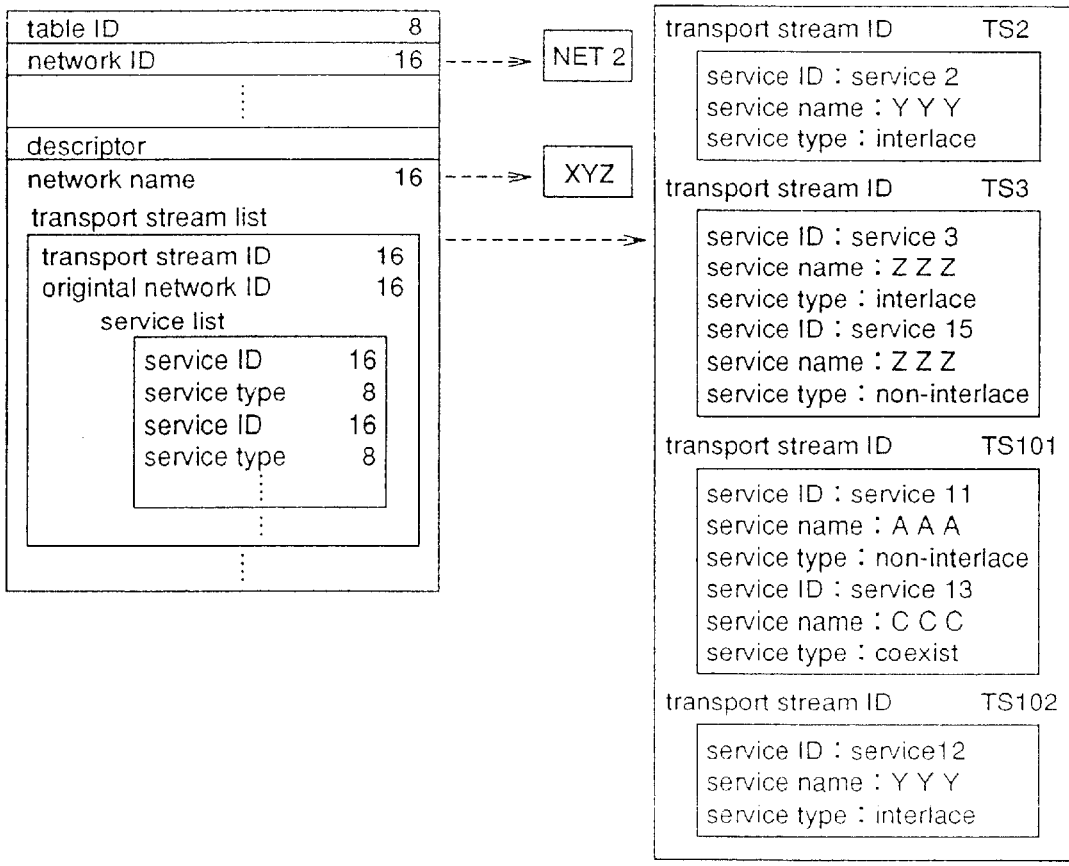

FIGS. 36(a) and 36(b) show the structures of NIT packets to be transmitted according to this eighth embodiment. In the conventional standard, as shown in FIG. 53, the service list of NIT includes only the service ID and the service type of each service. In this eighth embodiment, the standard is extended so that the service name of each service is included in the NIT, in addition to the service ID and the service type. This extension enables services having different service identifiers (ID) and the same service name to be treated as the same service.

The NIT shown in FIG. 36(a) is multiplexed into transport streams TS1~TS3 and transmitted by the network 1. Like the fifth and sixth embodiments, the network ID is "NET1" and the network name is "XYZ". Further, like the existing system, the service list of this NIT includes only information relating to the services 1~3 included in the transport streams TS1~TS3. This NIT is received and processed by both of the reproduction apparatuses OLD and NEW shown in FIG. 34(b).

The NIT shown in FIG. 36(b) is multiplexed into the transport streams TS101 and TS102 and transmitted by the network 2. The network ID is "NET2", and the network name is "XYZ". So, the reproduction apparatus OLD shown in FIG. 34(b) does not process the TS101 and TS102 and, therefore, does not obtain information included in this NIT, like the fifth and sixth embodiments. The service list of this NIT includes information relating to the services transmitted by the transport streams TS2, TS3, TS101 and TS102.

This eighth embodiment is identical to the fourth embodiment in that the service type of each service shows the scanning method including "coexist", so that the code allocation according to the fourth embodiment shown in FIG. 19 can be used.

The reproduction apparatus OLD shown in FIG. 34(b) obtains information only from the NIT shown in FIG. 36(a), i.e., it does not process the NIT shown in FIG. 36(b) and, therefore, obtains no information from the NIT. So, the reproduction apparatus OLD is given the contents of services 1~3 as shown in FIG. 35(a), as in the existing system.

On the other hand, the reproduction apparatus NEW shown in FIG. 34(b) processes both the NIT shown in FIG. 36(a) and the NIT shown in FIG. 36(b) and obtains information from these tables. Thereby, the reproduction apparatus NEW utilizes the service 1 in the same manner as the reproduction apparatus OLD, and utilizes the services 11 and 13 in the same manner as described for the other embodiments. In addition, in the reproduction apparatus NEW according to this eighth embodiment, services having different service identifiers (ID) and the same service name are treated as the same service. Thereby, in the reproduction apparatus NEW, the service 12 and the service 15 are utilized as ones apparently added to the service 2 and the service 3, respectively.

The reproduction apparatus NEW utilizes the service 2 shown in FIG. 35(a) in the same manner as the reproduction apparatus OLD, because it can be seen from the information of the NIT of FIG. 36(b) that the service 2 is transmitted by the transport stream TS2. During the period of time when the original service 2 does not perform broadcasting, the reproduction apparatus NEW can accept the service 12, because it can be seen from the NIT of FIG. 36(b) that the service 12 is transmitted by the transport stream TS102 and has the same service name "YYY" as the service 2 and, therefore, should be treated as the same as the service 2.

Likewise, the reproduction apparatus NEW can accept the service 3 and the service 15 transmitted by the transport stream TS3 as the same service 3. As a result, the reproduction apparatus NEW can utilize the respective services shown in FIG. 35(b).

The video data of service 15 may be transmitted, not by the transport stream TS3, but by the transport stream TS1 or TS2. In this case, in the NIT of FIG. 36(b), the service 15 is included in the service list of the transport stream by which the service 15 is transmitted, and "ZZZ" is given as its service name.

Further, with respect to the service 13 in which the video data scanning method varies event by event, as in the fourth embodiment, information showing the scanning method for each event is included in the event list of the EIT as shown in FIG. 20. Also in this case, as in the fourth embodiment, the scanning method information can be given by code allocation in the component type, as shown in FIGS. 10 and 11.

Hereinafter, a description is given of "(1) Creation and Transmission of Multiplexed Data" by the digital broadcasting transmitting apparatus according to the eighth embodiment, and "(2) Reproduction of Multiplexed Data" by the digital broadcasting reproducing apparatus according to the eighth embodiment.

(1) Creation and Transmission of Multiplexed Data

The non-interlace video data packet creating unit 23 obtains video data required for program creation of non-interlace events of the services 11, 15, and 13, from the non-interlace video data storage unit 22 that stores video data digitized by non-interlacing. Then, the unit 23 creates non-interlace video packets from the video data, and outputs the packets to the multiplexing unit 28.

Likewise, the interlace video data packet creating unit 21 obtains video data required for program formation of interlace events of the services 1, 2, 3, 12, and 13, from the interlace video data storage unit 20 that stores video data digitized by interlacing. Then, the unit 21 creates interlace video packets from the video data, and outputs the packets to the multiplexing unit 28.

On the other hand, the service information packet creating unit 27 creates the NIT (FIG. 36(a)) to be multiplexed into the transport streams TS1~TS3, of which network ID is "NET1" and network name is "XYZ", and outputs the NIT to the multiplexing unit 28.

Further, the service information packet creating unit 27 creates the NIT (FIG. 36(b)) to be multiplexed into the transport streams TS101 and TS102 in the following manner. Initially, "NET2" and "XYZ" are given as the network ID and the network name, respectively. Then, transport stream identifiers TS2, TS3, TS101 and TS102 are given to the transport stream list in the descriptor.

Further, the service list of each transport stream (TS) is as follows. In the service list of TS2, a set of service ID "service 2", service name "YYY", and service type "interlace" is entered. In the service list of TS3, a set of "service 3", "ZZZ", and "interlace", and a set of "service 15", "ZZZ", and "non-interlace" are entered. In the service list of TS101, a set of "service 11", "AAA", and "non-interlace", and a set of "service 13", "CCC", and "coexist" are entered. In the service list of TS102, a set of "service 12", "YYY", and "interlace" is entered. The services 12 and 2 are given the same service name, and the services 15 and 3 are given the same service name.

Furthermore, the service information packet creating unit 27 creates the EIT packet by giving a code showing the scanning method to each event of the service 13, as the component type in the event list of the EIT packet to be multiplexed into the transport stream TS101. Like the EIT packet shown in FIG. 20, such information is not given to each event of the service 11. As a result, the service information packet creating unit 27 outputs the NIT packets shown in FIGS. 36(a) and 36(b) and the EIT packet as shown in FIG. 20 toward the multiplexing unit 28. Other service information packets are created by the service information packet creating unit 27 as well, and these packets are output toward the multiplexing unit 28.

The multiplexing unit 28 multiplexes the received video data packets and the service information packets in fixed sizes, respectively. The multiplexing unit 28 creates multiplexed data as follows. From the video data of service 1 and the service information including the NIT of FIG. 36(a), multiplexed data of transport stream TS1 is created. From the video data of service 2 and the service information including the NIT of FIG. 36(a), multiplexed data of transport stream TS2 is created. From the video data of services 3 and 15 and the service information including NIT of FIG. 36(a), multiplexed data of transport stream ST3 is created. From the video data of services 11 and 13 and the service information including the NIT of FIG. 36(b), multiplexed data of transport stream TS101 is created. From the video data of service 12 and the service information including the NIT of FIG. 36(b), multiplexed data of transport stream TS102 is created. All these multiplexed data are output toward the transmitting unit 29. The transmitting unit 29 transmits these multiplexed data so that the transport streams TS1~TS3 are transmitted by the network 1 and the transport streams TS101 and TS102 are transmitted by the network 2.

(2) Reproduction of Multiplexed Data

Figure 37:
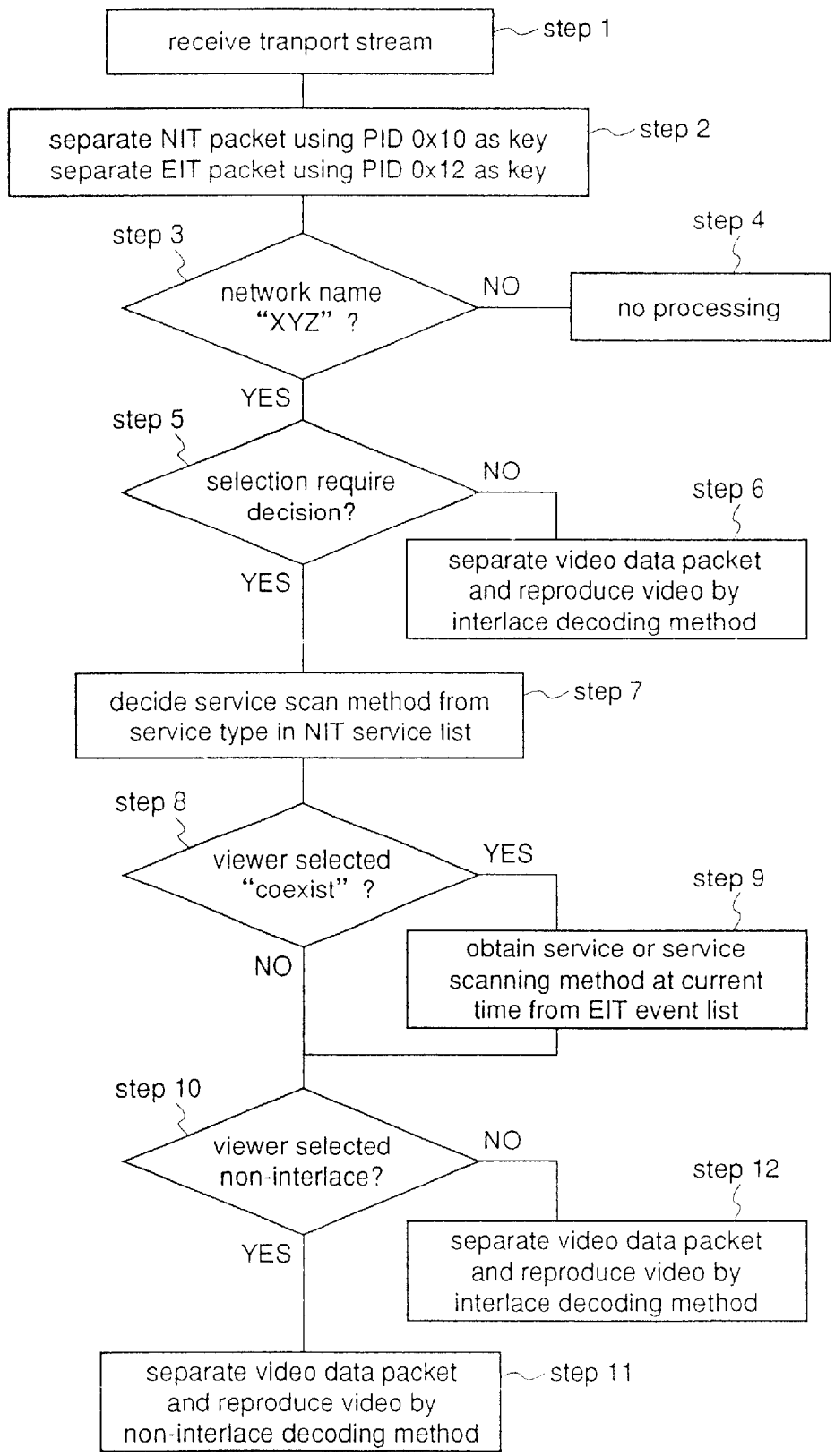
FIG. 37 is a flowchart for explaining the operation of a digital broadcasting reproducing apparatus according to the eighth embodiment.

FIG. 37 is a flowchart showing the procedure after the digital broadcasting reproduction apparatus 210 receives the transport streams. First of all, a description is given of the operation of the reproduction apparatus 210 (reproduction apparatus NEW shown in FIG. 34(b)) after receiving the transport streams transmitted according to the procedure described in the section (1).

Steps 1 and 2 are identical to those already described for the fourth embodiment and steps 3 to 6 are identical to those already described for the sixth embodiment. In step 5, as a result of comparison between the NIT of FIG. 36(a) and the NIT of FIG. 36(b), only the service 1 of the transport stream TS1, which is included in FIG. 36(a) but is not included in FIG. 36(b), is not "decision required", and this is subjected to reproduction in step 6. Other services are subjected to steps 7~11.

In step 7, from the service list of the NIT separated in step 2, information showing the video data scanning method of each service is obtained. For the service showing "non-interlace" or "interlace", the information is stored in the identification information storage unit 5. When information showing "coexist" is obtained in step 7, the service having this information is subjected to step 9, wherein information showing the scanning method of the service at the current time is obtained from the event list of the EIT, and this information is stored in the identification information storage unit 5.

A supplementary description is given of the services 2, 12, 3, and 15 in steps 5~9. When the viewer selects a service by the service selecting unit 6, the services 2 and 12 are treated as the same service because the services 2 and 12 have the same service name "YYY" in the service list. Likewise, the services 3 and 15 are treated as the same service because these services have the same service name "ZZZ".

Since information showing the scanning method of each service is obtained from the service type, the services 2 and 12, of which service types are "interlace", are decided as "not coexist" in step 8. Then, for the services 2 and 12, "interlace" is stored in the identification information storage unit 5.

On the other hand, the service 3, of which service type is "interlace", and the service 15, of which service type is "non-interlace", are decided as "coexist" in step 8, and information about the scanning method at the current time is obtained using information obtained from the EIT in step 9.

In step 9, with respect to the service 13 in which the scanning method varies event by event, the scanning method of the event at the current time is obtained from the EIT event list. With respect to the services 3 and 15, by checking the event list to know which service is available at the current time, information about the scanning method at the current time is obtained together with information about the scanning method of each service obtained from the service type in the NIT service list.

Therefore, as shown in FIG. 35(b), "interlace" of the service 3 in the morning and after the evening and "non-interlace" of the service 15 in the daytime are stored in the identification information storage unit 5.

As described above, in steps 7~9, whichever service the viewer selects, information showing the scanning method of the service is stored in the identification information storage unit 5. Thereafter, the scanning method of the selected service is decided in step 10, and reproduction by the corresponding scanning method is carried out in step 11 or 12.

In this eighth embodiment of the invention, as in the sixth and seventh embodiments, with respect to the services of the transport stream which requires decision, the service type in the NIT service list has information about the scanning method of each service. However, according to the third embodiment described with respect to FIGS. 16 and 17, information about the scanning method of each service may be given to the service type in the SDT service list.

As described above, in the digital broadcasting transmitting method according to the eighth embodiment, when transmitting the transport stream TS101 which is multiplexed data, information that decision of the video data scanning method is required is given by the network ID of the NIT (network information table) packet among the service information packets included in the transport stream TS101, and the network where the transport stream belongs to is shown by the network name in the same packet. Further, information about the scanning method of each service is given to the service type in the service list descriptor of the NIT packet or to the service type in the service list descriptor of the SDT (service description table) packet. Further, information about services to be treated as the same service is given to the service name in the service list descriptor. Therefore, it is possible to add a transport stream or a service which treats data of another scanning method, to the existing digital broadcasting system that can treat only data of a specific scanning method, without adversely affecting the reproduction apparatus adapted to the existing system alone.

Therefore, with respect to the service to be added, it is possible to use video data according to plural scanning methods which vary service by service or event by event, whereby the degree of freedom in program construction is significantly increased.

Furthermore, this eighth embodiment is able to perform addition of a service of different scanning method to the existing transport stream or addition of a transport stream in which different service scanning methods coexist, which addition cannot be performed in the fifth embodiment. Further, this eighth embodiment is able to perform apparent addition to the existing service, which addition cannot be performed in the sixth and seventh embodiments. The extension described above significantly increases the degree of freedom although the process burden increases somewhat in the creation of the service information packets by the transmission apparatus or in the decision by the reproduction apparatus.

Furthermore, in the digital broadcasting transmitting apparatus according to this eighth embodiment, since the non-interlace video data storage unit 22 and the non-interlace video packet formation unit 23 are added to the conventional transmitting apparatus shown in FIG. 59, non-interlace video data are available as video data to be transmitted.

Furthermore, since the non-interlace video decoding unit 3, the identification information storage unit 5, and the scanning method instructing unit 7 are added to the conventional reproduction apparatus shown in FIG. 59, non-interlace video data are available as video data to be reproduced.

The information, code allocation, and procedure (flowchart) employed for describing the eighth embodiment are merely examples, and the present invention is not restricted thereto.

Embodiment 9

A digital broadcasting transmitting method according to a ninth embodiment of the invention enables extension of a digital broadcasting system wherein different video data scanning methods may coexist service by service or event by event, like the eighth embodiment of the invention.

A digital broadcasting transmitting apparatus and a digital broadcasting reproduction apparatus according to the ninth embodiment are identical to those already described for the first embodiment and, therefore, FIG. 1 will be used for the description. Further, extension of the digital broadcasting system according to the ninth embodiment is identical to that already described for the eighth embodiment and, therefore, FIGS. 34(a), 34(b), 35(a) and 35(b) are used for the description. Also in this ninth embodiment, as in the eighth embodiment, it is assumed that the existing digital broadcasting system transmits the services 1, 2, and 3, which use only interlace video data, by the transport streams TS1, TS2, and TS3, respectively, using the network 1. The broadcasting state of the services 1~3 is as shown in FIG. 35(a). Further, as the result of addition and extension of the services 11~13 and 15, the broadcasting state becomes as shown in FIG. 35 (b).

FIGS. 38(a) and 38(b) are diagrams each showing an NIT (network information table) as service information used for the ninth embodiment. FIGS. 39(a)~39(c), 40(a) and 40(c) show examples of transport streams to be transmitted by the extended digital broadcasting system.

The NIT packets shown in FIGS. 39(a)~39(c), which are respectively multiplexed into the transport streams TS1~TS3 transmitted by the network 1, are identical to that shown in FIG. 36(a), and these NIT packets have the network ID "NET1" and the network name "XYZ". As shown in FIG. 36(a), in the TS2 service list of this NIT, only information relating to the service 2 is included, and information showing the existence of the service 12 is not included. Likewise, in the TS3 service list of this NIT, only information relating to the service 3 is included, and information showing the existence of the service 15 is not included.

Since the reproduction apparatus OLD shown in FIG. 34(b) obtains information relating to services from this NIT alone, the added services 12 and 15 are not subjected to reproduction by the reproduction apparatus OLD. That is, the reproduction apparatus OLD does not reproduce added services which may use video data of scanning method to which the apparatus OLD is inapplicable.

As shown in FIGS. 38(a), 38(b), 40(a) and 40(b), in each of the transport streams TS101 and TS102 transmitted by the network 2, NIT(1) relating to the network 1 and NIT(2) relating to the network 2 are multiplexed. As shown in FIG. 38(a), in the NIT(1), the service 15 is added to the service list of the transport stream TS3. Therefore, the reproduction apparatus NEW adapted to the network 2 (FIG. 34(a)) can use the service 15.

The NIT(2) relating to the network 2 shown in FIG. 38(b) has information about the transport streams TS101 and TS102 transmitted by the network 2. As shown in the figure, the NIT(2) has the network ID "NET2" and the network name "XYZ". The reproduction apparatus NEW shown in FIG. 34(b) can treat the network 1 and the network 2 as the same network according to their network names, as in the fifth to eighth embodiments. Further, since the NIT(2) having the network ID "NET2" is multiplexed in the transport streams TS101 and TS102, the reproduction apparatus OLD does not receive the transport stream TS101.

By the transport stream TS102, the service 12, which is apparently added to the existing service 2, is transmitted. Therefore, as shown in FIG. 38(b), the service 12 is included in the service list of the transport stream TS102, and the same name as the service 2, "YYY", is given to the service 12. As in the eighth embodiment, the reproduction apparatus NEW shown in FIG. 34(b) treats the services of the same service name as the same service, so that the service 12 is apparently added to the service 2 as shown in FIG. 35(b). Likewise, the service 15 is apparently added to the service 3. That is, since the services 3 and 15 have the same service name "ZZZ" as shown in FIG. 38(a), apparent addition as shown in FIG. 35(b) is possible.

As described above, the video data of service 15 can be transmitted, not only by the transport stream TS3 like the service 3, but also by the transport stream TS1 or TS2. In this case, in the NIT of FIG. 38(a), the service 15 is included in the service list of the transport stream by which the service 15 is transmitted, and "ZZZ" is given as its service name.

With respect to the service 13 of which scanning method is "coexist", as in the eighth embodiment, the scanning method is specified for each event in the event list of the EIT, in accordance with the fourth embodiment (see FIG. 20). Further, code allocation of information showing the scanning method in the NIT and the EIT is identical to that described for the eighth embodiment.

Hereinafter, a description is given of "(1) Creation and Transmission of Multiplexed Data" by the digital broadcasting transmitting apparatus according to the ninth, and "(2) Reproduction of Multiplexed Data" by the digital broadcasting reproducing apparatus according to the ninth embodiment.

(1) Creation and Transmission of Multiplexed Data

The non-interlace video data packet creating unit 23 obtains video data required for program creation of non-interlace events of the services 11, 15 and 13, from the non-interlace video data storage unit 22 that stores video data digitized by non-interlacing. Then, the unit 23 creates non-interlace video packets from the video data, and outputs the packets toward the multiplexing unit 28.

Likewise, the interlace video data packet creating unit 21 obtains video data required for program creation of interlace events of the services 1, 2, 3, 12 and 13, from the interlace video data storage unit 22 that stores video data digitized by interlacing. Then, the unit 21 creates interlace video packets from the video data, and outputs the packets toward the multiplexing unit 28.

On the other hand, the service information packet creating unit 27 creates the NIT (FIG. 36(a)) to be multiplexed into the transport streams TS1~TS3, of which network ID and network name are "NET1" and "XYZ", respectively, and outputs the NIT toward the multiplexing unit 28.

Further, the service information packet creating unit 27 creates the NIT(1) (FIG. 38(a)) to be multiplexed into the transport streams TS101 and TS102, in the following manner. Initially, "NET1" and "XYZ" are given as the network ID and the network name, respectively. Then, the transport stream identifiers TS2 and TS3 are given to the transport stream list in the descriptor. The service list of each transport stream is as follows. In the service list of TS2, a set of service ID "service 2", service name "YYY", and service type "interlace" is entered. In the service list of TS3, a set of "service 3", "ZZZ", and "interlace" and a set of "service 15", "ZZZ", and "non-interlace" are entered. As described above, the same service name as the service 3 is given to the service 15.

Furthermore, the service information packet creating unit 27 creates the NIT(2) (FIG. 38(b)) to be multiplexed into the transport streams TS101 and TS102, in the following manner. Initially, "NET2" and "XYZ" are given as the network ID and the network name, respectively. Then, the transport stream identifiers TS101 and TS102 are given to the transport stream list in the descriptor. The service list of each transport stream is as follows. In the service list of TS101, a set of "service 11", "AAA", and "non-interlace" and a set of "service 13", "CCC", and "coexist" are entered. In the service list of TS102, a set of "service 12", "YYY", and "interlace" is entered. As mentioned above, the same service name as the service 2 is given to the service 12.

Further, the service information packet creating unit 27 creates an EIT packet by giving a code showing the scanning method of each event in the service 13, as the component type in the event list of the EIT packet to be multiplexed into the transport stream TS101. As shown in FIG. 20, no such information is given to each event in the service 11. As a result, the NIT packets shown in FIGS. 36(*a*), 38(*a*) and 38(*b*) and the EIT packet as shown in FIG. 20 are output from the service information packet creating unit 27 toward the multiplexing unit 28. Other service information packets are created by the service information packet creating unit 27 and output toward the multiplexing unit 28.

Figure 39:
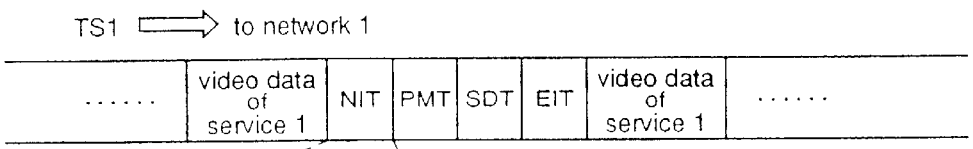
FIGS. 39(a)–39(c) are diagrams each illustrating the structure of multiplexed data transmitted in the digital broadcasting transmitting method according to the ninth embodiment.
Figure 39:
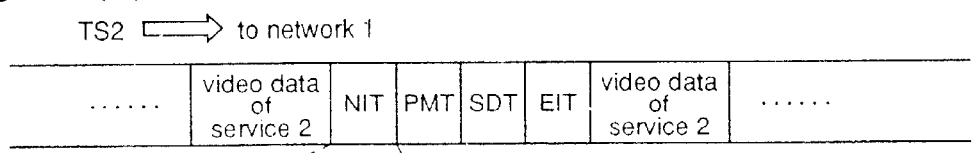
Figure 39:
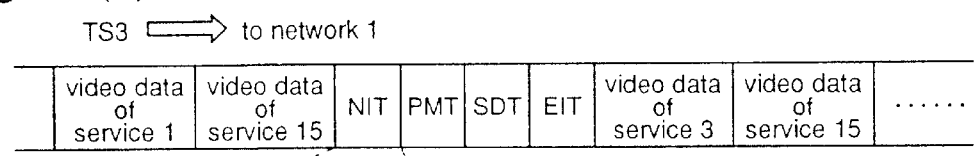
Figure 40:
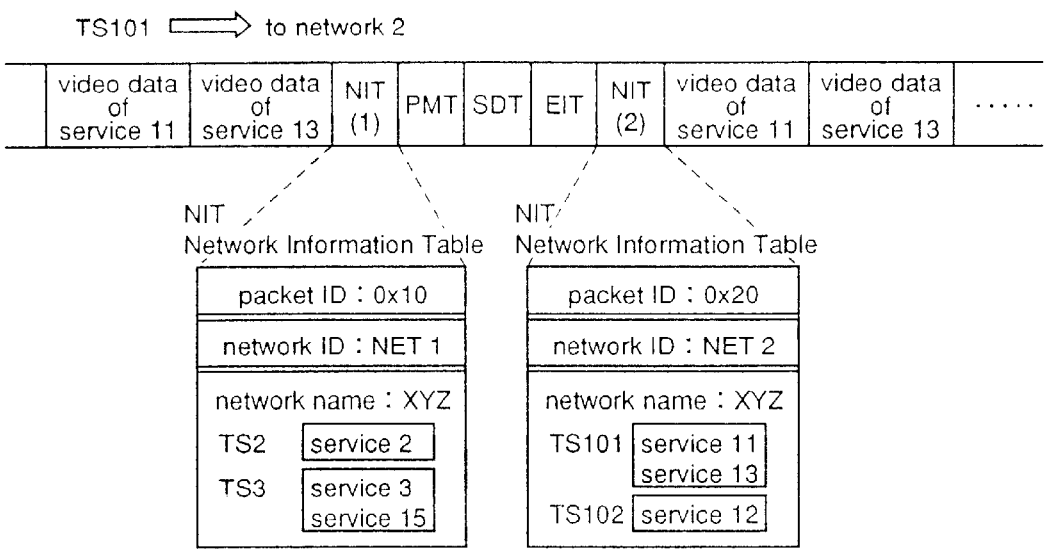
FIGS. 40(a) and 40(b) are diagrams illustrating the structure of multiplexed data transmitted in the digital broadcasting transmitting method according to the ninth embodiment.
Figure 40:
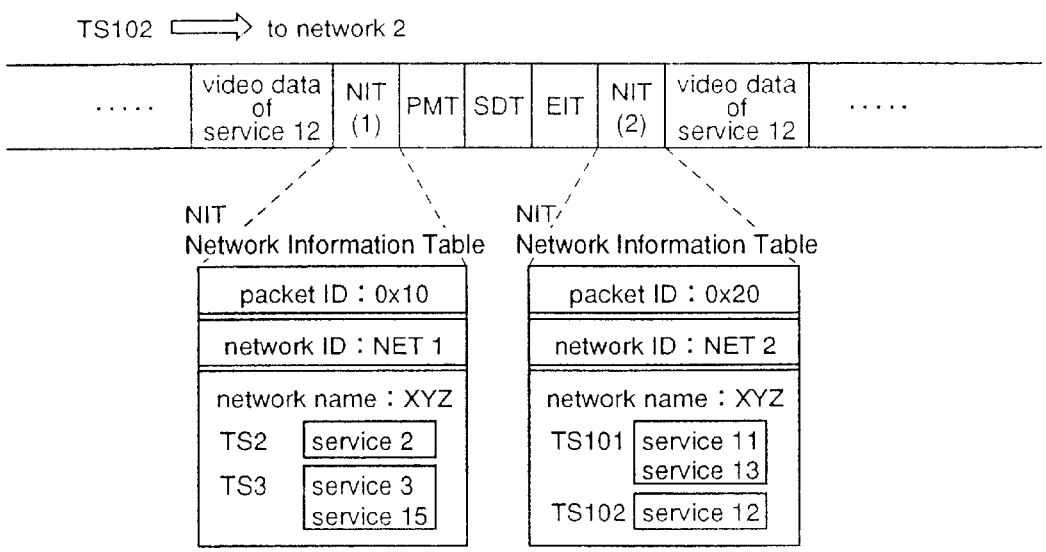

Receiving the video data packets and the service information packets, the multiplexing unit 28 multiplexes these packets in fixed sizes, respectively. The multiplexing unit 28 creates multiplexed data as shown in FIGS. 39(*a*)~39(*c*). To be specific, multiplexed data of TS1 (FIG. 39(*a*)) is created from the video data of service 1 and the service information including the NIT of FIG. 36(*a*), multiplexed data of TS2 (FIG. 39(*b*)) is created from the video data of service 2 and the service information including the NIT of FIG. 36(*a*), and multiplexed data of TS3 (FIG. 39(*c*)) is created from the video data of services 3 and 15 and the service information including the NIT of FIG. 36(*a*). These multiplexed data are transmitted to the transmitting unit 29. Further, as shown in FIGS. 40(*a*) and 40(*b*), multiplexed data of TS101 (FIG. 40(*a*)) is created from the video data of services 11 and 13 and the service information including the NIT of FIGS. 38(*a*) and the NIT of FIG. 38(*b*), and multiplexed data of TS102 (FIG. 40(*b*)) is created from the video data of service 12 and the service information including the NIT of FIG. 38(*a*) and the NIT of FIG. 38(*b*). These multiplexed data are transmitted toward the transmitting unit 29. The transmitting unit 20 transmits the multiplexed data of TS1~TS3 by the network 1, and the multiplexed data of TS101 and TS102 by the network 2.

(2) Reproduction of Multiplexed Data

Figure 38:
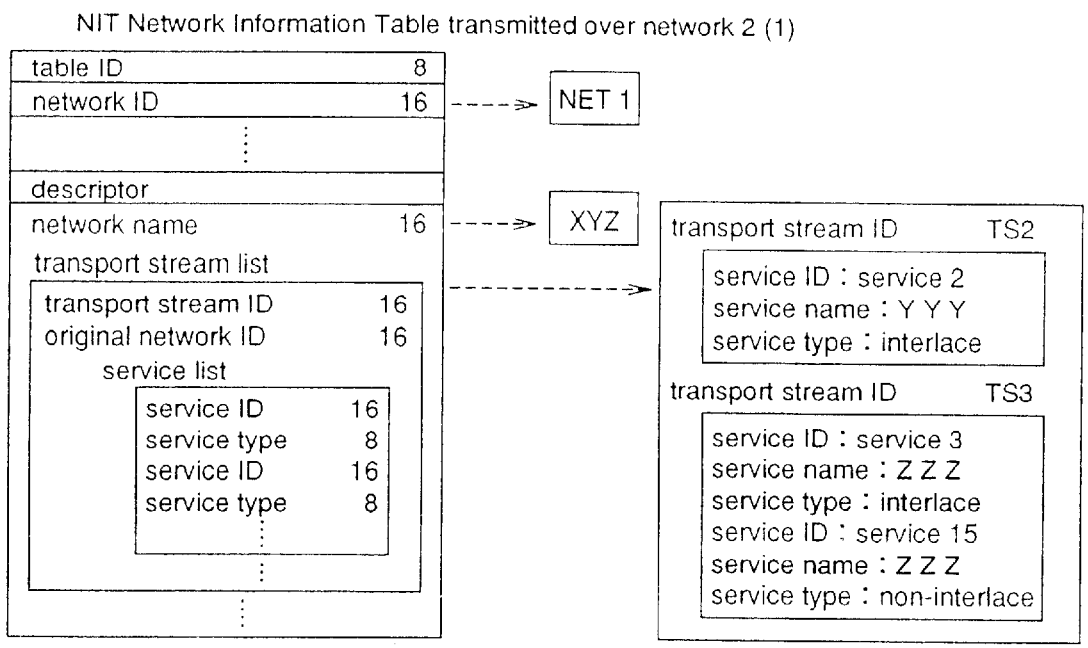
FIGS. 38(a) and 38(b) are diagrams each illustrating an NIT transmitted in a digital broadcasting transmitting method according to a ninth embodiment of the invention.
Figure 38:
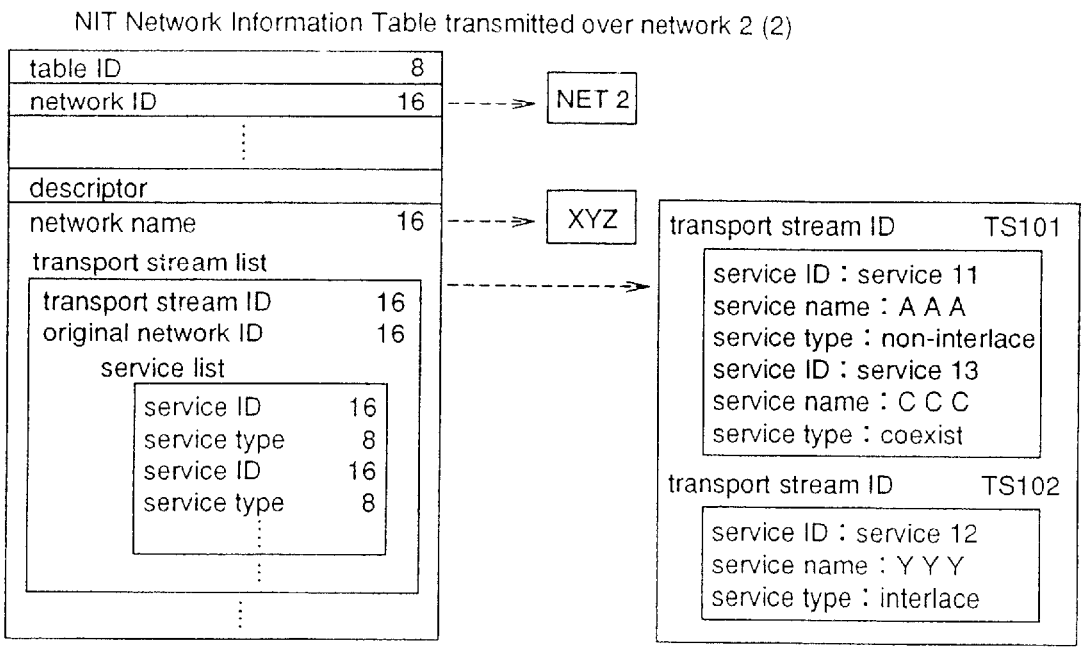

The operation of the reproduction apparatus according to this ninth embodiment is identical to the operation of the reproduction apparatus according to the eighth embodiment except that, in the NIT packet separating step, the NIT packets shown in FIGS. 38(*a*) and 38(*b*) are separated.

In this ninth embodiment, with respect to the services of the transport stream which requires decision, the service type in the NIT service list has information about the scanning method of each service. However, according to the third embodiment of the invention (FIGS. 16 and 17), the information about the scanning method of each service may be given to the service type in the SDT service list.

As described above, in the digital broadcasting transmitting method according to the ninth embodiment, when transmitting the transport stream TS101 which is multiplexed data, information that decision of the video data scanning method is required is given by the network ID of the NIT (network information table) packet among the service information packets included in the transport stream TS101, and the network where the transport stream belongs to is shown by the network name in the same packet. Further, information about the scanning method of each service is given to the service type in the service list descriptor of the NIT packet or to the service type in the service list descriptor of the SDT (service description table) packet. Furthermore, information showing services to be treated as the same service is given to the service name in the service list descriptor. Therefore, it is possible to add a transport stream or a service which treats data of another scanning method, to the existing digital broadcasting system that can treat only data of a specific scanning method, without adversely affecting the reproduction apparatus adapted to the existing system alone.

Therefore, with respect to the service to be added, it is possible to use video data according to plural scanning methods which vary service by service or event by event, whereby the degree of freedom in program construction is significantly increased.

Furthermore, this ninth embodiment is able to perform addition of a service of different scanning method to the existing transport stream or addition of a transport stream in which different service scanning methods coexist, which addition cannot be performed in the fifth embodiment. Further, this ninth embodiment is able to perform apparent addition to the existing service, which addition cannot be performed in the sixth and seventh embodiments. The extension described above significantly increases the degree of freedom although the process burden increases somewhat in the creation of the service information packets by the transmission apparatus or in the decision by the reproduction apparatus.

Furthermore, in the digital broadcasting transmitting apparatus according to the ninth embodiment, the non-interlace video data storage unit 22 and the non-interlace video packet creating unit 23 are added to the conventional transmitting apparatus shown in FIG. 59, non-interlace video data are also available as video data to be transmitted.

Furthermore, in the digital broadcasting reproducing apparatus according to the ninth embodiment, since the non-interlace video decoding unit 3, the identification information storage unit 5, and the scanning method instructing unit 7 are added to the conventional reproduction apparatus shown in FIG. 59, non-interlace video data are also available as video data to be transmitted.

The information, code allocation, and procedure (flowchart) according to the ninth embodiment of the invention are merely examples, and the present invention is not restricted to the ninth embodiment.

Embodiment 10

A digital broadcasting reproducing apparatus according to a tenth embodiment of the invention can display a program table and supply the viewer with information relating to video data.

Figure 41:
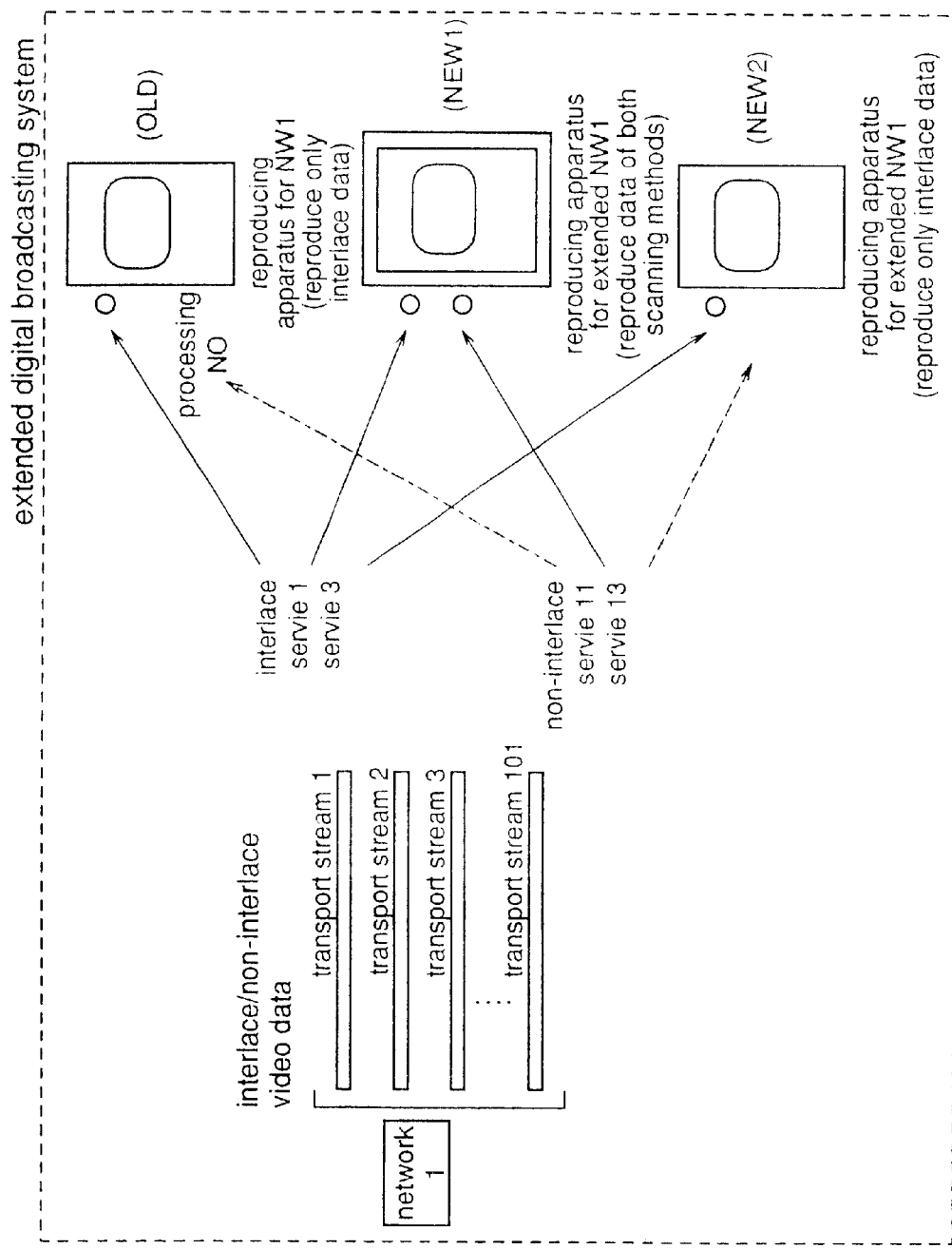
FIG. 41 is a diagram for explaining functions of reproduction apparatuses in an extended digital broadcasting system.

FIG. 41 is a diagram for explaining extension of a digital broadcasting system. This diagram is based on the case where the extension shown in FIG. 2(*b*) is carried out by the digital broadcasting transmitting method according to the first embodiment. In the first embodiment, the reproduction apparatus adapted to the extension can correctly process both of the interlace video data and non-interlace video data. In FIG. 41, this reproduction apparatus corresponds to a reproduction apparatus NEW1. On the other hand, a reproduction apparatus NEW2 shown in FIG. 41 is able to reproduce only interlace video data, but it corresponds to the extended network 1 and, therefore, is able to utilize an added/extended service (broadcasting) as long as the service uses interlace video data. When the reproduction apparatus NEW2 so constructed is employed, extension of the digital broadcasting system can be more flexible. This is true of a reproduction apparatus adapted to only non-interlace video data, too, although it is not shown in the figure.

In this case, as described in the section of BACKGROUND OF THE INVENTION, when information relating to the scanning method of the broadcast program is not shown, the viewer may select an incorrect program. In order to solve this problem, the digital broadcasting reproducing apparatus according to this tenth embodiment has a program display function, whereby the viewer is supplied with information relating to the scanning method of each event (program).

Figure 42:
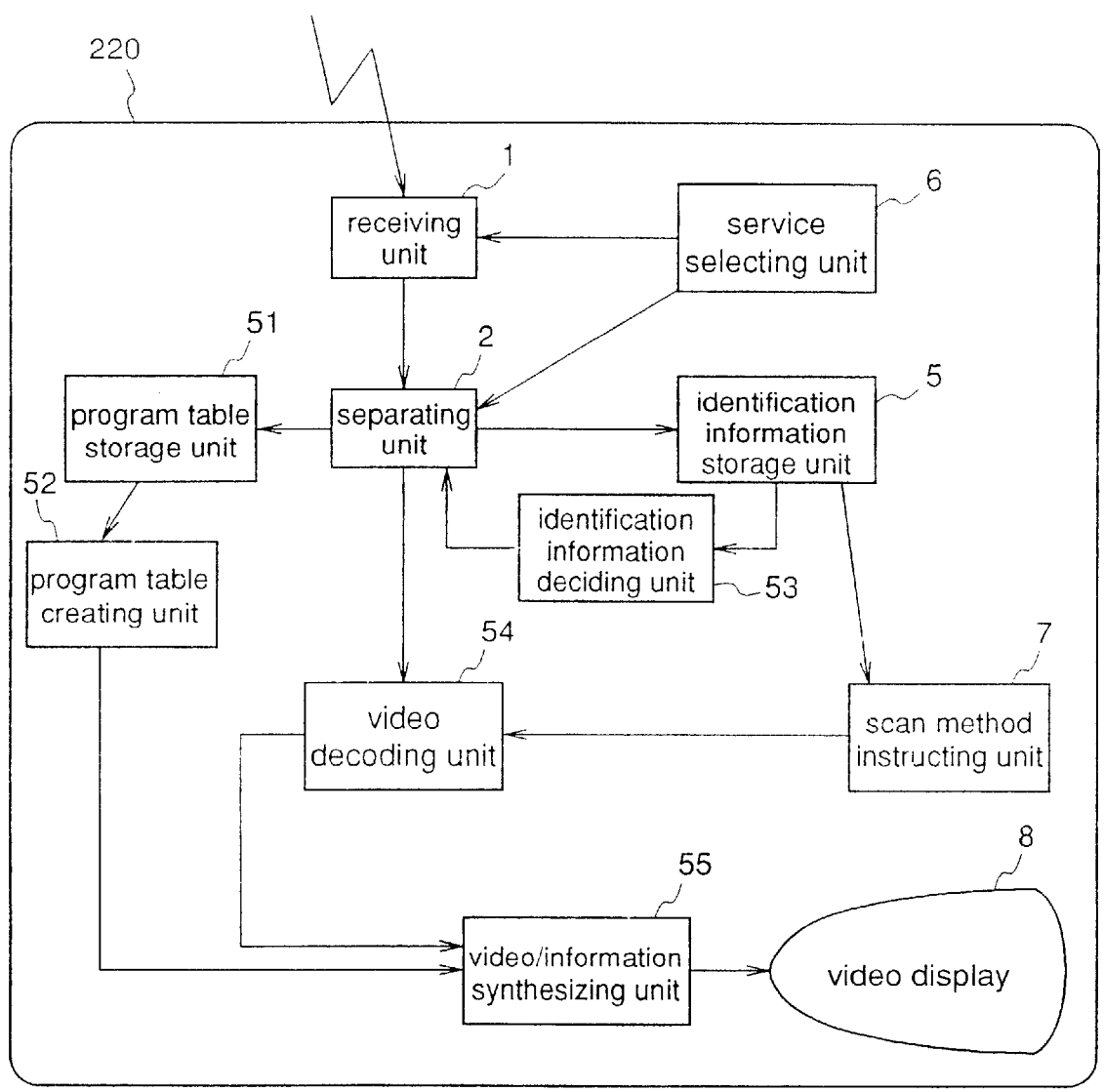
FIG. 42 is a block diagram illustrating a digital broadcasting reproducing apparatus having program table display function according to a tenth embodiment of the invention.

FIG. 42 is a block diagram illustrating the structure of the digital broadcasting reproducing apparatus according to this tenth embodiment. In the figure, a program table storage unit 51 stores program table information obtained from the EIT (event information table). A program table creating unit 52 processes the information obtained from the program table storage unit 51 to provide visual information. An identification information deciding unit 53 instructs the separation unit 2 to perform separation and extraction of packets, according to the information relating to the scanning method stored in the identification information storage unit 5. A video decoding unit 54 decodes video data separated and extracted by the separation unit 2 so that the data can be reproduced and displayed. A video/information synthesizing unit 55 synthesizes signals from the video decoder 54 and the program table creating unit 52. Other units are identical to those already described for the first embodiment and, therefore, do not require repeated description.

Figure 43:
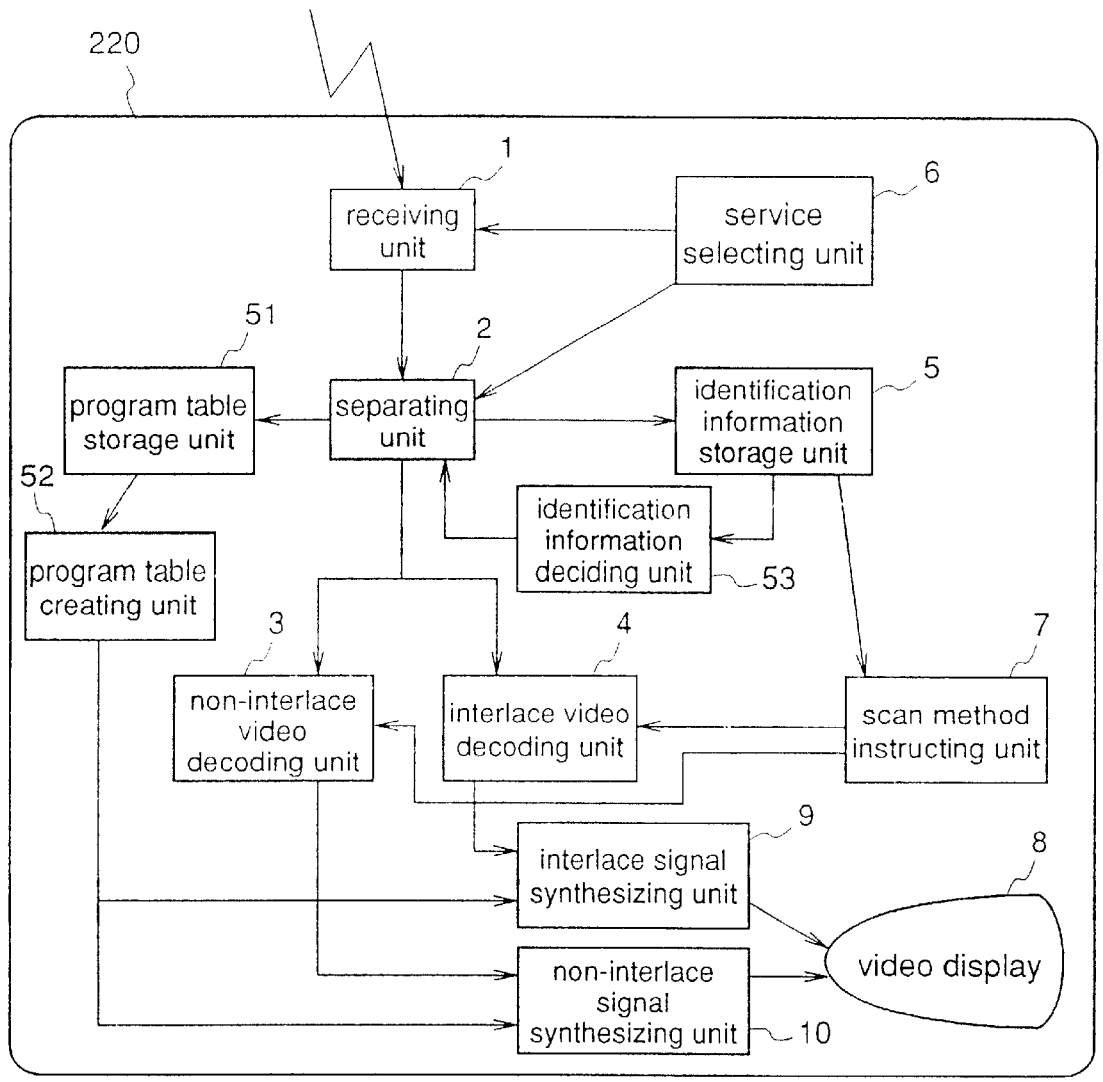
FIG. 43 is a block diagram illustrating a digital broadcasting reproducing apparatus having program table display function, which can reproduce both of interlace video data and non-interlace video data, according to the tenth embodiment.
Figure 44:
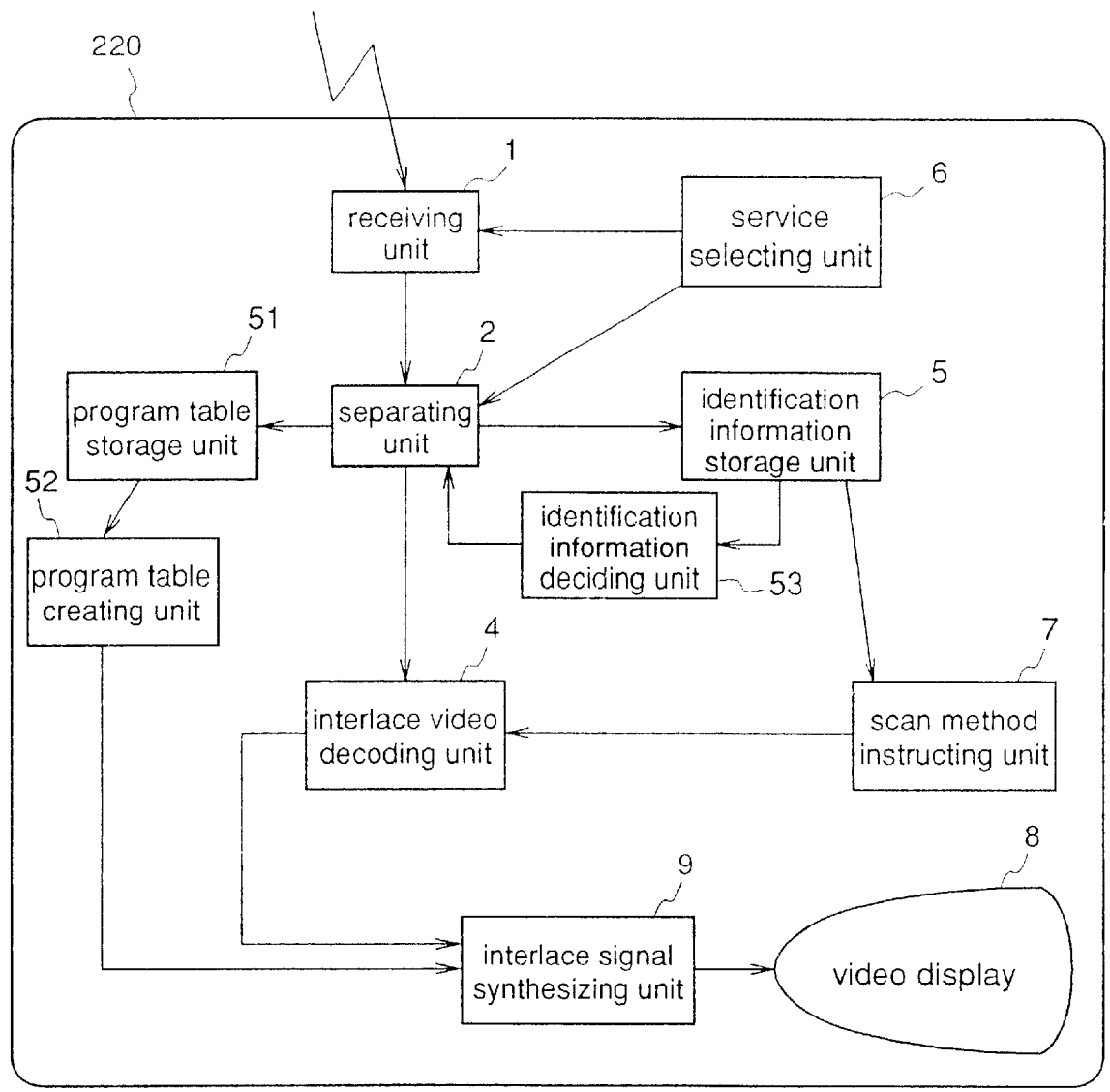
FIG. 44 is a block diagram illustrating a digital broadcasting reproducing apparatus having a function of program table display, which can reproduce interlace video data, according to the tenth embodiment.

FIGS. 43 and 44 are examples of the reproduction apparatus according to the tenth embodiment. The apparatus shown in FIG. 43 corresponds to the reproduction apparatus NEW1 shown in FIG. 41, and the apparatus shown in FIG. 44 corresponds to the reproduction apparatus NEW2 shown in FIG. 41. The reproduction apparatus NEW1 shown in FIG. 43 includes, as the video decoding unit 54, a non-interlace video decoding unit 3 adapted to non-interlacing and an interlace video decoding unit 4 adapted to interlacing. Further, it includes, as the video/information synthesizing unit 55, an interlace synthesizing unit 9 that synthesizes signals from the interlace video decoding unit 4 and the program table creating unit 52, and a non-interlace synthesizing unit 10 that synthesizes signals from the non-interlace video decoding unit 3 and the program table creating unit 52. The reproduction unit NEW2 shown in FIG. 44 includes, as the video decoding unit 54, an interlace video decoding unit 4 adapted to interlacing. Further, it includes, as the video/ information synthesizing unit 54, an interlace synthesizing unit 9 that synthesizes signals from the interlace video decoding unit 4 and the program table creating unit 52.

Figure 45:
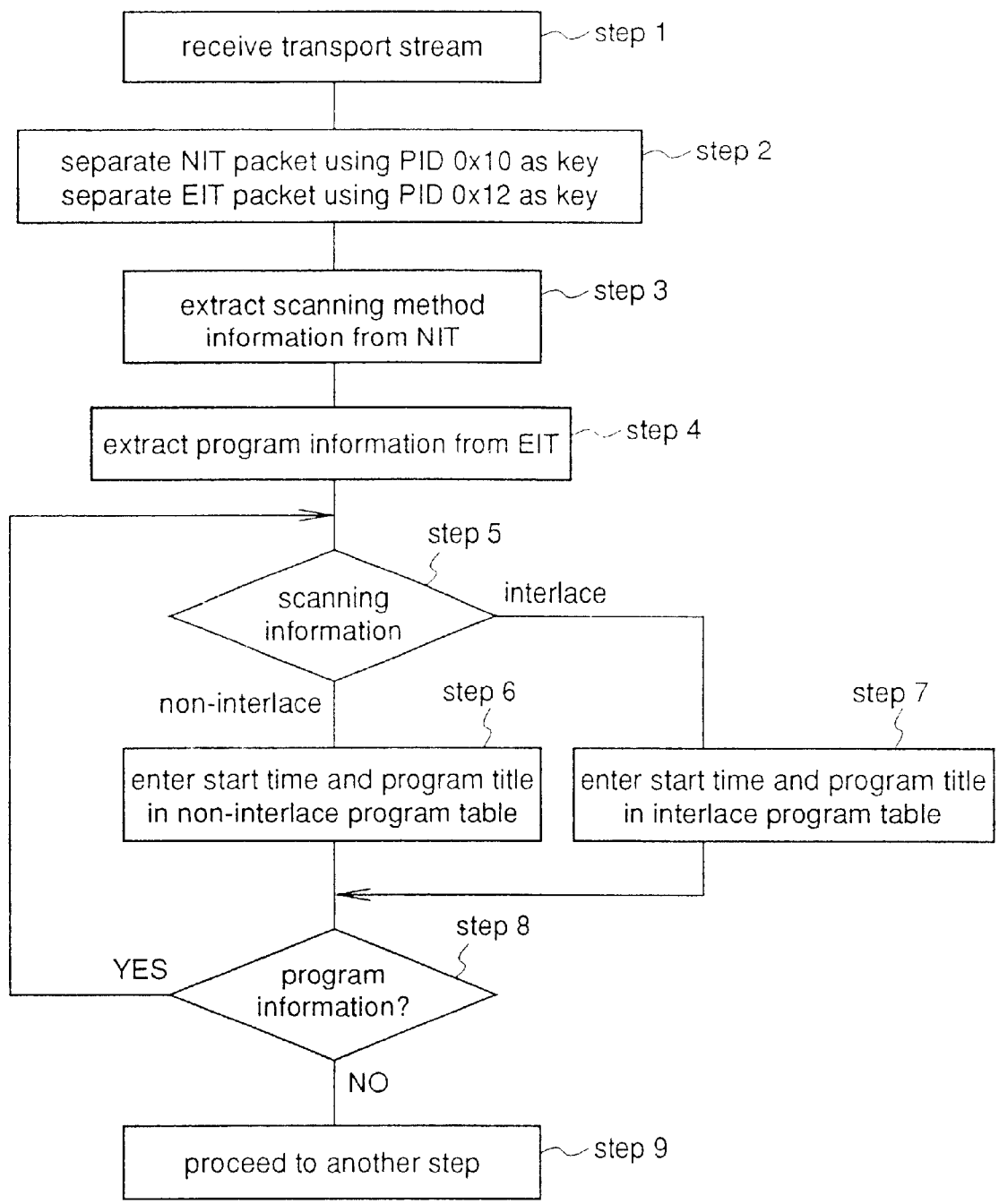
FIG. 45 is a flowchart for explaining the operation of a digital broadcasting reproducing apparatus according to the tenth embodiment.

FIG. 45 is a flowchart showing the procedure after receiving the transport stream by the digital broadcasting reproducing apparatus according to the tenth embodiment. Hereinafter, a description is given of the operation of the reproduction apparatus according to the tenth embodiment when it receives the transport stream transmitted by the transmission apparatus according to the first embodiment shown in FIG. 4, using the flowchart of FIG. 45.

Initially, in step 1, the receiving unit 1 receives the transmitted transport stream. In step 2, the separation unit 2 separates the NIT packet with the packet identifier (PID) 0x10 as a key, and separates the EIT packet with the PID 0x12 as a key. In step 3, information relating to the scanning method is extracted and stored in the identification information storage unit 5, as described for the first embodiment.

In step 4, the start times and program titles of events (programs) of each service are decrypted from the EIT and stored in the program table storage unit 51. Further, as in the first embodiment, the PID of video data obtained from PMT data is stored in the identification information storage unit 5 as well.

When the decision in step 5 is "non-interlace program", step 6 is executed, wherein the program table creating unit 52 enters the program title and start time of the non-interlace program into the non-interlace program table. When the decision in step 5 is "interlace program", step 7 is executed, wherein the program table creating unit 52 enters the program title and start time of the interlace program into the interlace program table. The program table creating unit 52 sends the program table so created toward the interlace signal synthesizing unit 9 or the non-interlace signal synthesizing unit 10, and the video display unit 8 outputs the program table.

FIGS. 46(a)–46(c) show program tables output to the screen of the display unit of the video data reproducing apparatus according to the tenth embodiment. Since the reproduction apparatus OLD shown in FIG. 41 receives only the transport stream 1 shown in FIG. 4(a), it displays the program table of only the services 1 and 3, and this program table is shown in FIG. 46(a). Each of the reproduction apparatuses NEW1 and NEW2 shown in FIG. 41 displays the program table of the interlace services 1 and 3 and the program table of the non-interlace services 11 and 13. The interlace program table and the non-interlace program table may be separated tables corresponding to the respective scanning methods as shown in FIG. 46(b), or these tables may be united in a table as shown in FIG. 46(c). Thereby, the viewer using the reproduction apparatus NEW2 can easily select the interlace program corresponding to the reproduction apparatus NEW2. The reproduction apparatus NEW2 may be set so that it displays only the interlace program. Example 1 in the FIGS. 46(a)–46(c) shows the case where the reproduction apparatus NEW2 displays both the interlace program and the non-interlace program, and Example 2 shows the case where the reproduction apparatus NEW2 displays only the program of the corresponding scanning method (interlacing). In Example 2, the reproduction apparatus NEW2 displays the same program table as that displayed by the reproduction apparatus OLD.

In the flow of FIG. 45, steps 6 and 7 are followed by step 8 where it is decided whether more program information is supplied or not. When it is supplied, the process returns to step 5, followed by repetition of steps 5~8.

When it is decided in step 8 that the supply of program information has ended, step 9 is executed. In the reproduction apparatus according to this tenth embodiment, the viewer can select a program while watching the display screen as shown in FIGS. 46(a)–46(c) and, after the selection, reproduction of the program is carried out in the same manner as described for the first embodiment.

The reproduction apparatus NEW2 shown in FIG. 41 processes only the interlace service. So, when the viewer using a video data reproduction apparatus selects a program of a scanning method which cannot be decoded by the apparatus, the error selection may be displayed on the screen or posted to the viewer by audio.

Next, a description is given of the operation of the reproduction apparatus according to the tenth embodiment when it receives a transport stream transmitted by the transmission apparatus according to the fourth embodiment, which stream is shown in FIG. 20 or 22.

In the flow of FIG. 45, steps 1~3 are executed as described above. In step 4, besides the start times and program titles of events (programs) of each service, information of the scanning method of each event is decrypted from the EIT as well, and stored in the identification information storage unit 5.

Figure 47:
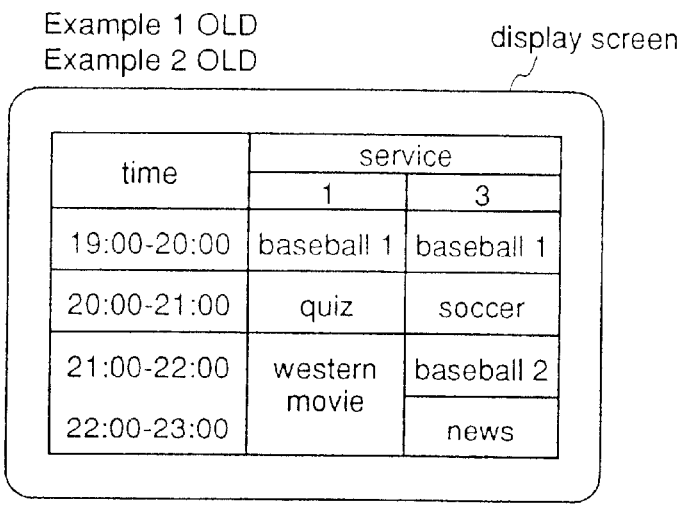
FIGS. 47(a) and 47(b) are diagrams illustrating examples of program table display screens of the digital broadcasting reproducing apparatus according to the tenth embodiment.
Figure 47:
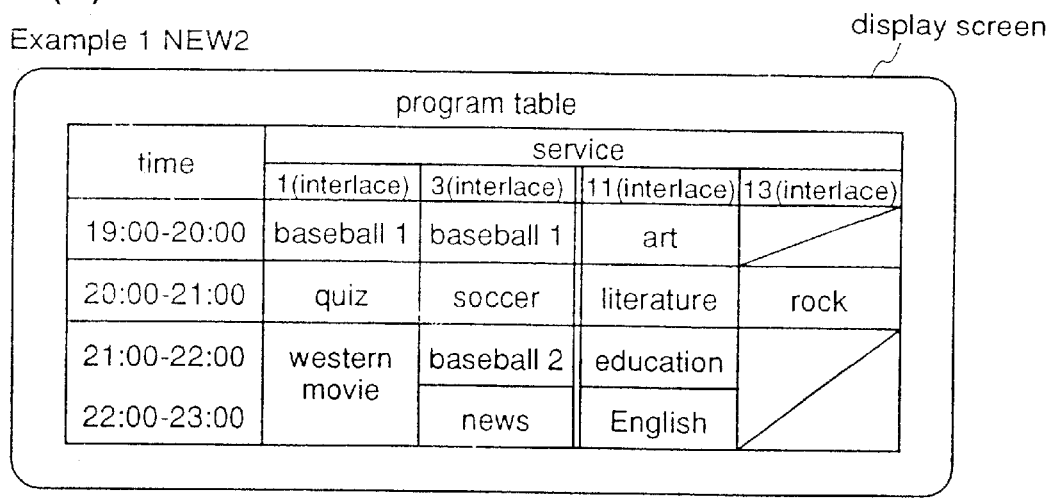

Steps 5~7 are executed as described above, whereby the program table is displayed. FIGS. 47(a), 47(b), 48(a) and 48(b) show program tables displayed on the display screens of the respective reproduction apparatuses. The reproduction apparatus OLD shown in FIG. 41 displays the program table of the interlace services 1 and 3, and this program table is shown in FIG. 47(a). Each of the reproduction apparatuses NEW1 and NEW2 shown in FIG. 41 displays the program table of the interlace services 1 and 3 and the program table of the non-interlace services 11 and 13. The interlace program table and the non-interlace program table may be separated tables corresponding to the respective scanning methods as shown in FIG. 48(a), or these tables may be united in a table as shown in FIG. 48(b). Thereby, the viewer using the reproduction apparatus NEW2 can easily select the interlace program corresponding to the reproduction apparatus NEW2. The reproduction apparatus NEW2 may be set so as to display only the interlace program. Example 1 in the FIGS. 47(a)~48(b) shows the case where the reproduction apparatus NEW2 displays both the interlace program and the non-interlace program, and Example 2 shows the case where the reproduction apparatus NEW2 displays only the program of the corresponding scanning method. In this case, the display screen of the reproduction apparatus NEW2 is as shown in FIG. 47(b). The screen displays only the interlace service 11 among the added digital broadcastings, and only the interlace event among the events in the service 13 wherein interlace and non-interlace coexist.

After the display of the program table as described above, steps 8 and 9 in the flow of FIG. 45 are executed as described above.

Although the reproduction apparatus according to the tenth embodiment receives and processes the transport streams transmitted from the transmission apparatuses according to the first and fourth embodiments, it can receive and process the transport streams transmitted according to other embodiments of the invention. For example, assuming that the reproduction apparatus according to the tenth embodiment receives the transport stream according to the eighth or ninth embodiment and performs the screen display of Example 2, in the structure shown in FIG. 35(b), the reproduction apparatus NEW1 displays all of the services, and the reproduction apparatus NEW2 does not display the service 15 but displays only the interlace events of the service 13.

Furthermore, while in this tenth embodiment the reproduction apparatus NEW2 corresponds to interlacing, it may correspond to non-interlacing.

As described above, the digital broadcasting reproducing apparatus according to the tenth embodiment is provided with the identification information storage unit 5, the identification information deciding unit 53, the program table storage unit 51, the program table creating unit 52, and the video/information synthesizing unit 55. Thereby, a program table including information relating to the scanning method is created using information relating to the program construction and information relating to the scanning method, each information being included in the service information multiplexed into the transport stream, and the viewer is supplied with the program table and selects a program on the program table. The program table prevents the viewer from selecting incorrect program of video data to which the reproduction apparatus is not adapted, thereby preventing the display screen of the reproduction apparatus from being disordered.

The information, code allocation, and procedure (flowchart) according to the tenth embodiment of the invention are merely examples, and the present invention is not restricted to the tenth embodiment.

Embodiment 11

A digital broadcasting transmitting method or a digital broadcasting transmitting apparatus according to an eleventh embodiment of the invention performs transmission of a transport stream after including information that specifies the method of transmitting the EIT (event information table) in the transport stream. A digital broadcasting reproducing apparatus according to this eleventh embodiment displays a program table according to the EIT transmitting method, and supplies the viewer with information relating to video data.

Figure 49:
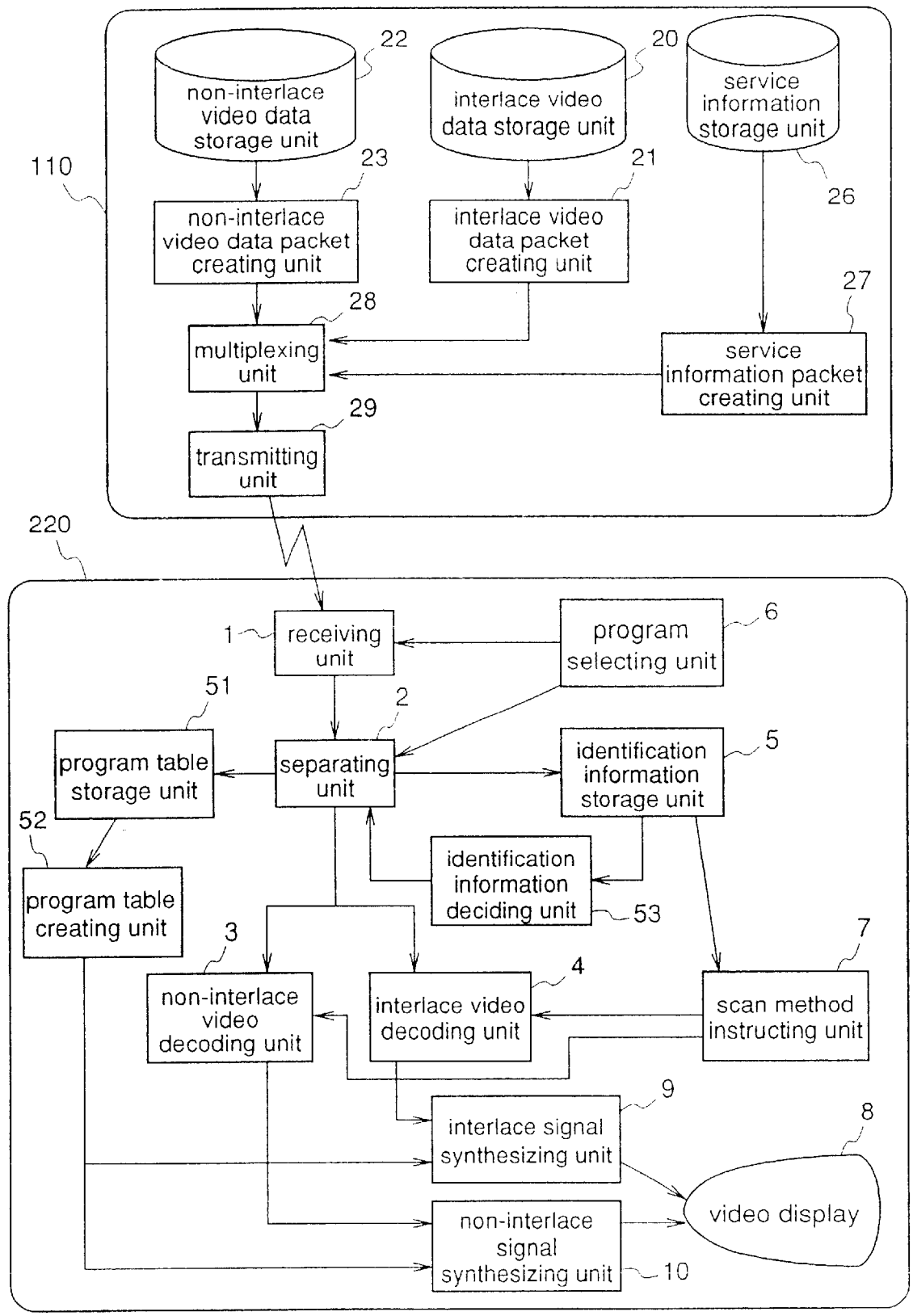
FIG. 49 is a diagram illustrating a digital broadcasting transmitting apparatus and a digital broadcasting reproducing apparatus according to an eleventh embodiment of the invention.

FIG. 49 is a block diagram illustrating a digital broadcasting transmitting apparatus 110 and a digital broadcasting reproducing apparatus 220 according to the eleventh embodiment of the invention. The digital broadcasting transmitting apparatus 110 is identical to that shown in FIG. 1 according to the first embodiment, and the digital broadcasting reproducing apparatus 220 is identical to that shown in FIG. 43 according to the tenth embodiment. Therefore, repeated description is not necessary.

EXAMPLE 1

In a digital broadcasting transmitting method according to a first example of the eleventh embodiment, information showing the EIT transmitting method is given to the NIT descriptor, and the EIT transmitting method is specified for each network.

Figure 50:
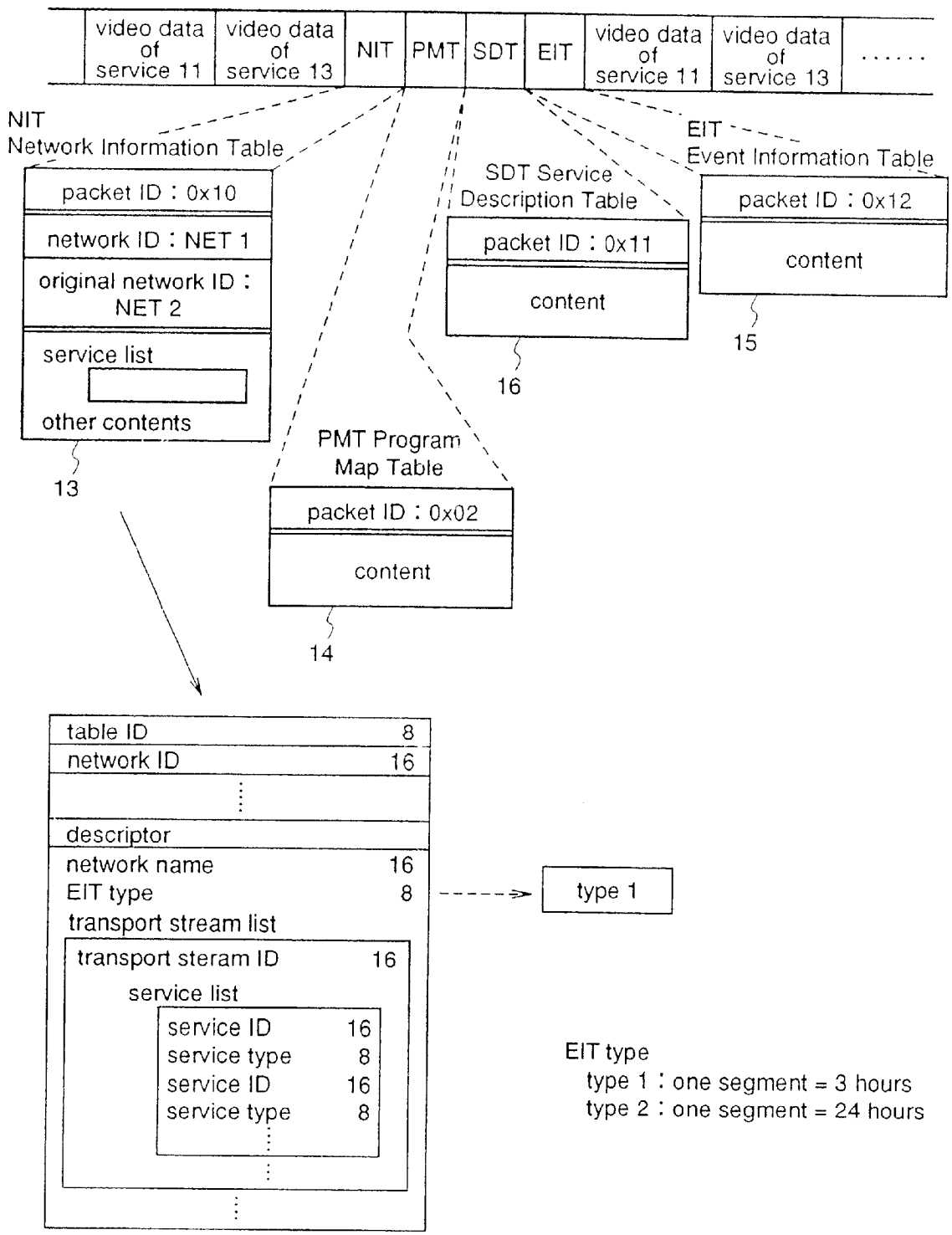
FIG. 50 is a diagram illustrating the structure of multiplexed data transmitted in a digital broadcasting transmitting method according to a first example of the eleventh embodiment.
Figure 58:
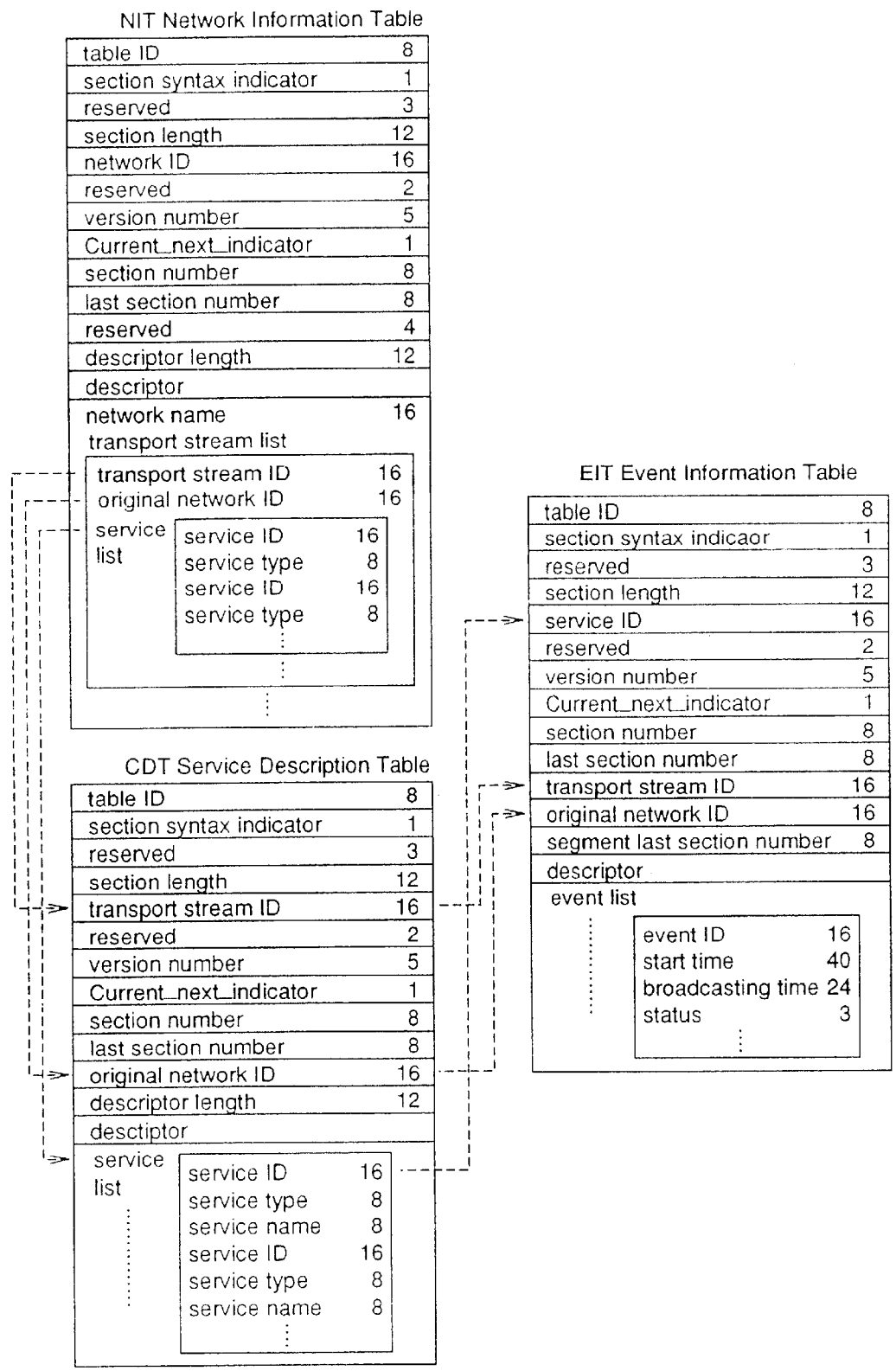
FIG. 58 is a diagram illustrating an NIT, an SDT, and an EIT included in the above-described multiplexed data.

FIG. 50 is a diagram showing the structure of multiplexed data to be transmitted as a transport stream, in the digital broadcasting transmitting method according to the first example of the eleventh embodiment. As shown in FIG. 50, the EIT type is included in the NIT descriptor. Although such information is not included in the NIT descriptor in the conventional standard shown in FIG. 58, this information can be given by extending the standard.

In this eleventh embodiment, two kinds of EIT types, "type 1" and "type 2", are specified according to the setting of segment length in the EIT, i.e., whether one segment is three hours (type 1) or twenty-four hours (type 2).

Hereinafter, a description is given of "(1) Creation and Transmission of Multiplexed Data" by the digital broadcasting transmitting apparatus according to the eleventh embodiment, and "(2) Reproduction of Multiplexed Data" by the digital broadcasting reproducing apparatus according to the eleventh embodiment.

(1) Creation and Transmission of Multiplexed Data

The interlace video data packet creating unit 21 and the non-interlace video data packet creating unit 23 obtain video data required for program creation, from the interlace video data storage unit 20 and the non-interlace video data storage unit 22, respectively, and create interlace video packets and non-interlace video packets, respectively. The video data packet creating units 21 and 23 output the video packets so created toward the multiplexing unit 28.

On the other hand, the service information packet creating unit 27 creates an NIT having information showing the EIT type in the descriptor, on the basis of the EIT transmitting method set in the network by which the transport stream is to be transmitted. As shown in FIG. 50, an NIT packet having information that the EIT type of the network 1 is "type 1" is created. Other service information packets are created in the same manner as described for the conventional example. The service information packets so created are output to the multiplexing unit 28.

The multiplexing unit 28 creates multiplexed data from the video data packets and the service information packets, and the transmitting unit 29 transmits the multiplexed data as a transport stream by an appropriate network.

(2) Reproduction of Multiplexed Data

Initially, the receiving unit 1 receives the transmitted transport stream. The separating unit 2 separates the NIT packet from the stream, with the PID 0x10 as a key. From the NIT packet, information showing the EIT transmitting method is decrypted, and information showing that the EIT transmitting method is "type 1" is stored in the identification information storage unit 5.

The identification information deciding unit 53 instructs the separating unit 2 to separate the EIT packet, on the basis of the stored EIT transmitting method, and the separating unit 2 separates the EIT packet corresponding to the transmitting method, with the PID 0x12 as a key.

The subsequent process steps, i.e., steps from decryption of start times and program titles of events (programs) in each service to output of a program table based on the information by the video display unit 8, are identical as those already described for the tenth embodiment.

EXAMPLE 2

Next, a description is given of a digital broadcasting transmitting method according to a second example of the eleventh embodiment. In this method, information showing the EIT transmitting method is given to the transport stream list of the NIT, and the EIT transmitting method is specified for each transport stream.

Figure 51:
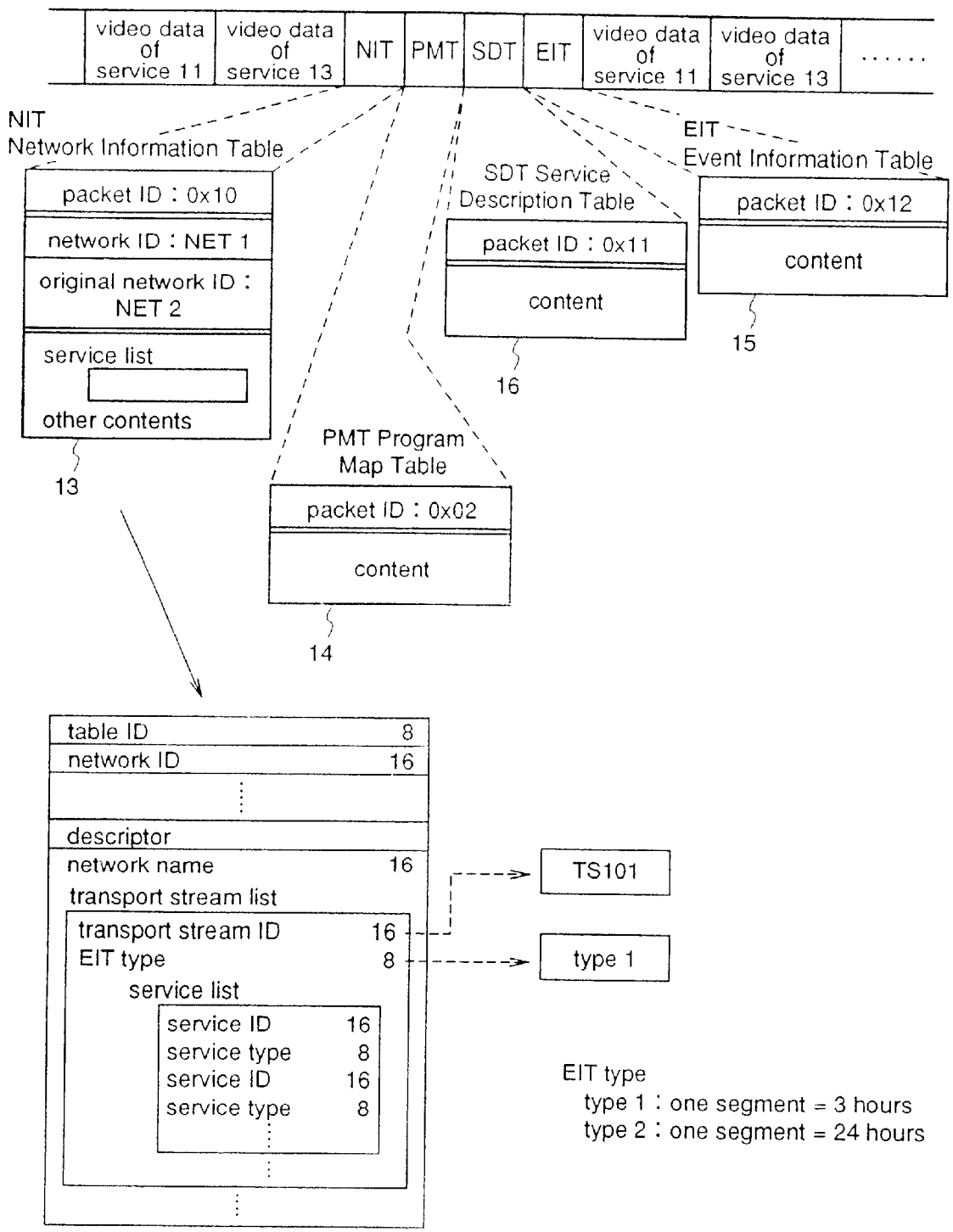
FIG. 51 is a diagram illustrating the structure of multiplexed data transmitted in a digital broadcasting transmitting method according to a second example of the eleventh embodiment.

FIG. 51 is a diagram showing the structure of multiplexed data to be transmitted as a transport stream, in the digital broadcasting transmitting method according to the second example of the eleventh embodiment. In the second example, the transport stream TS101 is given information that the EIT type is "type 1". As in the first example, the standard is extended so that such information can be given.

The operation of the digital broadcasting transmitting and reproducing apparatus according to the second example is identical to that according to the first example except that the information about the EIT transmitting method is given to and decrypted from the NIT transport stream list.

EXAMPLE 3

Next, a description is given of a digital broadcasting transmitting method according to a third example of the eleventh embodiment. In this method, information about the EIT transmitting method is given to the service list of the NIT, and the EIT transmitting method is specified for each service.

Figure 52:
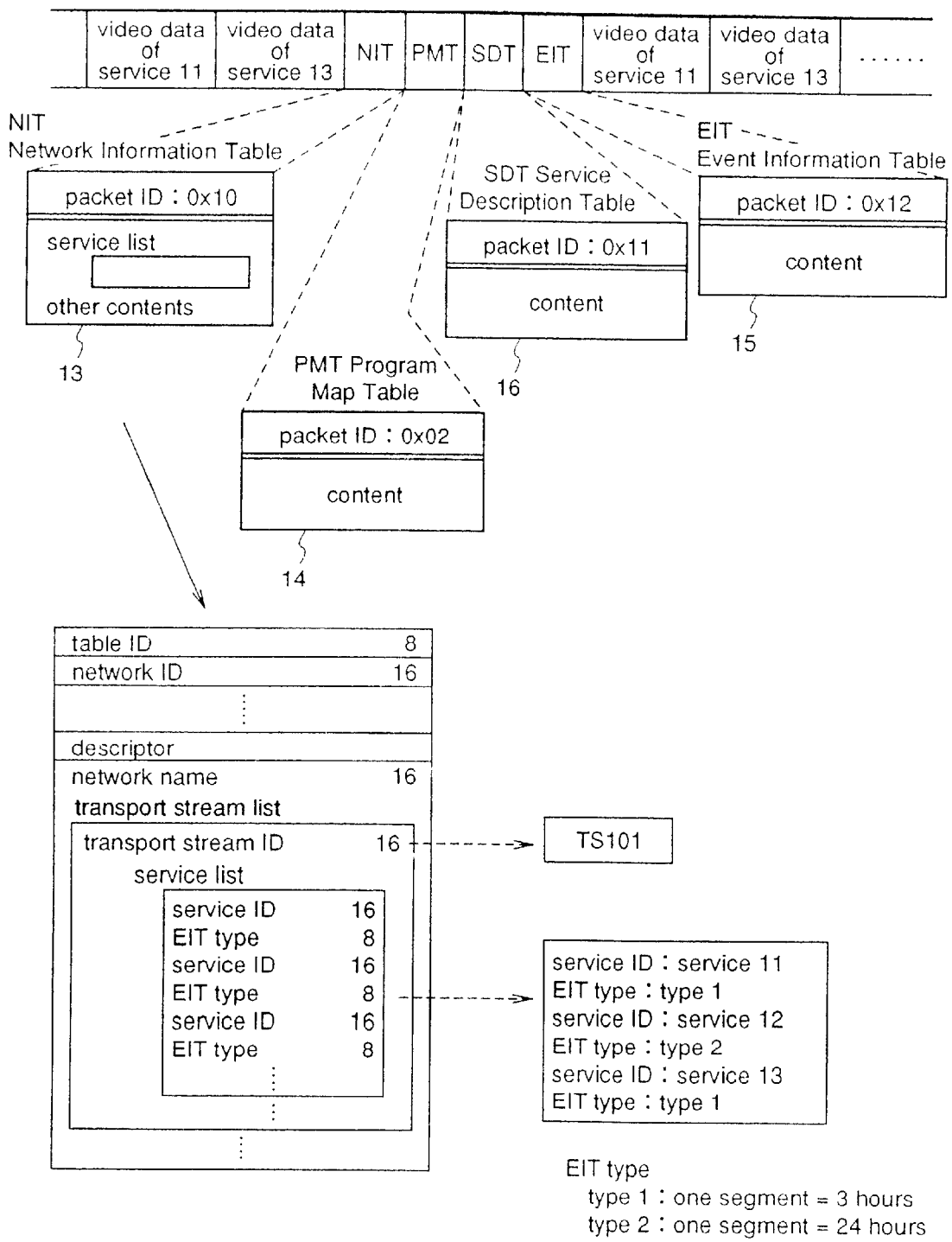
FIG. 52 is a diagram illustrating the structure of multiplexed data transmitted in a digital broadcasting transmitting method according to a third example of the eleventh embodiment.

FIG. 52 is a diagram showing the structure of multiplexed data to be transmitted as a transport stream, in the digital broadcasting transmitting method according to the third example of the eleventh embodiment. In the third example, with respect to the services transmitted by the transport stream TS101, the services 11 and 13 are given information that the EIT type is "type 1", and the service 2 is given information that the EIT type is "type 2". As in the first example, the standard is extended so that such information can be given. Alternatively, such information may be given to the service type, as in the case of giving the scanning method information.

The operation of the digital broadcasting transmitting and reproducing apparatus according to the third example is identical to that according to the first example except that the information about the EIT transmitting method is given to and decrypted from the NIT service list.

EXAMPLE 4

Next, a description is given of a digital broadcasting transmitting method according to a fourth example of the eleventh embodiment. In this method, information about the EIT transmitting method is given to the service list of the SDT, and the EIT transmitting method is specified for each service.

FIG. 53 is a diagram showing the structure of multiplexed data to be transmitted as a transport stream, in the digital broadcasting transmitting method according to the fourth example of the eleventh embodiment. In the fourth example, with respect to the services transmitted by the transport stream TS101, the services 11 and 13 are given information that the EIT type is "type 1", and the service 2 is given information that the EIT type is "type 2". As in the first example, the standard is extended so that such information can be given. Or, such information may be given to the service type, as in the case of giving the scanning method information. Alternatively, the EIT transmitting method may be specified by the service name.

The operation of the digital broadcasting transmitting and reproducing apparatus according to the fourth example is identical to that according to the first example except that the information about the EIT transmitting method is given to and decrypted from the SDT transport stream list.

As described above, in the digital broadcasting transmitting method according to the eleventh embodiment, since information specifying the EIT transmitting method is given to the service information packet which is multiplexed into the transport stream to be transmitted, the EIT transmitting method can be set for each network. Further, the EIT transmitting method can be specified for each transport stream or each service. Therefore, compared with the conventional EIT transmitting method which is fixedly set for each network, more flexible setting of the EIT transmitting method is possible according to the content or state of each network, transport stream, or service.

Embodiment 12

In a digital broadcasting transmitting method according to a twelfth embodiment of the present invention, the method of transmitting the EIT, which is multiplexed into the transport stream to be transmitted, can be specified more flexibly.

A digital broadcasting transmitting apparatus and a digital broadcasting reproducing apparatus according to this twelfth embodiment are identical to those according to the eleventh embodiment shown in FIG. 49.

In the digital broadcasting transmitting method according to the twelfth embodiment, information about the EIT transmitting method is given to the transport stream list of the NIT and to the transport stream list of the SDT, and the EIT transmitting method is specified for each transport stream and each service.

Figure 54:
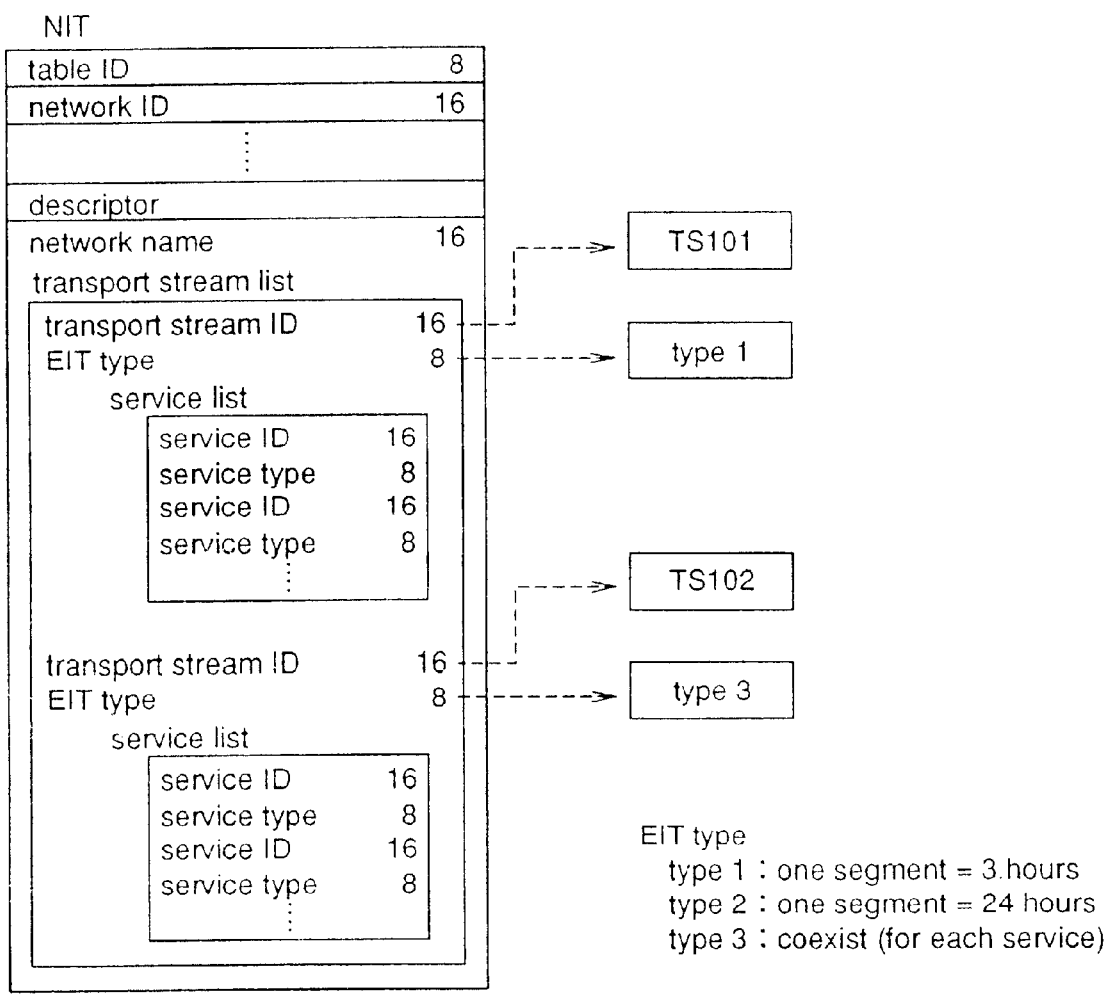
FIG. 54 is a diagram illustrating an NIT transmitted in a digital broadcasting transmitting method according to a twelfth embodiment of the invention.

FIG. 54 is a diagram showing the structure of the NIT which is multiplexed into the transport stream to be transmitted, in the digital broadcasting transmitting method according to the twelfth embodiment. As shown in the figure, the NIT is given information that the EIT type of the transport stream TS101 is "type 1", and information that the EIT type of the transport stream TS102 is "type 2".

In this twelfth embodiment, three kinds of EIT types, "type 1", "type 2", and "type 3" are specified according to the setting of segment length in the EIT, i.e., whether one segment is three hours (type 1) or twenty-four hours (type 2), or both of them coexist (type 3).

With respect to the transport stream TS102 showing "type 3" (coexist), the EIT transmitting method of each service transmitted by the TS102 must be specified. FIG. 55 is a diagram for explaining the specification for each service.

As shown in FIG. 55, regarding the SDT which is multiplexed into the TS102 for which "type 3" is shown in the NIT, in the service list of the SDT, information showing the EIT type (type 1 or type 2) is given to each service, as in the fourth example of the eleventh embodiment. The TS101, for which the EIT transmitting method is specified in the NIT, is not given such information for each service.

Hereinafter, a description is given of "(1) Creation and Transmission of Multiplexed Data" by the digital broadcasting transmitting apparatus according to the twelfth embodiment, and "(2) Reproduction of Multiplexed Data" by the digital broadcasting reproducing apparatus according to the twelfth embodiment.

(1) Creation and Transmission of Multiplexed Data

The interlace video data packet creating unit 21 and the non-interlace video data packet creating unit 23 obtain video data required for program creation from the interlace video data storage unit 20 arid the non-interlace video data storage unit 22, respectively, and create interlace video packets and non-interlace video packets, respectively. The video data packet creating units 21 and 23 output the video packets so created toward the multiplexing unit 28.

On the other hand, the service information packet creating unit 27 creates an NIT packet having information about the EIT type in the transport stream list, as an NIT packet of the network which transmits the transport streams TS101 and TS102, on the basis of the EIT transmitting method set for each transport stream. To be specific, as shown in FIG. 54, an NIT packet having information that the EIT type of the TS101 is "type 1" and the EIT type of the TS102 is "type 3" is created.

Next, with respect to the transport stream TS102 which is given "type 3" showing "coexist" in the transport stream list of the NIT, the service information packet creating unit 27 creates an SDT packet having information about the EIT type of each service, in the service list of the SDT, on the basis of the EIT transmitting method specified for each service. As shown in FIG. 55, the SDT to be multiplexed into the TS102 is given information that the EIT type of the services 1 and 3 is "type 1" and the EIT type of the service 2 is "type 2". As described above, the SDT to be multiplexed into the TS101 is not given such information for each service. Other service information packets are created in the same way as described for the first embodiment. The service information packets so created are output toward the multiplexing unit 28.

The multiplexing unit 28 creates multiplexed data from the video data packets and the service information packets, and the transmitting unit 29 transmits the multiplexed data as a transport stream by an appropriate network.

(2) Reproduction of Multiplexed Data

Initially, the receiving unit 1 receives the transmitted transport stream. The separating unit 2 separates the NIT packet from the stream, with the packet ID 0x10 as a key. From the NIT packet, information about the EIT transmitting method is decrypted, and information that the EIT transmitting methods of the transport streams TS101 and TS102 are "type 1" and "type 3", respectively, is stored in the identification information storage unit 5.

Further, with respect to the TS102 of "type 3", information about the EIT transmitting method of each service is obtained from the service list of the SDT extracted from the TS102, and this information is also stored in the identification information storage unit 5.

The identification information deciding unit 53 instructs the separating unit 2 to separate the EIT packet, on the basis of the EIT transmitting method stored, and the separating unit 2 separates the EIT packet corresponding to the transmitting method, with the packet ID 0x12 as a key.

The subsequent process steps, i.e., steps from decryption of start times and program titles of events (programs) in each service to output of a program table based on the information by the video display unit 8, are identical to those already described for the tenth embodiment.

In this twelfth embodiment, specification of EIT transmitting method for each transport stream using the NIT and specification thereof for each service using the SDT are combined. However, the latter may use information given to the service list of the NIT. Furthermore, it is also possible to specify the EIT transmitting method by appropriately combining the specification for each network, transport stream, or service using the NIT, with the specification for each service using the SDT.

As described above, in the digital broadcasting transmitting method according to the twelfth embodiment, since information specifying the EIT transmitting method is given to the service information packet which is multiplexed into the transport stream to be transmitted, the EIT transmitting method can be specified for each network. Further, the EIT transmitting method can be specified for each transport stream or service, or a combination of them. Therefore, compared with the conventional transmitting method which is fixedly set for each network, more flexible setting of the EIT transmitting method is possible according to the content or state of each network, transport stream, or service.

Embodiment 13

In a digital broadcasting transmitting method according to a thirteenth embodiment of the present invention, plural sorts of EIT transmitting methods, which EIT is multiplexed into the transport stream to be transmitted, can be specified flexibly.

A digital broadcasting transmitting apparatus and a digital broadcasting reproducing apparatus according to this thirteenth embodiment are identical to those according to the eleventh embodiment shown in FIG. 49.

In the digital broadcasting transmitting method according to the thirteenth, information about the EIT transmitting method is given to the service list of the NIT and to the service list of the SDT, and a plurality of EIT transmitting methods are specified for each service.

FIG. 56 is a diagram showing the structures of the NIT and the SDT which are multiplexed into the transport stream to be transmitted, in the digital broadcasting transmitting method according to the thirteenth embodiment. As shown in the figure, the NIT of the transport stream TS101 is given information that the EIT type of the services 11 and 13 is "type 1-1" and the EIT type of the service 2 is "type 1-2". In the NIT, two kinds of EIT types, "type 1-1" and "type 1-2", are specified according to setting of segment length in the EIT, i.e., whether one segment is three hours (type 1-1) or twenty-four hours (type 1-2).

Further, the SDT of the transport stream TS101 is given information that the EIT type of the service 11 is "type 2-1" and the EIT type of the services 12 and 13 is "type 2-2". In the SDT, two kinds of EIT types, "type 2-1" and "type 2-2", are specified according to the allocation of segment number, i.e., whether the segment number is allocated for each day (type 2-1) or each month (type 2-2).

Referring the NIT and the SDT in contrast, the service 11 is given information that one segment is three month and the segment number is allocated for each day, the service 12 is given information that one segment is twenty-four hours and the segment number is allocated for each month, and the service 13 is given information that one segment is three hours and the segment number is allocated for each month.

Hereinafter, a description is given of "(1) Creation and Transmission of Multiplexed Data" by the digital broadcasting transmitting apparatus according to the thirteenth embodiment, and "(2) Reproduction of Multiplexed Data" by the digital broadcasting reproducing apparatus according to the thirteenth embodiment.

(1) Creation and Transmission of Multiplexed Data

The interlace video data packet creating unit 21 and the non-interlace video data packet creating unit 23 obtain video data required for program creation, from the interlace video data storage unit 20 and the non-interlace video data storage unit 22, respectively, and create interlace video packets and non-interlace video packets, respectively. The video data packet creating units 21 and 23 output the created video packets toward the multiplexing unit 28.

On the other hand, the service information packet creating unit 27 creates an NIT packet having information about the EIT type in tho transport stream list of the transport stream TS101, as an NIT packet of the network which transmits the TS101 including the services 11~13, on the basis of the EIT transmitting method which specifies the segment length and is set for each service in the TS101. To be specific, as shown in FIG. 56, an NIT packet having information that the EIT type of the services 11 and 13 is "type 1-1" and the EIT type of the service 12 is "type 1-2" is created.

Next, the service information packet creating unit 27 creates an SDT packet having information about the EIT type in the service list, as an SDT packet to be multiplexed into the transport stream TS101, on the basis of the EIT transmitting method that specifies the segment number allocation and is set for each service. To be specific, as shown in FIG. 56, the SDT packet is given information that the EIT type of the service 11 is "type 2-1" and the EIT type of the services 12 and 13 is "type 2-2". Other service information packets are created in the same way as described for the first embodiment. The service information packets so created are output toward the multiplexing unit 28.

The multiplexing unit 28 creates multiplexed data from the video data packets and the service information packets, and the transmitting unit 29 transmits the multiplexed data as the transport stream TS101 by an appropriate network.

(2) Reproduction of Multiplexed Data

Initially, the receiving unit 1 receives the transmitted transport stream. The separating unit 2 separates the NIT packet from the stream, with the packet ID 0x10 as a key. From the NIT packet, information about the EIT transmitting method is decrypted, and information that the EIT transmitting method of the services 11 and 13 is "type 1-1" and the EIT transmitting method of the service 12 is "type 1-2" is stored in the identification information storage unit 5.

Further, the separating unit 2 separates the SDT packet from the stream, with the packet ID 0x11 as a key. From the SDT packet, information about the EIT transmitting method is decrypted, and information that the EIT transmitting method of the service 11 is "type 2-1" and the EIT transmitting method of the services 12 and 13 is "type 2-2" is stored in the identification information storage unit 5.

The identification information deciding unit 53 instructs the separating unit 2 to separate the EIT packet, on the basis of the EIT transmitting method stored, and the separating unit 2 separates the EIT packet corresponding to the transmitting method, with the packet ID 0x12 as a key.

The subsequent process steps, i.e., steps from decryption of start times and program titles of events (programs) in each service to output of a program table based on the information by the video display unit 8, are identical as those already described for the tenth embodiment.

In this thirteenth embodiment, specification about the EIT segment length for each service using the NIT is combined with specification about the EIT segment number allocation for each service using the SDT. However, the present invention is not restricted thereto. It is also possible to specify the EIT transmitting method by appropriately combining the specification for each network, transport stream, or service using the NIT, with the specification for each service using the SDT.

Further, it is also possible to combine the combination of specifications for each network/transport stream/service according to the twelfth embodiment, with the combination of specifications about plural kinds of EIT transmitting methods according to the thirteenth embodiment. That is, the EIT transmitting method can be flexibly specified in response to various requests.

As described above, in the digital broadcasting transmitting method according to the thirteenth embodiment, since information specifying the EIT transmitting method is given to the service information packet which is multiplexed into the transport stream to be transmitted, the EIT transmitting method can be specified for each network, transport stream, or service. Further, with respect to the EIT transmitting method, specifications according to plural sorts of methods can be combined. Therefore, compared with the conventional transmitting method which is fixedly set for each network, it is possible to flexibly set the EIT transmitting method according to the content or state of each network, transport stream, or service.

While in the eleventh to thirteenth embodiments of the invention the EIT transmitting method is specified with respect to the segment length and segment number allocation only, the present invention is not restricted thereto.

Furthermore, the information and procedures used for explaining the eleventh to thirteenth embodiments are merely examples, and the present invention is not restricted thereto.

What is claimed is:

1. A digital broadcasting transmitting method wherein a transport stream is created and transmitted in a digital broadcasting system in which the transport stream in which plural packets comprising video data packets of digitized video and service information packets of information about broadcasting using the video have been multiplexed, is transmitted over a network, said method comprising:

creating and transmitting the transport stream in which the service information includes an event information table indicative of program information and transmitting method information of the event information table contained in a network information table indicative of network information, wherein the transmitting method information of the event information table is included in an event information table type identifier in a descriptor contained in the network information table, and specifies the transmitting method of the event information table for each network.

2. A digital broadcasting transmitting method wherein a transport stream is created and transmitted in a digital broadcasting system in which the transport stream in which plural packets comprising video data packets of digitized video and service information packets of information about broadcasting using the video have been multiplexed, is transmitted over a network, said method comprising:

creating and transmitting the transport stream in which the service information includes an event information table indicative of program information and transmitting method information of the event information table contained in a network information table indicative of network information, wherein the transmitting method information of the event information table is included in an event information table type identifier in a transport stream descriptor contained in the network information table, indicative of a transport stream to be offered by a network, and specifies the transmitting method of the event information table for each transport stream.

3. A digital broadcasting transmitting method wherein a transport stream is created and transmitted in a digital broadcasting system in which the transport stream in which plural packets comprising video data packets of digitized video and service information packets of information about broadcasting using the video have been multiplexed, is transmitted over a network, said method comprising:

creating and transmitting the transport stream in which the service information includes an event information table indicative of program information and transmitting method information of the event information table contained in a network information table indicative of network information, wherein the transmitting method information of the event information table is included in an event information table type identifier in a service list descriptor contained in the network information table, indicative of a service to be offered by a network, and specifies the transmitting method of the event information table for each service.

4. A digital broadcasting transmitting method wherein a transport stream is created and transmitted in a digital broadcasting system in which the transport stream in which plural packets comprising video data packets of digitized video and service information packets of information about broadcasting using the video have been multiplexed, is transmitted over a network, said method comprising:

creating and transmitting the transport stream in which the service information includes an event information table indicative of program information and transmitting method information of the event information table contained in a service description table indicative of service information, wherein the transmitting method information of the event information table is included in a service list descriptor contained in the service description table, indicative of a service included in a transport stream, and specifies the transmitting method of the event information table for each service.

5. A digital broadcasting transmitting apparatus which creates and transmits a transport stream in a digital broadcasting system in which the transport stream in which plural packets comprising video data packets of digitized video and service information packets of information about broadcasting using the video have been multiplexed, is transmitted over a network, said apparatus comprising:

a non-interlace video data packet creating unit for creating a non-interlace video data packet from non-interlace video data in which video is digitized by a non-interlace method;

an interlace video data packet creating unit for creating an interlace video data packet from interlace video data in which video is digitized by an interlace method;

a service information packet creating unit for creating a service information packet from service information including scanning method information for digitizing the video;

a multiplexing unit for multiplexing the non-interlace video data packet, the interlace video data packet, and the service information packet, to create a transport stream; and a transmitting unit for transmitting the transport stream created by the multiplexing unit to a network.

6. The digital broadcasting transmitting apparatus of claim 5 wherein a transport stream including a packet of video digitized by another scanning method is added to an existing digital broadcasting system using video digitized by a specified scanning method, and said service information packet creating unit creates the service information packet in which the scanning method information includes:

information for distinguishing a transport stream which belongs to the existing digital broadcasting system from the transport stream to be added; and information for specifying a scanning method of video of a packet multiplexed into the transport stream to be added.

7. The digital broadcasting transmitting apparatus of claim 5 wherein said service information packet creating unit provides network scanning method information indicative of a scanning method of video data transmitted over a network as information for each network, as the scanning method information.

8. The digital broadcasting transmitting apparatus of claim 5 wherein said service information packet creating unit provides transport stream scanning method information indicative of a scanning method of video data included in the transport stream as information for each transport stream, as the scanning method information.

9. The digital broadcasting transmitting apparatus of claim 5 wherein said service information packet creating unit provides the scanning method information to a network information table packet indicative of network information, of the service information.

10. The digital broadcasting transmitting apparatus of claim 9 wherein said service information packet creating unit provides the scanning method information to an original network identifier contained in the network information table packet, and is indicative of an original network over which a transport stream must be transmitted.

11. The digital broadcasting transmitting apparatus of claim 9 wherein said service information packet creating unit provides the scanning method information to a network identifier contained in the network information table packet, and is indicative of a network over which a transport stream is transmitted.

12. The digital broadcasting transmitting apparatus of claim 11 wherein said service information packet creating unit provides information for specifying a network to a network name contained in the network information table packet, and is indicative of a name given to the network.

13. The digital broadcasting transmitting apparatus of claim 5 wherein in the digital broadcasting system, a service comprises one or more programs, and said service information packet creating unit provides the scanning method information including service scanning method information indicative of the video data scanning method as information for each service.

14. The digital broadcasting transmitting apparatus of claim 13 wherein said service information packet creating unit provides the service scanning method information to a network information table packet indicative of network information.

15. The digital broadcasting transmitting apparatus of claim 14 wherein said service information packet creating unit provides the service scanning method information to a service type in a service list descriptor contained in the network information table packet, and is indicative of a service to be offered by a network.

16. The digital broadcasting transmitting apparatus of claim 14 wherein said service information packet creating unit provides the service scanning method information to a service identifier in a service list descriptor contained in the network information table packet, and is indicative of a service to be offered by a network.

17. The digital broadcasting transmitting apparatus of claim 16 wherein said service information packet creating unit provides information for specifying a service to a service name in the service list descriptor.

18. The digital broadcasting transmitting apparatus of claim 13 wherein said service information packet creating unit provides the service scanning method information to a service descriptor table packet indicative of service information of a transport stream.

19. The digital broadcasting transmitting apparatus of claim 18 wherein said service information packet creating unit provides the service scanning method information to a service type in a service list descriptor contained in the service description table packet, and is indicative of a service to be offered by a transport stream.

20. The digital broadcasting transmitting apparatus of claim 18 wherein said service information packet creating unit provides the service scanning method information to a service identifier in a service list descriptor contained in the service description table packet, and is indicative of a service to be offered by a transport stream.

21. The digital broadcasting transmitting apparatus of claim 20 wherein said service information packet creating unit provides information for specifying a service to a service name in the service list descriptor.

22. The digital broadcasting transmitting apparatus of claim 5 wherein plural programs are transmitted, and said service information packet creating unit creates the scanning method information including program scanning method information as information indicative of a scanning method of the video data for each program.

23. The digital broadcasting transmitting apparatus of claim 22 wherein said service information packet creating unit provides the program scanning method information to an event information table packet indicative of program information.

24. The digital broadcasting transmitting apparatus of claim 23 wherein said service information packet creating unit provides the program scanning method information to an event list descriptor contained in the event information table packet.

25. A digital broadcasting transmitting apparatus which creates and transmits a transport stream in a digital broadcasting system in which the transport stream in which plural packets comprising video data packets of digitized video and service information packets of information about broadcasting using the video have been multiplexed, is transmitted over a network, said apparatus comprising:

a non-interlace video data packet creating unit for creating a non-interlace video data packet from non-interlace video data in which video is digitized by a non-interlace method;

an interlace video data packet creating unit for creating an interlace video data packet from interlace video data in which video is digitized by an interlace method;

a service information packet creating unit for creating a service information packet containing an event information table indicative of program information and transmission information of the event information table;

a multiplexing unit for multiplexing the non-interlace video data packet, the interlace video data packet, and the service information packet, to create a transport stream; and a transmitting unit for transmitting the transport stream created by the multiplexing unit to a network.

26. The digital broadcasting transmitting apparatus of claim 25 wherein said service information packet creating unit provides the transmission information of the event information table to a network information table packet indicative of network information.

27. The digital broadcasting transmitting apparatus of claim 26 wherein said service information packet creating unit provides the transmission information of the event information table for specifying a transmitting method for each network to an event information table type identifier in a descriptor contained in the network information table packet.

28. The digital broadcasting transmitting apparatus of claim 26 wherein said service information packet creating unit provides the transmission information of the event information table for specifying a transmitting method for each transport stream to an event information table type identifier in a transport stream list descriptor contained in the network information table packet, and is indicative of a transport stream to be offered by a network.

29. The digital broadcasting transmitting apparatus of claim 26 wherein said service information packet creating unit provides the transmission information of the event information table for specifying the transmitting method of the event information table for reach service, to an event information table type identifier in a service list descriptor contained in the network information table packet, and is indicative of a service to be offered by a network.

30. The digital broadcasting transmitting apparatus of claim 25 wherein said service information packet creating unit provides the transmission information of the event information table to a service description table packet indicative of service information of a transport stream.

31. The digital broadcasting transmitting apparatus of claim 30 wherein said service information packet creating unit provides the transmission information of the event information table for specifying the transmitting method of the event information table for each service to an event information table type identifier in a service list descriptor contained in the service description table packet, and is indicative of a service given to a transport stream.

32. A digital broadcasting reproducing apparatus which receives a transport stream and reproduce video from video data using service information in a digital broadcasting system in which the transport stream in which plural packets comprising video data packets of digitized video and service information packets of information about broadcasting using the video have been multiplexed, is transmitted over a network, said apparatus comprising:

a receiving unit for receiving multiplexed data as the transport stream;

a separating unit for extracting video data and service information from the multiplexed data received by the receiving unit;

a service selecting unit for accepting selection of video data by an operator and informing said separating unit of video data to be extracted;

an identification information storage unit for storing identification information about a video data scanning method of the service information separated and extracted by said separating unit;

a non-interlace video decoding unit for decoding non-interlace video data separated and extracted by the separating unit, and outputting a decoded signal;

an interlace video decoding unit for decoding interlace video data separated and extracted by the separating unit, and outputting a decoded signal;

a scanning method instructing unit for deciding a scanning method of the video data selected by the operator on the basis of the information stored in said identification information storage unit, and providing an instruction for decoding to one of said non-interlace video decoding unit and said interlace video decoding unit on the basis of the decision; and an identification information decision unit for instructing said separating unit to separate and extract information required for program creation from the received multiplexed data on the basis of the information stored in said identification information storage unit;

a program table storage unit for storing information required for program creation which has been separated and extracted by said separating unit in accordance with the instruction from said identification information decision unit; and a program table creating unit for creating a program table in the digital broadcasting system on the basis of the information stored in said program table storage unit.

33. The digital broadcasting reproducing apparatus of claim 32 wherein said identification information storage unit stores information for specifying a scanning method of the video data of the service information which is multiplexed into the transport stream and transmitted, and said identification information decision unit instructs said separating unit to separate and extract the information required for program creation and the information for specifying the scanning method from the received multiplexed data on the basis of the information stored in said identification information storage unit; and said program table creating unit creates the program table including the scanning method information.

34. The digital broadcasting reproducing apparatus of claim 32 wherein said identification information storage unit stores transmitting method information of an event information table which specifies the transmitting method of the event information table of the service information which is multiplexed into the transport stream and transmitted, and said identification information decision unit instructs said separating unit to separate and extract information required for program creation from the received multiplexed data on the basis of the transmitting method information of the event information table stored in said identification information storage unit.

* * * * *